US008089848B2

(12) United States Patent
Hamano et al.

(10) Patent No.: US 8,089,848 B2
(45) Date of Patent: Jan. 3, 2012

(54) OPTICAL PICKUP AND OPTICAL INFORMATION PROCESSING APPARATUS

(75) Inventors: Yukiko Hamano, Kanagawa (JP); Hideaki Hirai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 422 days.

(21) Appl. No.: 12/297,385

(22) PCT Filed: Apr. 18, 2007

(86) PCT No.: PCT/JP2007/058904
§ 371 (c)(1),
(2), (4) Date: Oct. 16, 2008

(87) PCT Pub. No.: WO2007/123250
PCT Pub. Date: Nov. 1, 2007

(65) Prior Publication Data
US 2009/0097381 A1    Apr. 16, 2009

(30) Foreign Application Priority Data

Apr. 26, 2006  (JP) .................................. 2006-121894
Apr. 26, 2006  (JP) .................................. 2006-121911
Apr. 26, 2006  (JP) .................................. 2006-121995
Sep. 5, 2006   (JP) .................................. 2006-240204
Jan. 16, 2007  (JP) .................................. 2007-006975

(51) Int. Cl.
    *G11B 7/135*  (2006.01)
(52) U.S. Cl. ......... 369/112.04; 369/112.23; 369/112.24; 369/112.25; 369/112.07; 369/112.08
(58) Field of Classification Search ............. 369/112.04, 369/112.23, 112.07, 112.08
See application file for complete search history.

(56) References Cited

U.S. PATENT DOCUMENTS

2003/0235137 A1    12/2003  Nishioka et al.
2004/0257958 A1    12/2004  Kimura et al.
2004/0264348 A1*   12/2004  Mimori .................... 369/112.05

(Continued)

FOREIGN PATENT DOCUMENTS

JP    09-128785    5/1997

(Continued)

OTHER PUBLICATIONS

Noponen, E. et al., "Electromagnetic Theory and Design of Diffractive Arrays", Journal of the Optical Society of America, vol. 10, No. 3, Mar. 1, 1993, pp. 434-443.

(Continued)

*Primary Examiner* — Joseph Haley
*Assistant Examiner* — Nicholas Lee
(74) *Attorney, Agent, or Firm* — Dickstein Shapiro LLP

(57) ABSTRACT

A disclosed optical pickup for performing at least recording, reproduction, or deletion of information on a first, second, third, and fourth optical recording media having different recording densities includes a first light source configured to emit first light having a first wavelength λ1 corresponding to the first and second optical recording media; a second light source configured to emit second light having a second wavelength λ2 corresponding to the third optical recording medium; a third light source configured to emit third light having a third wavelength λ3 corresponding to the fourth optical recording medium; an objective lens configured to focus the first light, the second light, and the third light on corresponding recording surfaces of the first, second, third, and fourth optical recording media; and an aberration correcting unit between the objective lens and the first, second, and third light sources.

17 Claims, 56 Drawing Sheets

U.S. PATENT DOCUMENTS

| | | | |
|---|---|---|---|
| 2005/0047313 A1* | 3/2005 | Saitoh et al. | 369/112.05 |
| 2005/0180295 A1* | 8/2005 | Mimori | 369/112.07 |
| 2005/0190679 A1* | 9/2005 | Mimori | 369/112.05 |
| 2005/0226123 A1* | 10/2005 | Kimura et al. | 369/112.08 |
| 2005/0237900 A1 | 10/2005 | Sano et al. | |
| 2005/0265152 A1 | 12/2005 | Hirai | |
| 2007/0147216 A1 | 6/2007 | Hirai | |

FOREIGN PATENT DOCUMENTS

| | | |
|---|---|---|
| JP | 2001-143303 | 5/2001 |
| JP | 2003-338076 | 11/2003 |
| JP | 2004-30724 | 1/2004 |
| JP | 2005-182861 | 7/2005 |
| JP | 2005-209299 | 8/2005 |
| JP | 2005-339718 | 12/2005 |
| JP | 2005-353240 | 12/2005 |
| JP | 2006-012391 | 1/2006 |
| JP | 2006-092671 | 4/2006 |
| JP | 2006-107558 | 4/2006 |
| WO | WO 03/091764 A1 | 11/2003 |
| WO | WO 2005/098840 A1 | 10/2005 |

OTHER PUBLICATIONS

Goto, K. et al., "Design of an Aberration-Free Spherical Micro Lens with a Diffractive Relief Grating Film on a Refractive Spherical Glass Substrate", Japanese Journal of Applied Physics, vol. 31, No. 5B, May 1, 1992, pp. 1586-1590.

Y. Komma et al., "Compatible Objective Lens for Blu-ray Disc and Digital Versatile Disc Using Diffractive Optical Element and Phase-Step Element Which Corrects Both Chromatic and Spherical Aberrations," Japanese Journal of Applied Physics, The Japan Society of Applied Physics, JP LNKD-DOI:10.1143/JJAP.43.4768, vol. 43, No. 7B, Jan. 1, 2004, pp. 4768-4771, XP009070127ISSN: 0021-4922.

Y. Tanaka et al., "Lens Design of Compatible Objective Lens for Blu-ray Disc and Digital Versatile Disk With Diffractive Optical Element and Phase Steps," Japanese Journal of Applied Physics, The Japan Society of Applied Physics, vol. 43, No. 7B, 2004, pp. 4742-4745.

* cited by examiner

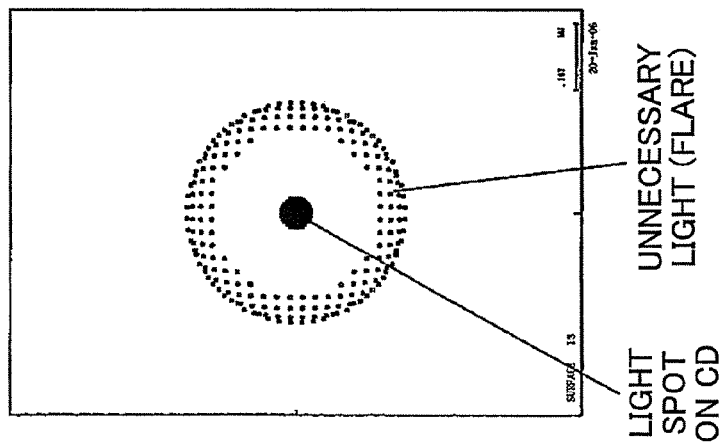
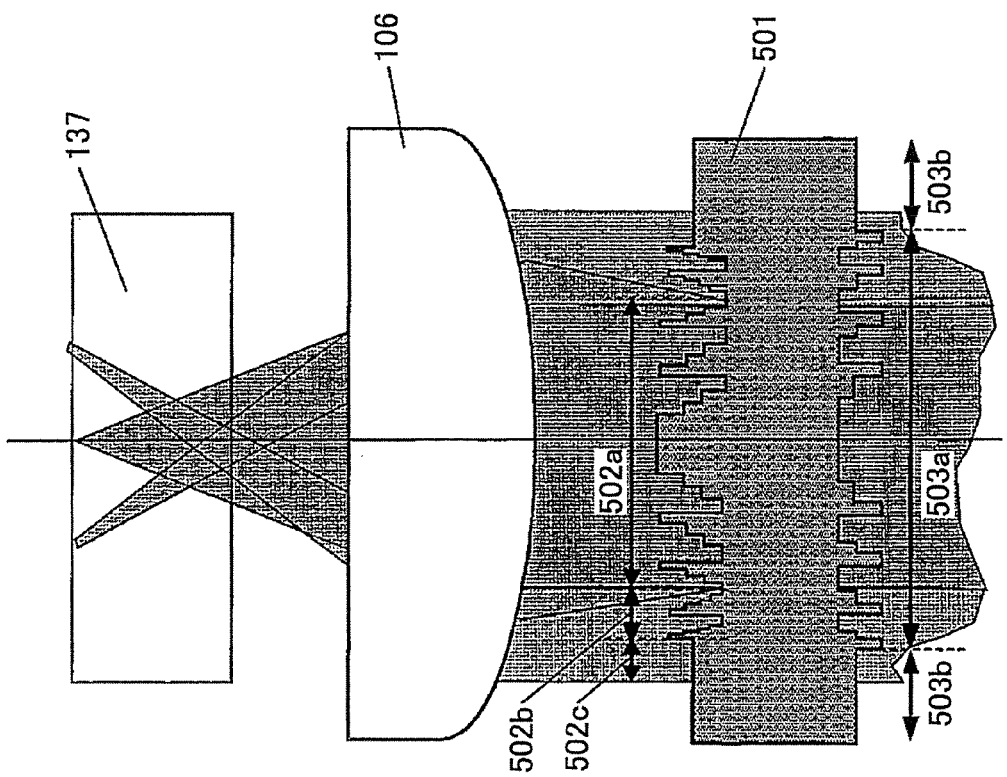

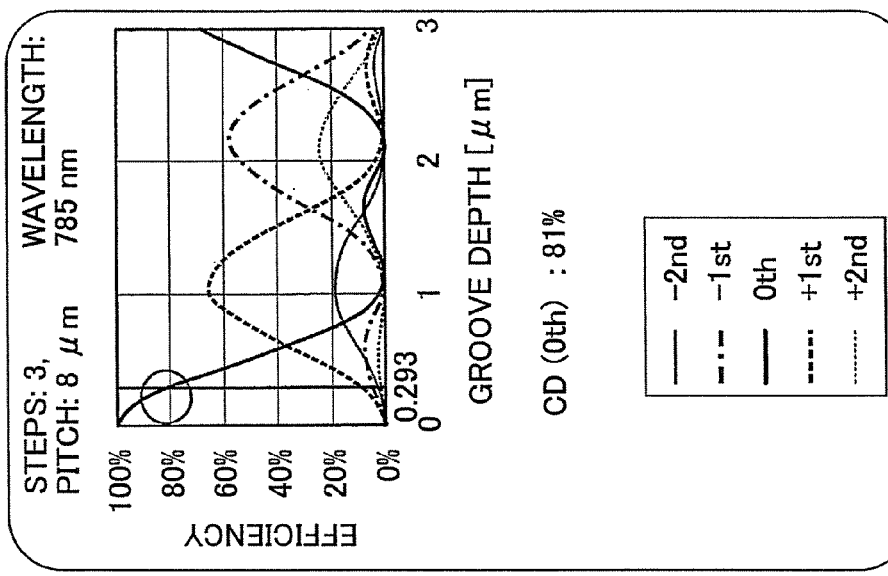
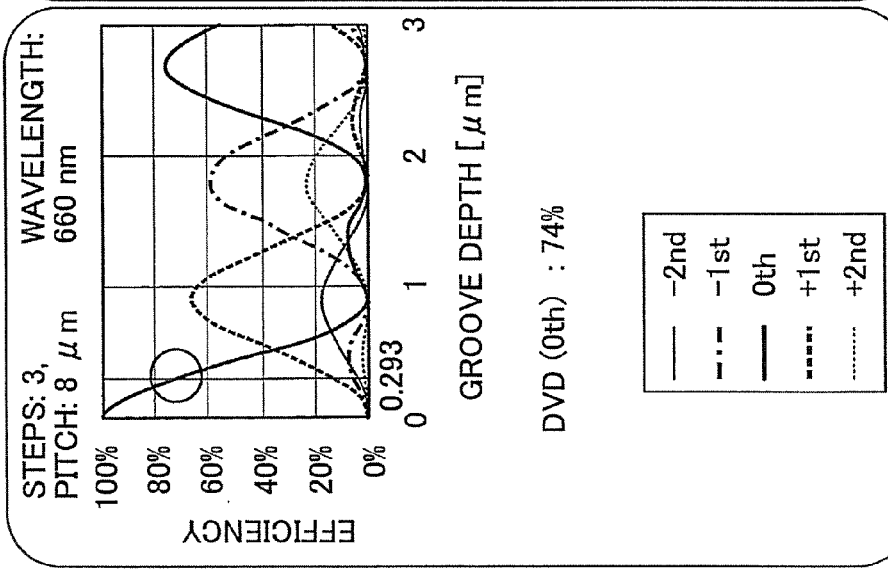
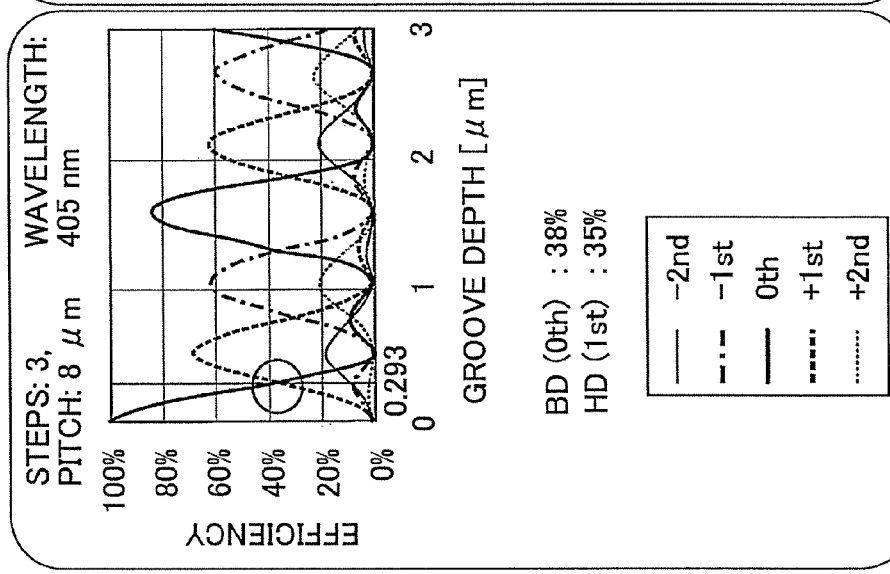

+0.2 λ
−0.2 λ

501'

DIFFRACTION PART

OPTICALLY EFFECTIVE DIAMETER
(CENTER ZONE 502a,
SECOND ZONE 502b,
AND THIRD ZONE 502c)

502g

DIFFRACTION PART
(CENTER ZONE 502a
AND
SECOND ZONE 502b)

+0.2 λ
−0.2 λ

502f
502e
502d

DIFFRACTION PART

OPTICALLY EFFECTIVE DIAMETER

PHASE DIFFERENCE [λ]

+0.2 λ
−0.2 λ

CIRCUMFERENCE DIRECTION 502d  502e

DIFFRACTION PART
OPTICALLY EFFECTIVE DIAMETER
(CENTER ZONE 502a, SECOND ZONE 502b, AND THIRD ZONE 502c)

DIFFRACTION PART
(CENTER ZONE 502a AND SECOND ZONE 502b)

DIFFRACTION PART
OPTICALLY EFFECTIVE DIAMETER

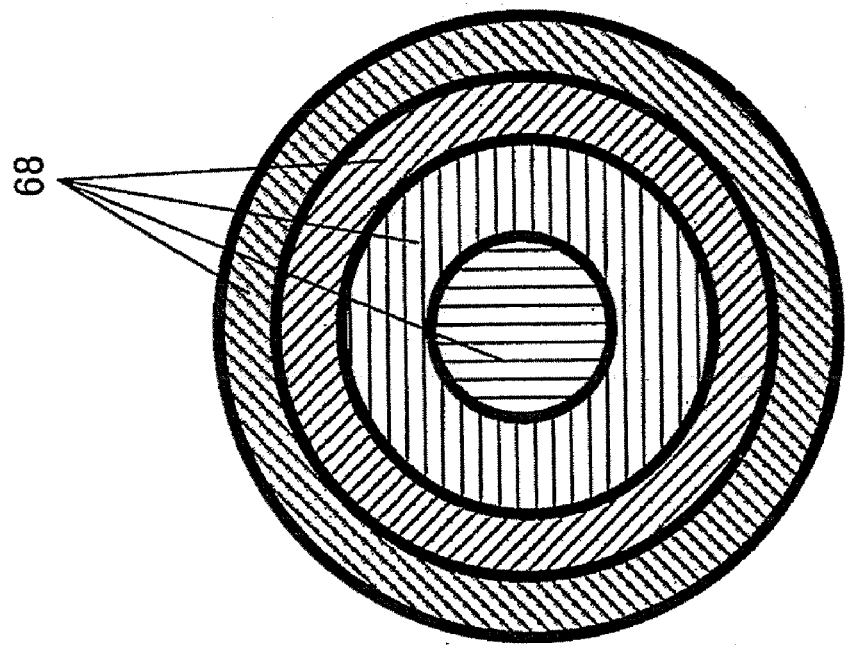
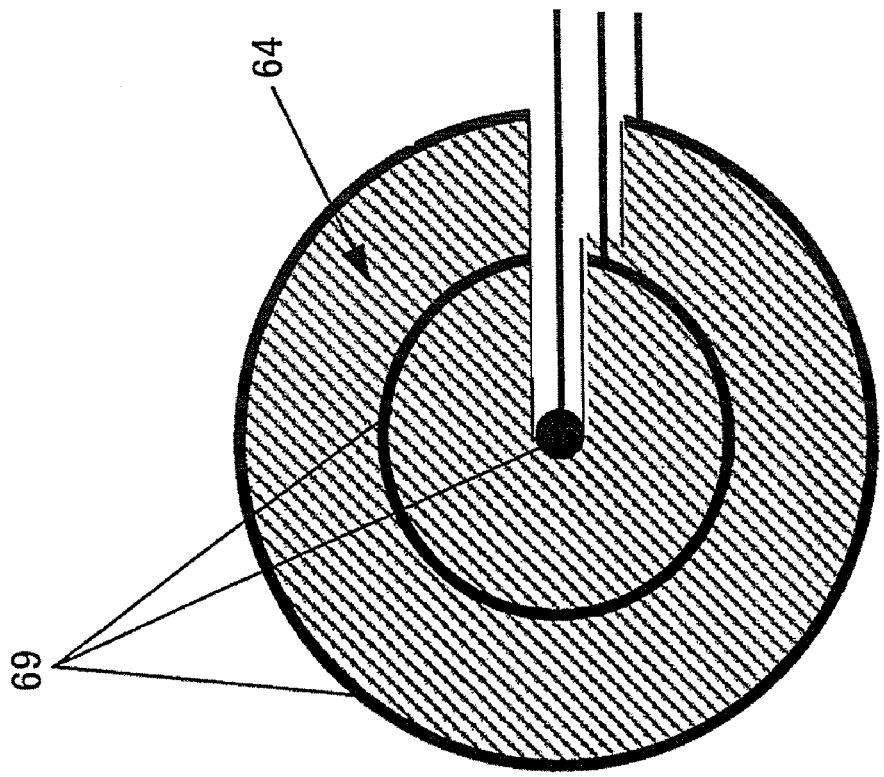
FIG.58B
FIG.58A

OPTICAL PICKUP AND OPTICAL INFORMATION PROCESSING APPARATUS

TECHNICAL FIELD

The present invention generally relates to an optical pickup for an optical information processing apparatus, and more particularly relates to an optical pickup and an optical information processing apparatus including the optical pickup that can record and/or reproduce information on various optical recording media having different substrate thicknesses and different recording densities by using light sources with different wavelengths.

BACKGROUND ART

Optical recording media, such as a CD with a storage capacity of 0.65 GB and a DVD with a storage capacity of 4.7 GB, have become popular as storage media for storing information such as video, audio, and computer data. Also, demand has become high for an optical recording medium with a higher recording density and a higher storage capacity.

One way to improve the recording density of an optical recording medium is to reduce the diameter of a light spot formed on an optical recording medium by an optical pickup used to write and read information onto/from the optical recording medium. The diameter of a light spot can be reduced by increasing the numerical aperture (NA) of an objective lens, which is used to focus light, of an optical pickup or by reducing the wavelength of a light source of an optical pickup.

For example, while a normal pickup for CDs includes an objective lens with an NA of 0.50 and a light source with a wavelength of 785 nm, a normal pickup for DVDs includes an objective lens with an NA of 0.65 and a light source with a wavelength of 660 nm. To further improve the recording density and storage capacity of an optical recording medium, it is necessary to make the NA of an objective lens larger than 0.65 or the wavelength of a light source shorter than 660 nm.

As described in patent document 1, two standards for high-capacity optical recording media and optical information processing apparatuses have been proposed. One of them is the Blu-ray Disc (BD) format that uses a light in the blue wavelength range and an objective lens with an NA of 0.85, and offers a storage capacity of up to 22 GB. The other one of them is the HD-DVD (HD) format that uses a light in the blue wavelength range and an objective lens with an NA of 0.65, and offers a storage capacity of up to 20 GB.

The BD format achieves a higher storage capacity than a conventional DVD format by using a light with a shorter wavelength and an objective lens with a larger NA. The HD format achieves a higher storage capacity than a conventional DVD format without increasing the NA of an objective lens by improving the track recording density through a unique signal processing method and by using a land/groove recording technology.

Both formats use a blue-violet semiconductor laser having an oscillation wavelength of about 405 nm. The substrate thickness of a Blu-ray disk is 0.1 mm and that of an HD-DVD is 0.6 mm.

When developing an optical pickup for recording and/or reproducing information on a Blu-ray disk or an HD-DVD, it is preferable to make the optical pickup compatible with conventional CDs and/or DVDs that have been widely used. Also, assuming both of the BD and HD formats become popular at the same time, an optical pickup is preferably designed to handle all of the BD, HD, DVD, and CD formats.

In this case, an optical pickup is preferably designed to select a light source having a suitable wavelength depending on the type of an optical recording medium, to perform appropriate optical processing on the light emitted from the selected light source, and thereby to correct the spherical aberration caused by the difference in substrate thickness of optical recording media.

Patent document 2 discloses an optical pickup that includes two objective lenses and is capable of recording and/or reproducing information on four different types of optical recording media.

[Patent document 1] Japanese Patent Application Publication No. 2005-339718

[Patent document 2] Japanese Patent Application Publication No. 2005-209299

However, using two objective lenses as disclosed in patent document 2 increases the number of parts in an optical pickup and therefore increases the size and costs of an optical pickup. Also, in the disclosed optical pickup, it is necessary to move the objective lenses according to the type of an optical recording medium. Such a configuration requires a complicated mechanism for an actuator and increases access time for reading/recording information.

Therefore, to reduce the size and costs, an optical pickup is preferably designed to record and/or reproduce information on different types of optical recording media using the same optical system.

DISCLOSURE OF THE INVENTION

The present invention provides an optical pickup and an optical information processing apparatus that substantially obviate one or more problems caused by the limitations and disadvantages of the related art.

Embodiments of the present invention provide an optical pickup that includes multiple light sources having wavelengths corresponding to different types of optical recording media with different substrate thicknesses and is capable of focusing light with a suitable numerical aperture (NA) on any one of the optical recording media by using one objective lens; and an optical information processing apparatus including the optical pickup.

An embodiment of the present invention provides an optical pickup for performing at least recording, reproduction, or deletion of information on multiple types of optical recording media, the multiple types of optical recording media being a first optical recording medium, a second optical recording medium, a third optical recording medium, and a fourth optical recording medium in descending order of recording density, which optical pickup includes a first light source configured to emit first light having a first wavelength $\lambda 1$ corresponding to the first and second optical recording media; a second light source configured to emit second light having a second wavelength $\lambda 2$ corresponding to the third optical recording medium; a third light source configured to emit third light having a third wavelength $\lambda 3$ corresponding to the fourth optical recording medium; an objective lens configured to focus the first light, the second light, and the third light on corresponding recording surfaces of the first, second, third, and fourth optical recording media; and an aberration correcting unit between the objective lens and the first, second, and third light sources; wherein $\lambda 1 < \lambda 2 < \lambda 3$ is true; and the aberration correcting unit has a first diffraction plane and a second diffraction plane, each of the first and second diffraction planes having at least one diffraction structure made of concentrically arranged orbicular ridges and grooves.

BRIEF DESCRIPTION OF THE DRAWINGS

FIG. 11A is a drawing illustrating light being focused on a CD;

FIG. 11B is a drawing illustrating a light spot formed on a CD;

FIGS. 14A through 14C are graphs showing the relationship between the groove depth and diffraction efficiency of a three-step diffraction structure for first light, second light, and third light, respectively;

FIGS. 58A and 58B are drawings illustrating exemplary electrode patterns of transparent electrode layers of the exemplary liquid crystal element;

BEST MODE FOR CARRYING OUT THE INVENTION

Preferred embodiments of the present invention are described below with reference to the accompanying drawings.

Figure 1:
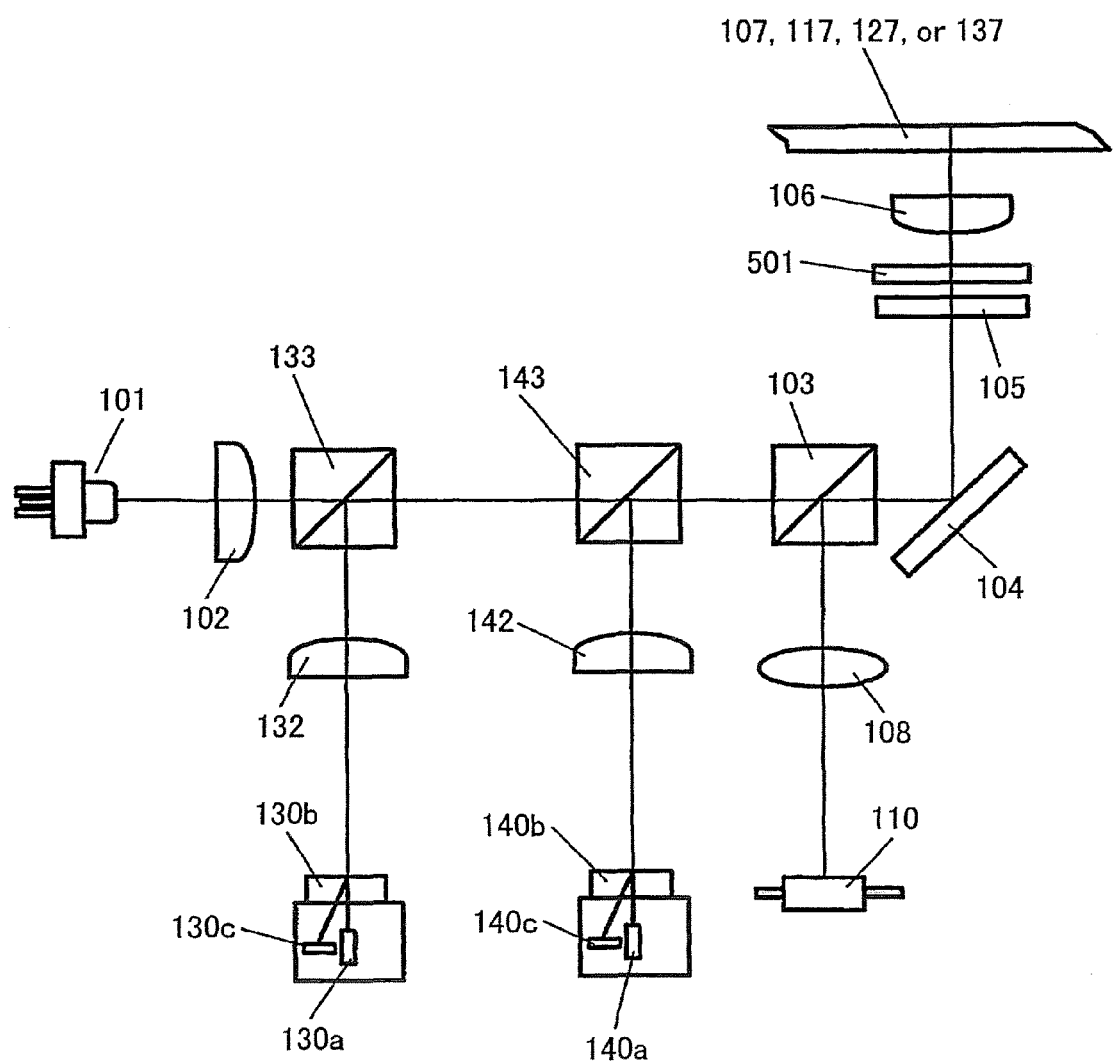
FIG. 1 is a drawing illustrating an exemplary configuration of an exemplary optical pickup according to a first embodiment of the present invention.

FIG. 1 is a drawing illustrating an exemplary configuration of an exemplary optical pickup according to a first embodiment of the present invention. The exemplary optical pickup shown in FIG. 1 is capable of recording and reproducing information on four types of optical recording media (optical recording media conforming to Blu-ray disc, HD-DVD, DVD, and CD standards; hereafter called a Blu-ray disk, an HD-DVD, a DVD, and a CD, respectively) with an objective lens 106 and light sources having different wavelengths by using different effective pupil radiuses.

A Blu-ray disk 107, an HD-DVD 117, a DVD 127, and a CD 137 have substrate thicknesses of 0.1 mm, 0.6 mm, 0.6 mm, and 1.2 mm, respectively. Numerical apertures suitable for the Blu-ray disk 107, the HD-DVD 117, the DVD 127, and the CD 137 are 0.85, 0.65, 0.65, and 0.45, respectively. Wavelengths λ1, λ2, and λ3 of first light, second light, and third light from first, second, and third light sources used for recording on the optical recording media are 405 nm, 660 nm, and 785 nm, respectively.

For the Blu-ray disk 107 and the HD-DVD 117, a semiconductor laser 101, a collimator lens 102, a prism 104, a ¼ wavelength plate 105, an objective lens 106, a polarization beam splitter 103, a detection lens 108, a light receiving element 110, and aberration correcting unit 501 constitute an optical pickup. The semiconductor laser 101 is used as the first light source and has a center wavelength of 405 nm. The NA of the objective lens 106 is set at 0.85 for the Blu-ray disk 107 and at 0.65 for the HD-DVD 117. The NA of the objective lens 106 is controlled by the aberration correcting unit 501. The substrate thickness of the Blu-ray disk 107 is 0.1 mm and that of the HD-DVD 117 is 0.6 mm.

Light emitted from the semiconductor laser 101 is substantially collimated by the collimator lens 102. The collimated light enters the polarization beam splitter 103 and is then deflected by the prism 104. The deflected light is focused via the ¼ wavelength plate 105, the aberration correcting unit 501, and the objective lens 106 on the Blu-ray disk 107 or the HD-DVD 117 to record or reproduce information. Light reflected from the Blu-ray disk 107 or the HD-DVD 117 passes through the objective lens 106 and the ¼ wavelength plate 105, is deflected by the polarization beam splitter 103 in a direction different from that of incoming light, and is guided by the detection lens 108 to the light receiving element 110. Then, the light receiving element 110 detects a reproduction signal, a focus error signal, and a track error signal from the reflected light.

In the case of the DVD 127, light emitted from a semiconductor laser 130a with a center wavelength of 660 nm passes through a divergence angle conversion lens 132 and a wavelength-selective beam splitter 133, and is deflected by the prism 104. The deflected light is focused via the ¼ wavelength plate 105, the aberration correcting unit 501, and the objective lens 106 on the DVD 127. The substrate thickness of the DVD 127 is 0.6 mm and the NA of the objective lens 106 for the DVD 127 is 0.65. The NA of the objective lens 106 is controlled by the aberration correcting unit 501. Light reflected from the DVD 127 passes through the objective lens 106 and the ¼ wavelength plate 105, is deflected by the wavelength-selective beam splitter 133, is deflected by a hologram element 130b in a direction different from that of incoming light, and is thereby guided to a light receiving element 130c. Then, the light receiving element 130c detects a reproduction signal, a focus error signal, and a track error signal from the reflected light.

In the case of the CD 137, light emitted from a semiconductor laser 140a with a center wavelength of 785 nm passes through a divergence angle conversion lens 142 and a wavelength-selective beam splitter 143, and is deflected by the prism 104. The deflected light is focused via the ¼ wavelength plate 105, the aberration correcting unit 501, and the objective lens 106 on the CD 137. The substrate thickness of the CD 137 is 1.2 mm and the NA of the objective lens 106 for the CD 137 is 0.45. The NA of the objective lens 106 is controlled by the aberration correcting unit 501. Light reflected from the CD 137 passes through the objective lens 106 and the ¼ wavelength plate 105, is deflected by the wavelength-selective beam splitter 143, is deflected by a hologram element 140b in a direction different from that of incoming light, and is thereby guided to a light receiving element 140c. Then, the light receiving element 140c detects a reproduction signal, a focus error signal, and a track error signal from the reflected light.

The objective lens 106 is optimally designed to accurately record and reproduce information on the Blu-ray disk 107 having a substrate thickness of 0.1 mm. The design wavelength of the objective lens 106 is 405 nm. For light with a wavelength of 405 nm, the objective lens 106 contains wavefront aberration equal to or lower than 0.01λ rms. Although the objective lens 106 is optimally designed to accurately record and reproduce information on the Blu-ray disk 107 having a substrate thickness of 0.1 mm in this embodiment, the objective lens 106 may be designed otherwise. For example, when a Blu-ray disk having two information recording layers positioned at 0.075 mm and 0.1 mm, respectively, from an incidence plane is used, an objective lens may be optimally designed for a substrate thickness of 0.0875 mm that is an intermediate value between 0.075 mm and 0.1 mm.

Both surfaces of the objective lens 106 of this embodiment are aspheric. In an orthogonal coordinate system where the origin is the vertex of the aspheric surface and the X axis represents the optical axis direction from a light source to an optical recording medium, when r is a paraxial curvature radius, κ is a constant of the cone, and A, B, C, D, E, F, G, H, J, . . . are aspheric surface coefficients, the aspheric surface of the objective lens 106 is obtained from the relationship between a distance x in the optical axis direction and a radius R of the aspheric surface by using the following formula (1):

$$x = \frac{\frac{1}{r}R^2}{1 + \sqrt{1-(1+\kappa)\frac{1}{r^2}R^2}} + AR^4 + BR^6 + CR^8 + DR^{10} +$$

[Formula 1]

$$ER^{12} + FR^{14} + GR^{16} + HR^{18} + JR^{20} + \ldots$$

$$R = \sqrt{y^2 + z^2}$$

Data on the aspheric surfaces and the values of the coefficients are shown in table 1 below.

TABLE 1

| Surface No. | Surface type | curvature radius [mm] | Spacing | Material |
|---|---|---|---|---|
| First surface | Aspheric | 2.083 | 3.5 | KVC81 (Sumita Optical Glass, Inc.) |
| Second surface | Aspheric | −10.651 | | |

Glass (KVC81, Sumita Optical Glass, Inc.) is used as the lens material. The effective pupil radius of the objective lens 106 is 2.15 mm. As the material of the objective lens 106, resin may be used instead of glass.

Figure 2:
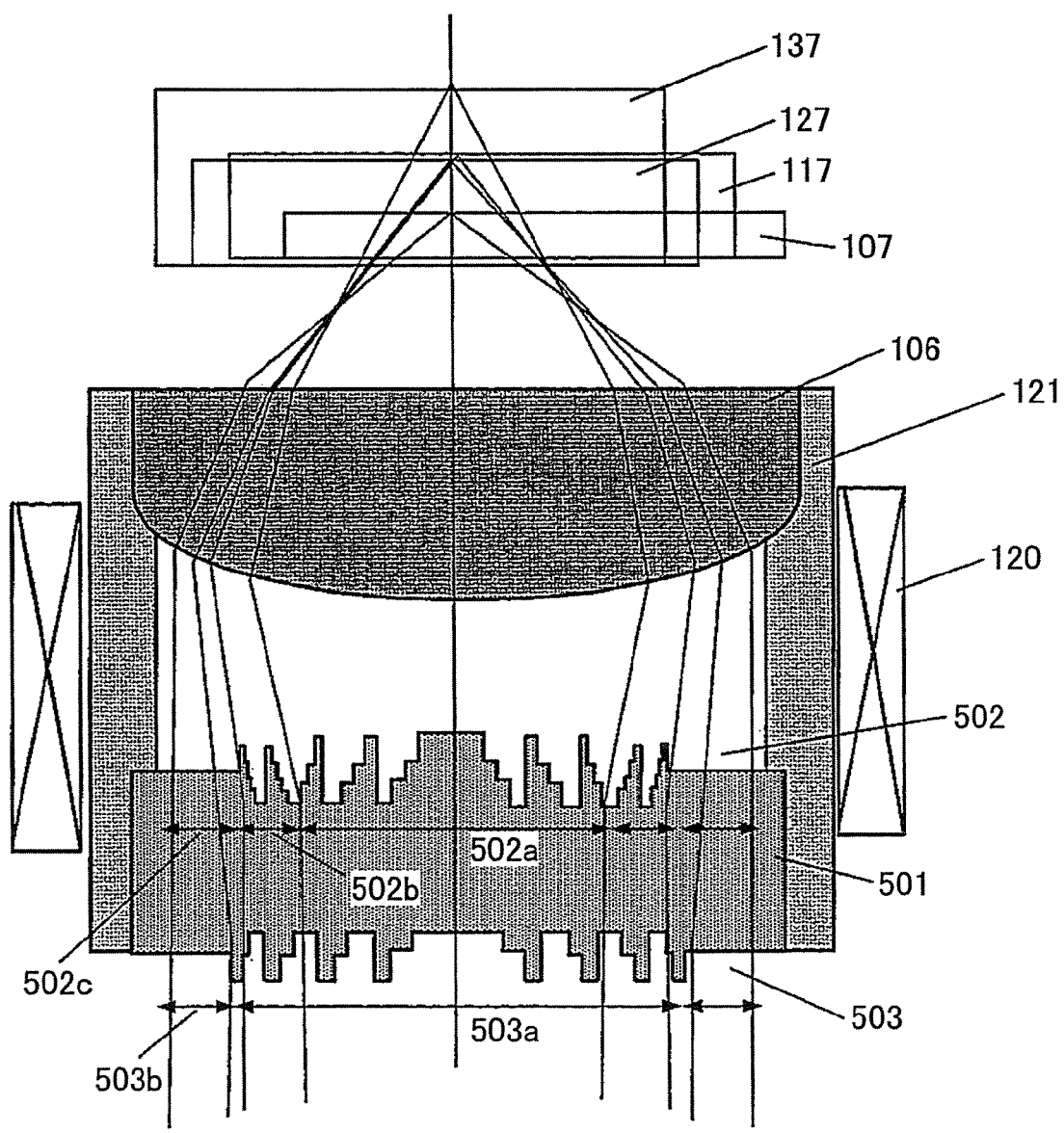
FIG. 2 is a cut-away side view of a first exemplary aberration correcting unit and an objective lens.
Figure 3:
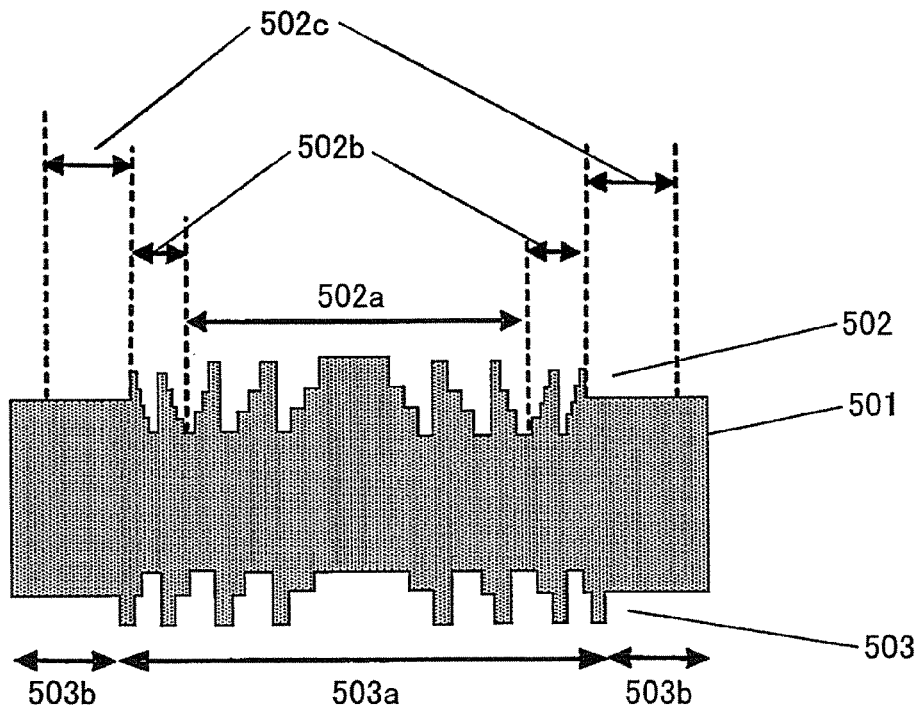
FIG. 3 is an enlarged cut-away side view of the first exemplary aberration correcting unit.
Figure 4:
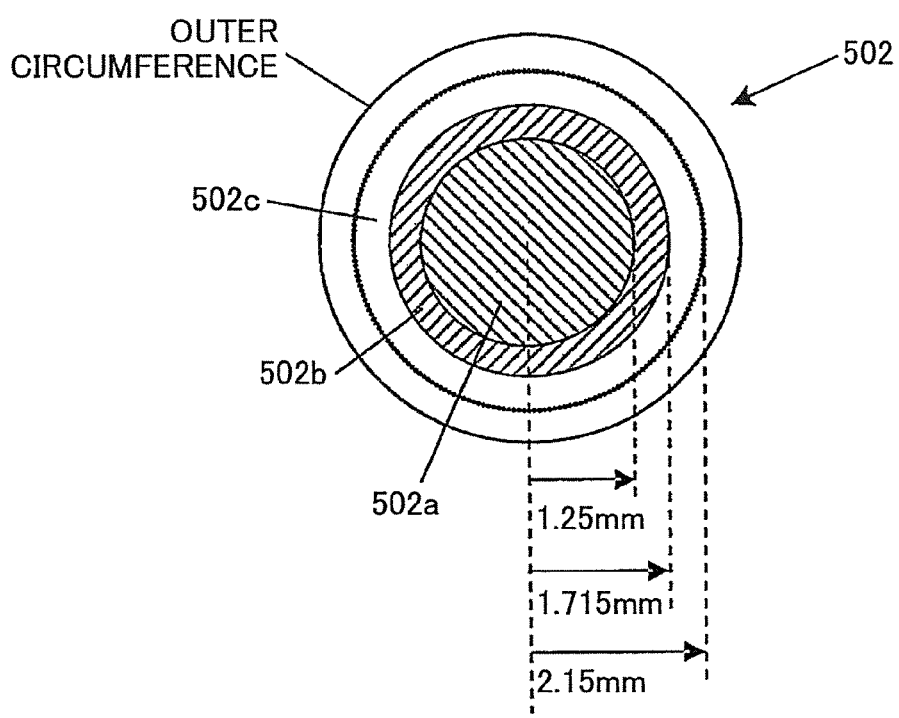
FIG. 4 is a drawing illustrating a first diffraction plane of the first exemplary aberration correcting unit.
Figure 5:
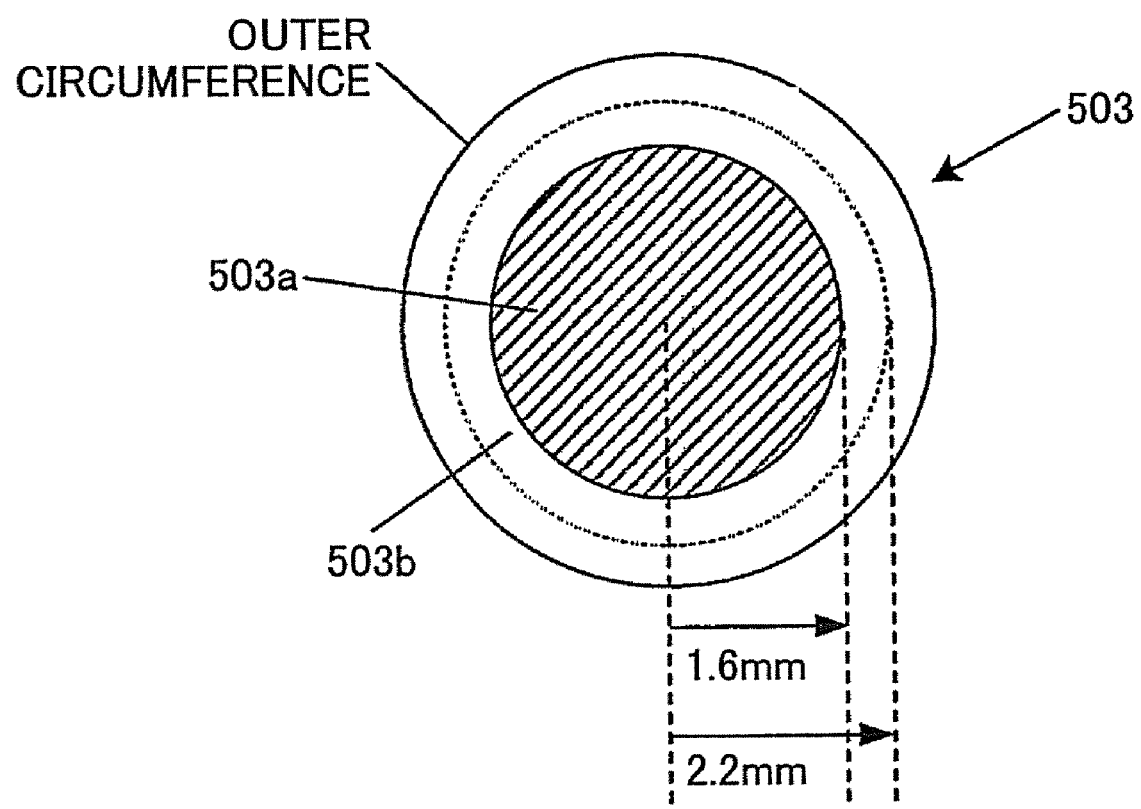
FIG. 5 is a drawing illustrating a second diffraction plane of the first exemplary aberration correcting unit.

FIGS. 2 through 5 are drawings used to describe the aberration correcting unit 501 according to the first embodiment. FIGS. 2 and 3 are enlarged cut-away side views of the aberration correcting unit 501 and FIGS. 4 and 5 show diffraction planes of the aberration correcting unit 501.

The aberration correcting unit 501 is configured to correct spherical aberration of light emitted from the semiconductor laser 101 with a wavelength of 405 nm to the HD-DVD 117, which spherical aberration is caused by the objective lens 106 because of difference in substrate thickness; spherical aberration of light emitted from the semiconductor laser 130a with a center wavelength of 660 nm to the DVD 127, which spherical aberration is caused by the differences in substrate thickness and wavelength; and spherical aberration of light emitted from the semiconductor laser 140a with a center wavelength of 785 nm to the CD 137, which spherical aberration is caused by the differences in substrate thickness and wavelength (in other words, spherical aberration occurs when the light passes through the objective lens 106 and the substrate of an optical recording medium other than the Blu-ray disk 107). Also, the aberration correcting unit 501 adjusts the NA of the objective lens 106 to suit each optical recording medium.

FIG. 2 is an enlarged cut-away side view of the aberration correcting unit 501 and the objective lens 106. As shown in FIG. 2, the aberration correcting unit 501 and the objective lens 106 are coaxially joined by a cylindrical lens barrel 121. More specifically, the aberration correcting unit 501 is attached to one end of the lens barrel 121 and the objective lens 106 is attached to the other end of the lens barrel 121. The optical axes of the aberration correcting unit 501 and the objective lens 106 are aligned. The surface of the objective lens 106 facing toward the inside of the lens barrel 121 has a convex shape.

When recording or reproducing information on the Blu-ray disk 107, the HD-DVD 117, the DVD 127, or the CD 137, the objective lens 106 is moved by a tracking mechanism within a range of about ±0.5 mm along the optical axis. Since light directed toward the HD-DVD 117, the DVD 127, or the CD 137 is diffracted by the aberration correcting unit 501, if only the objective lens 106 is moved and the aberration correcting unit 501 is left in the original position, aberration occurs and the light spot is degraded.

In this embodiment, to obviate this problem, the aberration correcting unit 501 and the objective lens 106 are joined by the lens barrel 121 so that they are moved together. Instead of the lens barrel 121, a flange may be provided on the aberration correcting unit 501 and/or the objective lens 106 to join them together. Also, the objective lens 106, the lens barrel 121, and the aberration correcting unit 501 may joined integrally.

In this embodiment, each of the first light, the second light, and the third light enters the aberration correcting unit 501 as collimated light. Using collimated light instead of divergent or convergent light prevents coma aberration that may occur when the objective lens 106 and the aberration correcting unit 501 are misaligned as a result of tracking control during the recording or reproduction of information on an optical recording medium. However, the exemplary optical pickup of this embodiment may be configured to use divergent light or convergent light.

FIG. 3 is an enlarged cut-away side view of the aberration correcting unit 501. The aberration correcting unit 501 has a first diffraction plane 502 and a second diffraction plane 503 on each of which a diffraction structure is formed. The positions of the first diffraction plane 502 and the second diffraction plane 503 may be reversed. Also, the first diffraction plane 502 and the second diffraction plane 503 may be provided on different components. A diffraction plane is a surface having a diffraction structure (or a diffraction grating) made of narrow ridges and grooves. It is not necessary to form the diffraction structure on the entire surface. The diffraction structure may be formed on part of a flat surface or a curved surface.

Resin may be used as the material of the aberration correcting unit 501. Resin is normally lighter than glass and easy to mold, and is therefore suitable for mass production. In this embodiment, since the aberration correcting unit 501 is mounted on a moving part 120 and is moved together with the objective lens 106, it is preferable to make the aberration correcting unit 501 as light as possible. As a resin material, polymethylmethacrylate (PMMA) may be used. PMMA is highly transparent, weather resistant, and suitable for injection molding, and is therefore widely used for optical components. Also, ZEONEX (registered trademark) of ZEON Corporation has low hygroscopicity and is preferable as a resin material. Further, optical plastics including ultraviolet curing resin and optical glass may also be used as the material of the aberration correcting unit 501.

As shown in FIG. 4, the first diffraction plane 502 has the following three concentric zones within an area through which light passes: a center zone 502a, a second zone 502b that is second from the center, and a third zone 502c that is third from the center.

The center zone 502a has a radius of 1.25 mm and corresponds to an NA of 0.45 for the CD 137. A diffraction structure formed in the center zone 502a is designed to transmit the first light with a wavelength of 405 nm without change and to diffract the second light and the third light to correct spherical aberration caused by the difference in substrate thickness of the DVD 127 and the CD 137 and the difference in wavelength of the second light and the third light.

The second zone 502b has an inner radius of 1.25 mm and an outer radius of 1.715 mm and corresponds to an NA of between 0.45 for the CD 137 and 0.65 for the DVD 127. A diffraction structure formed in the second zone 502b is designed to transmit the first light with a wavelength of 405 nm without change, to diffract the second light to correct spherical aberration caused by the difference in substrate thickness of the DVD 127 and the difference in wavelength of the second light, and so as not to focus the third light on the recording surface of the CD 137.

The third zone 502c has an inner radius of 1.715 mm and an outer radius of 2.15 mm and corresponds to an NA of between 0.65 for the DVD 127 and 0.85 for the Blu-ray disk 107. The third zone 502c is a flat surface where no diffraction structure is formed and is designed to transmit the first light, the second light, and the third light without change. Light transmitted by the third zone 502c is focused on the Blu-ray disk 107 by the objective lens 106, but not focused on the HD-DVD 117, the DVD 127, and the CD 137.

In other words, the first diffraction plane 502 is designed to correct aberration of the second light and the third light and to adjust the NA of the objective lens 106 for the DVD 127 and the CD 137. Thus, the first diffraction plane 502 makes it possible to form a desirable light spot on the DVD 127 and the CD 137.

The aberration correcting unit 501 corrects aberration by diffracting incoming collimated light in divergent directions. More specifically, the aberration correcting unit 501 corrects aberration by making the aberration of divergent light entering the objective lens 106 and the aberration caused by the differences in substrate thickness and wavelength to have opposite polarities. In this embodiment, the aberration correcting unit 501 is configured to cause light to enter the objective lens 106 as divergent light so that the working distance (WD) between the objective lens 106 and an optical recording medium can be increased ("Working distance" (WD) in this case means a distance an objective lens can move in the optical axis direction). This configuration is preferable when focusing light using the objective lens 106 with a high NA on an optical recording medium having a large thickness such as the CD 137.

As shown by the cut-away side view in FIG. 3, the center zone 502a of the aberration correcting unit 501 is made up of concentrically arranged orbicular ridges and grooves. The orbicular ridges or grooves each have a step-like structure made of four steps including the lowest step (level). The pitches between the orbicular ridges become gradually narrower from the center to the outer circumference so that the diffraction structure made of the orbicular ridges and grooves have a lens effect.

The pitches are so determined that −1st order diffracted light is produced and used for the DVD 127 and −2nd order diffracted light is produced and used for the CD 137. In other words, the pitches are determined so that the aberration of light for the DVD 127 and the CD 137 is corrected.

Figure 6:
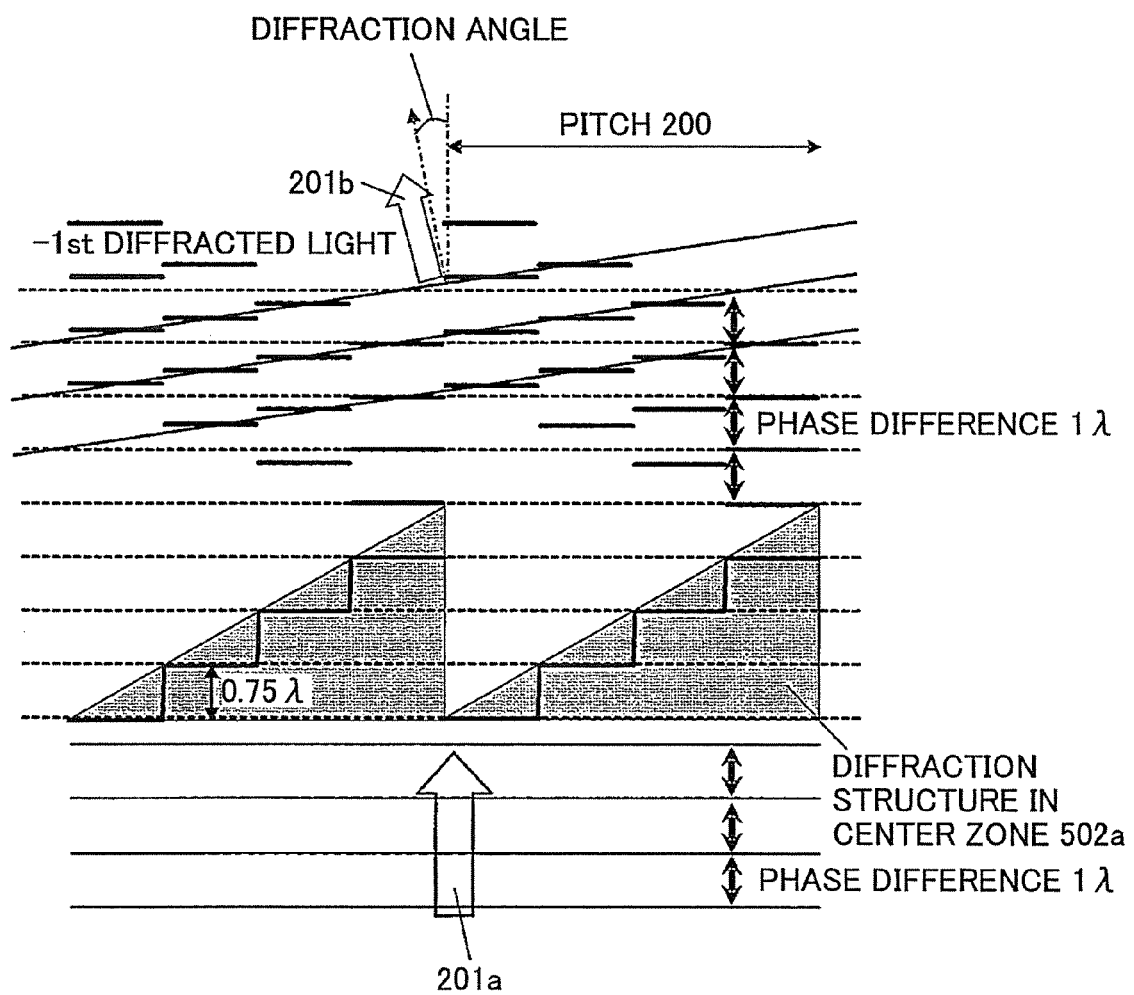
FIG. 6 is a drawing illustrating a wavefront of −1st order diffracted light of incoming light passing through a four-step diffraction structure.

Descriptions of −1st order diffracted light are given below with reference to FIG. 6. FIG. 6 is a drawing illustrating a wavefront of −1st order diffracted light of incoming light 201a passing through a four-step diffraction structure. When the incoming light 201a passes through the four-step diffraction structure, phase differences corresponding to the four steps occur in the wavefront of the incoming light 201a. As a result, −1st order diffracted light as shown by outgoing light 201b is produced. The height of each step of the four-step diffraction structure is determined so as to cause a phase difference of 0.75λ.

Figure 7:
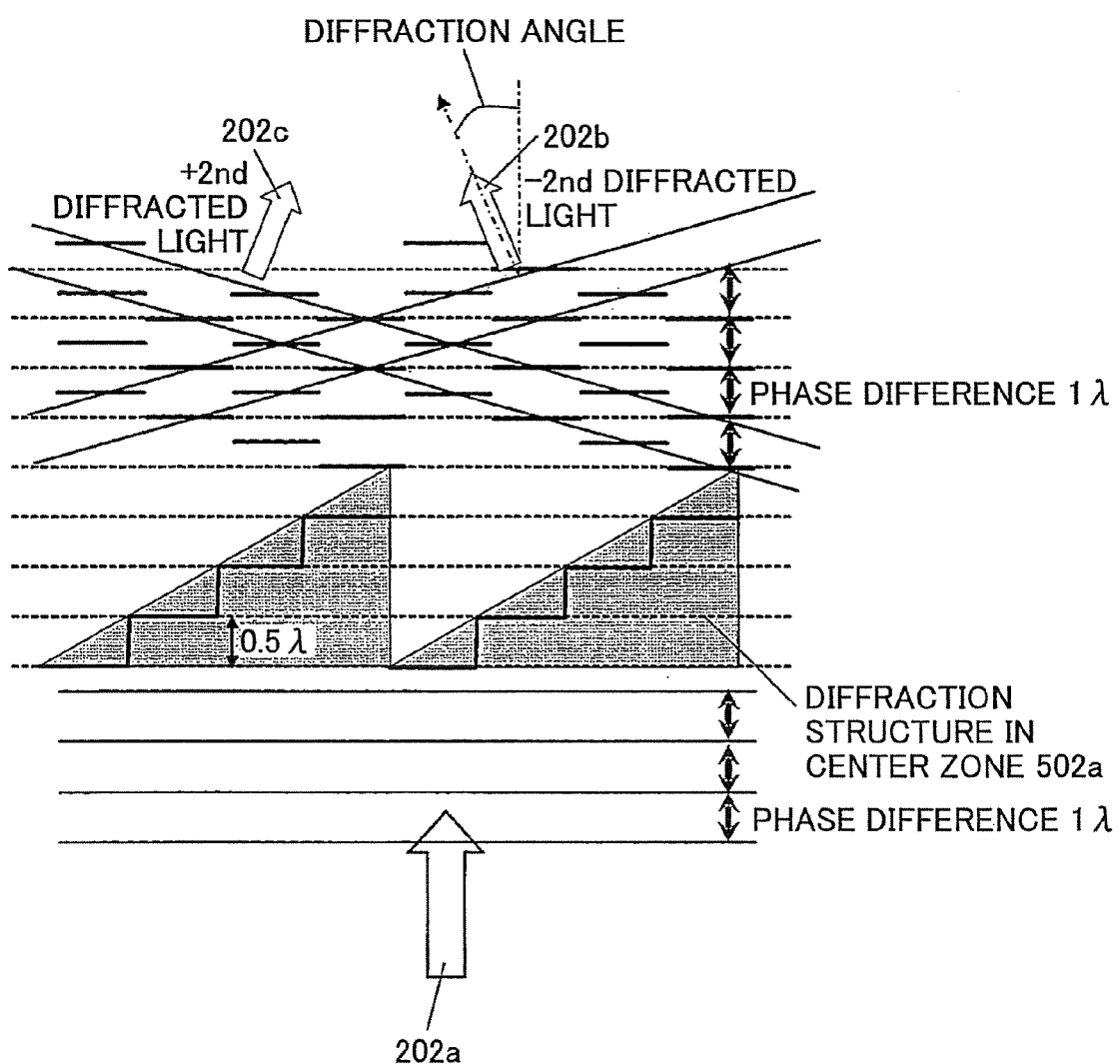
FIG. 7 is a drawing illustrating a wavefront of ±2nd order diffracted light of incoming light passing through a four-step diffraction structure.

Descriptions of −2nd order diffracted light are given below with reference to FIG. 7. FIG. 7 is a drawing illustrating a wavefront of ±2nd order diffracted light of incoming light 202a passing through a four-step diffraction structure. When the incoming light 202a passes through the four-step diffraction structure, phase differences corresponding to the four steps occur in the wavefront of the incoming light 202a. As a result, −2nd order diffracted light and +2nd order diffracted light as shown by outgoing light 202b and outgoing light 202c, respectively, are produced. The height of each step of the four-step diffraction structure is determined so as to cause a phase difference of 0.5λ.

The pitches between the orbicular ridges of the above four-step diffraction structures are so determined that the produced −1st order diffracted light is focused by the objective lens 106 accurately on the DVD 127 and the produced −2nd order diffracted light is focused by the objective lens accurately on the CD 137.

The optical path difference function of the first diffraction plane 502 is expressed by the following formula (2):

$$\phi = C_1 R^2 + C_2 R^4 + C_3 R^6 + C_4 R^8 + C_5 R^{10} + C_6 R^{12} + \ldots R = \sqrt{y^2 + z^2}$$ [Formula 2]

Formula 2 is based on an orthogonal coordinate system where the origin is a point at which a plane intersects orthogonally with the optical axis and the X axis represents the optical axis direction. In formula 2, $\phi$ is an optical path difference function, R is a radius (distance from the optical axis), and $C_1, C_2, \ldots$ are optical path difference coefficients. Optical path difference coefficients of the center zone 502a are shown in table 2 below. The minimum pitch between the orbicular ridges in the center zone 502a is 21 μm and the number of the orbicular ridges is 28. The number of the orbicular ridges is the number of cycles (one cycle: pitch 200 shown in FIG. 6) in a diffraction structure.

TABLE 2

| Production wavelength | 660 nm |
|---|---|
| Optical path difference coefficients | C1: 1.2788E−02 |
| | C2: −2.3924E−03 |
| | C3: 2.2326E−03 |
| | C4: −1.0025E−03 |
| | C5: 2.1158E−04 |
| | C6: −1.7342E−05 |

As it is obvious from FIGS. 6 and 7, when the pitch is the same, the diffraction angle becomes larger as the absolute value of the diffraction order increases. The spherical aberration of the third light for the CD 137 is larger than the spherical aberration of the second light for the DVD 127 because of the difference in substrate thickness and the difference in wavelength.

Therefore, the spherical aberration of both the second light and the third light can be corrected with the same structure by making the order of diffracted light used for the CD 137 higher than that of the diffracted light used for the DVD 127. In other words, when the orders of the most intense diffracted light of the first light, second light, and third light are N11, N12, and N13, respectively, it is preferable that |N11|<|N12|<|N13| be true.

In the first embodiment, the diffraction orders N11, N12, and N13 are 0, −1, and −2, respectively. The smaller the diffraction order, the higher the diffraction efficiency becomes.

As shown by the cut-away side view in FIG. 3, the second zone 502b of the aberration correcting unit 501 is made up of concentrically arranged orbicular ridges and grooves. The orbicular ridges or grooves each have a step-like structure made of five steps including the lowest step (level). The pitches between the orbicular ridges become gradually narrower from the center to the outer circumference so that the diffraction structure made of the orbicular ridges and grooves have a lens effect.

The pitches are so determined that the aberration of the second light for the DVD 127 is corrected. In other words, when the orders of the most intense diffracted light of the first light and the second light are N21 and N22, respectively, the pitches are so determined that |N21|<|N22| becomes true. In the first embodiment, the diffraction orders N21 and N22 are 0 and +1, respectively.

Optical path difference coefficients of the second zone 502b are shown in table 3 below.

TABLE 3

| Production wavelength | 405 nm |
|---|---|
| Optical path difference coefficients | C1: 1.4489E−02 |
| | C2: 5.2486E−04 |
| | C3: −3.1683E−04 |
| | C4: 1.6526E−04 |
| | C5: −5.4715E−05 |
| | C6: 6.9544E−06 |

The depth of step-like grooves in the second zone 502b is so determined that the diffraction structure does not produce −2nd order diffracted light and thereby limits the NA for the CD 137. The details of this structure are described later. The minimum pitch between the orbicular ridges in the second zone 502b is 17.8 μm and the number of the orbicular ridges is 24.

Figure 8:
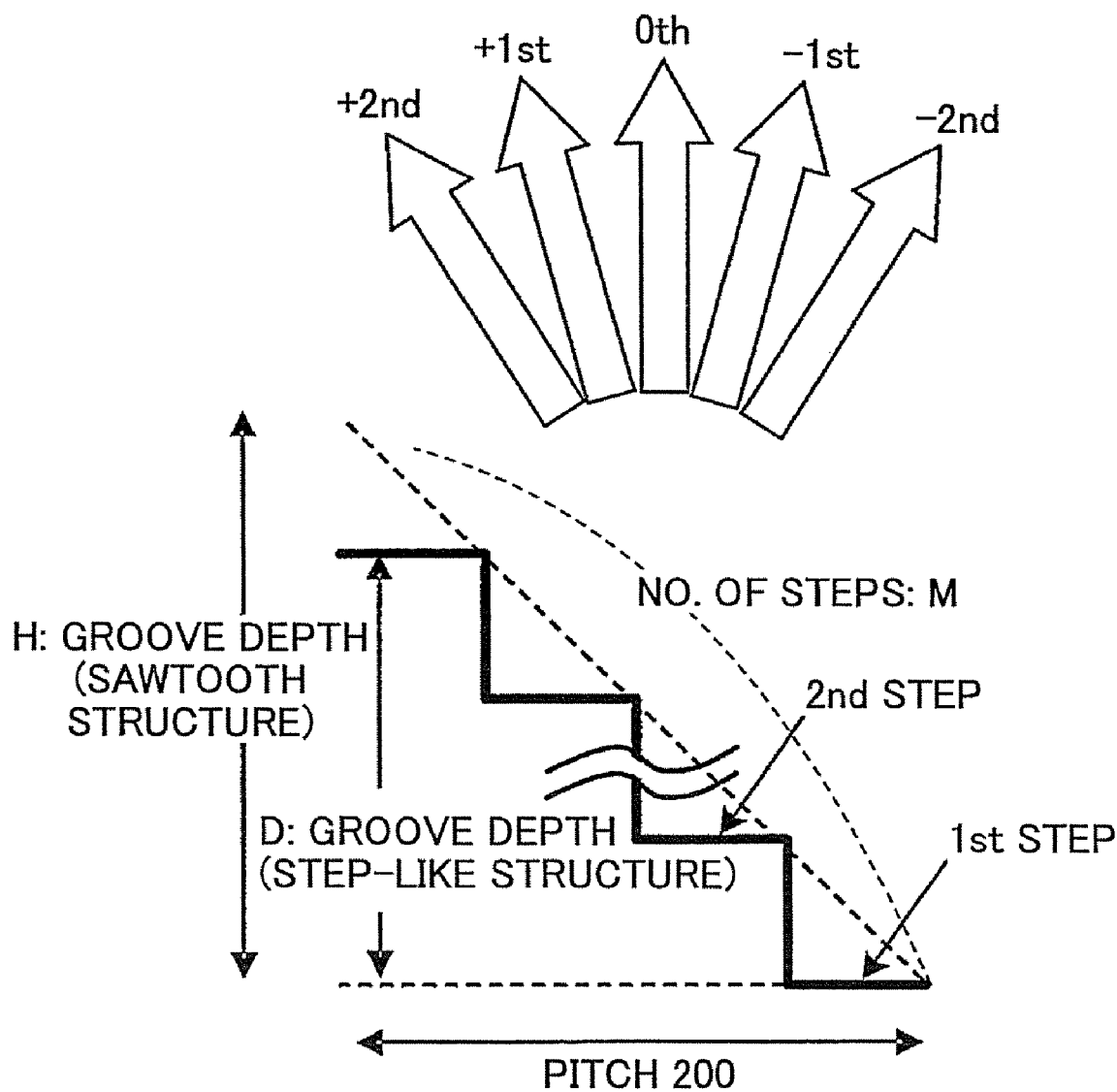
FIG. 8 is a drawing used to describe the height of orbicular ridges or the depth of orbicular grooves (groove depth) in a diffraction plane.

The height of the orbicular ridges or the depth of the orbicular grooves (groove depth) in the first diffraction plane 502 is described below with reference to FIG. 8. In a diffractive optical system, the ratio of outgoing light to the total energy of incoming light is called diffraction efficiency. When a sawtooth kinoform structure shown by a dotted line in FIG. 8 is blazed for a certain wavelength, its diffraction efficiency for light with the wavelength becomes theoretically 100% in thin-layer approximation. As shown in FIG. 8, each of the orbicular ridges in the first diffraction plane 502 has a step-like structure. The first diffraction plane 502 is designed to efficiently produce 0th order diffracted light from the first light with a wavelength of 405 nm and to efficiently produce ±1 or higher diffracted light from the second light with a wavelength of 660 nm or the third light with a wavelength of 785 nm.

In this embodiment, a step-like structure is an approximation of a sawtooth kinoform structure (sawtooth structure) and a slope direction of a step-like structure indicates a slope direction of a sawtooth structure. Forming a step-like structure is easier than forming a perfect kinoform structure. 0th order diffracted light is transmitted light having the same direction as that of incoming light.

The center zone 502a of the first diffraction plane 502 is preferably designed so that the absolute value of the diffraction order N12 at which the diffraction efficiency for the second light becomes highest is smaller than the absolute value of the diffraction order N13 at which the diffraction efficiency for the third light becomes highest (|N12|<|N13|). Also, the center zone 502a is preferably designed to use 0th order diffracted light of the first light. Therefore, the height of orbicular ridges or the depth of orbicular grooves of a diffraction structure is preferably determined so that the diffraction efficiency for desired diffracted light of each of the first light, the second light, and the third light becomes as high as possible.

In a four-step diffraction structure, when the groove depth of a sawtooth structure is H, the groove depth of a step-like structure is D, and the number of steps in a step-like structure is M as shown in FIG. 8, to provide the maximum diffraction efficiencies for 0th order diffracted light, −1st order diffracted light, +1st order diffracted light, and ±2nd order diffracted light, the phase difference by the groove depth H of the sawtooth structure and the phase difference per step of the step-like structure are preferably determined as shown in table 4 below.

TABLE 4

| Diffraction order | Four steps | |
|---|---|---|
| | Phase difference by H | Phase difference per step |
| 0th order | 4λ, 8λ, . . . | Nλ |
| −1st order | 3λ, 7λ, . . . | (0.75 + N)λ |
| +1st order | 1λ, 5λ, . . . | (0.25 + N)λ |
| ±2nd order | 2λ, 6λ, . . . | (0.5 + N)λ |

*N indicates an integer

Table 5 below shows generalized phase differences per step in an M-step diffraction structure. Diffracted light of a desired diffraction order can be most efficiently obtained by setting the height of a step according to Table 5.

TABLE 5

| Diffraction order | Digital blaze Phase difference per step |
|---|---|
| 0th order | MNλ |
| −1st order | ((M − 1)/M + N)λ |
| +1st order | (1/M + N)λ |
| −2nd order | ((M − 2)/M + N)λ |
| +2nd order | (2/M + N)λ |

*N indicates an integer

In a four-step diffraction structure, the phase difference per step for the first light with a wavelength of 405 nm is preferably obtained as an integral multiple (N1) of the wavelength so that the 0th order diffraction efficiency is maximized. The phase difference per step for the second light with a wavelength of 660 nm is preferably obtained by adding 0.75 times the wavelength and an integral multiple (N2) of the wavelength so that the −1st order diffraction efficiency is maximized. Or, the phase difference per step for the second light is preferably obtained by adding 0.25 times the wavelength and an integral multiple (N2) of the wavelength so that the +1st order diffraction efficiency is maximized. The phase difference per step for the third light with a wavelength of 785 nm is preferably obtained by adding 0.5 times the wavelength and an integral multiple (N3) of the wavelength so that the ±2nd order diffraction efficiency is maximized. In short, as shown in FIGS. 6 and 7, the diffraction efficiency for light of a certain diffraction order can be maximized by setting the height of a step in a diffraction structure according to the number of steps of the diffraction structure in such a manner that a desired phase difference is obtained.

Thus, the height of orbicular ridges or the depth of orbicular grooves of a diffraction structure is preferably determined so that the diffraction efficiency for desired diffracted light of each of the first light, the second light, and the third light becomes as high as possible. As described above, a four-step diffraction structure of this embodiment is designed to use −1st order diffracted light of the second light and −2nd order diffracted light of the third light.

Figure 9A:
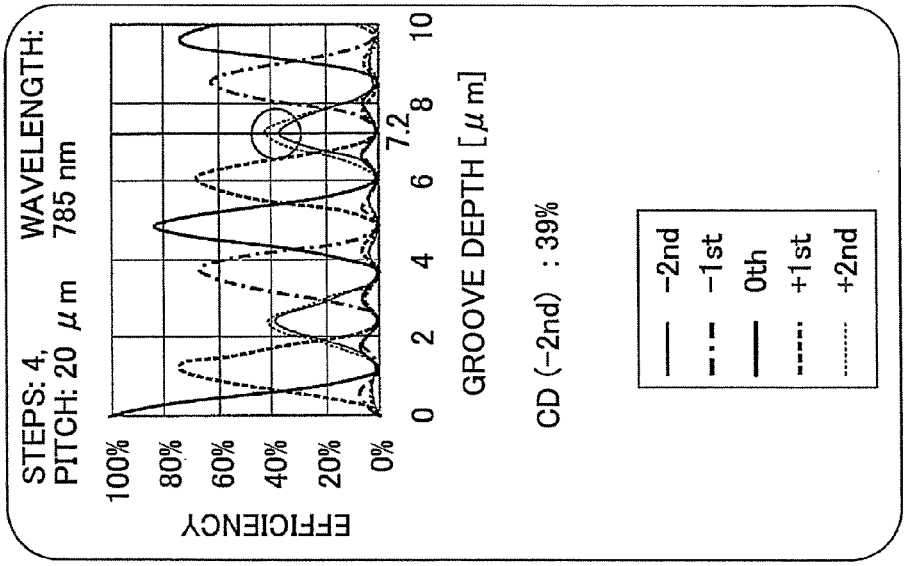
FIGS. 9A through 9C are graphs showing the relationship between the groove depth and diffraction efficiency of a four-step diffraction structure for first light, second light, and third light, respectively.
Figure 9B:
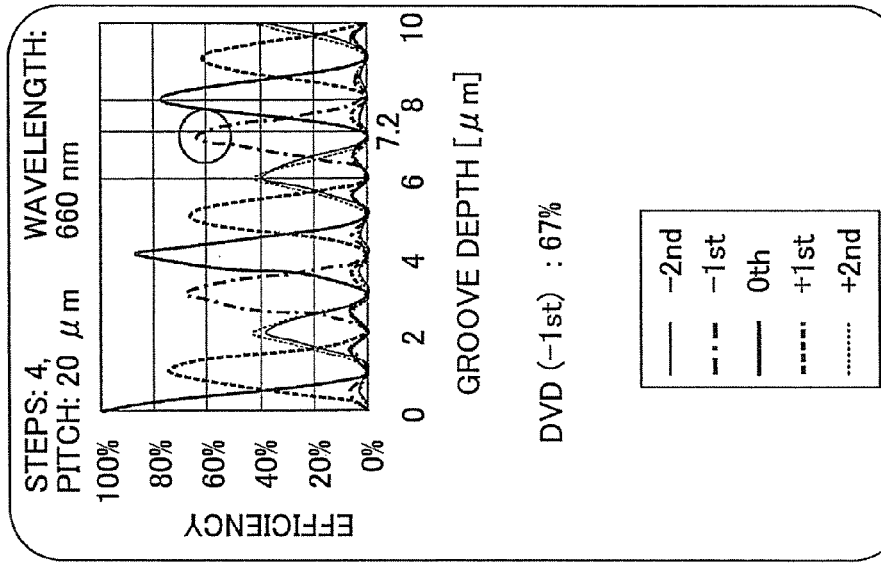
Figure 9C:
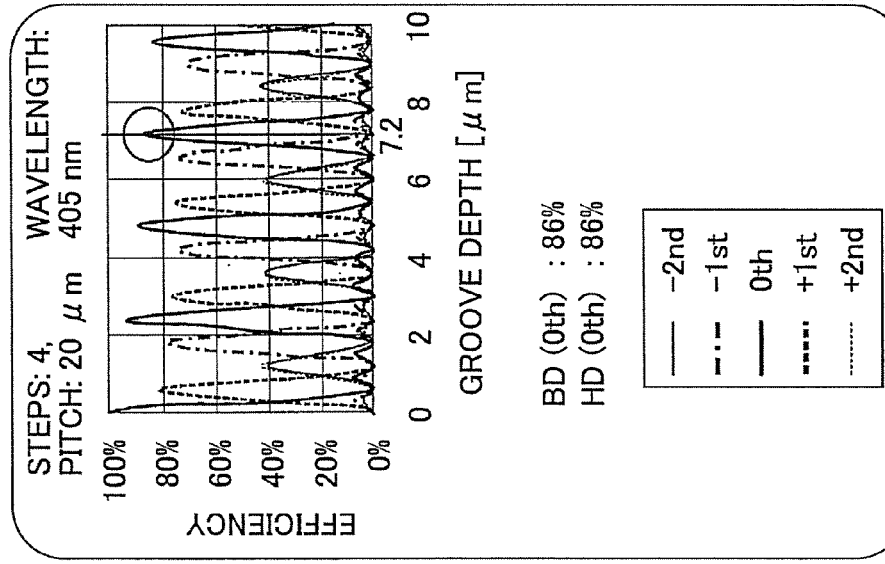

FIGS. 9A through 9C are graphs showing the relationship between the groove depth and diffraction efficiency of a four-step diffraction structure for first light, second light, and third light, respectively. The results in the graphs are obtained by vector calculation using the rigorous coupled wave analysis (RCWA) method. In the vector calculation, the pitch of the four-step diffraction structure is set at 20 μm. As the results show, when PMMA is used as the material of the four-step diffraction structure, favorable diffraction efficiencies can be achieved for all of the wavelengths with a groove depth D of 7.2 μm.

With a groove depth D of 7.2 μm, the diffraction efficiencies for the first light, the second light, and the third light are 86%, 67%, and 39%, respectively. A groove depth D of 7.2 μm corresponds to a depth of 2.4 μm per step. A depth of 2.4 μm per step corresponds to a phase difference per step obtained as an integral multiple of a wavelength of 405 nm, a phase difference per step obtained by adding an integral multiple of a wavelength of 660 nm and 0.75 times the wavelength, and a phase difference per step obtained by adding an integral multiple of a wavelength of 785 nm and 0.5 times the wavelength.

With a four-step diffraction structure as described above, to make the diffraction efficiencies of 0th order diffracted light of the first light, N12-order diffracted light of the second light, and N13-order diffracted light of the third light as high as possible at the same time, the diffraction orders N12 and N13 (|N12|<|N13|) are preferably −1 and −2, respectively.

The second zone 502b is preferably designed to diffract the second light to correct its aberration and not to focus the third light on the CD 137. In a five-step diffraction structure formed in the second zone 502b, to provide the maximum diffraction efficiencies for 0th order diffracted light, ±1st order diffracted light, and ±2nd order diffracted light, the phase difference by the groove depth H of a sawtooth structure and the phase difference per step of a step-like structure are preferably determined as shown in table 6 below.

TABLE 6

| Diffraction order | Five steps | |
|---|---|---|
| | Phase difference by H | Phase difference per step |
| 0th order | 5λ, 10λ, . . . | Nλ |
| −1st order | 4λ, 9λ, . . . | (0.8 + N)λ |
| +1st order | 1λ, 6λ, . . . | (0.2 + N)λ |
| −2nd order | 2λ, 7λ, . . . | (0.6 + N)λ |
| +2nd order | 3λ, 8λ, . . . | (0.4 + N)λ |

*N indicates an integer

In a five-step diffraction structure, the phase difference per step for the first light with a wavelength of 405 nm is preferably obtained as an integral multiple of the wavelength so that the 0th order diffraction efficiency is maximized. The phase difference per step for the second light with a wavelength of 660 nm is preferably obtained by adding 0.2 times the wavelength and an integral multiple of the wavelength so that the +1st order diffraction efficiency is maximized. The phase difference per step for the third light with a wavelength of 785 nm is preferably obtained as an integral multiple of the wavelength so that ±2nd order diffracted light is not produced.

Figure 10A:
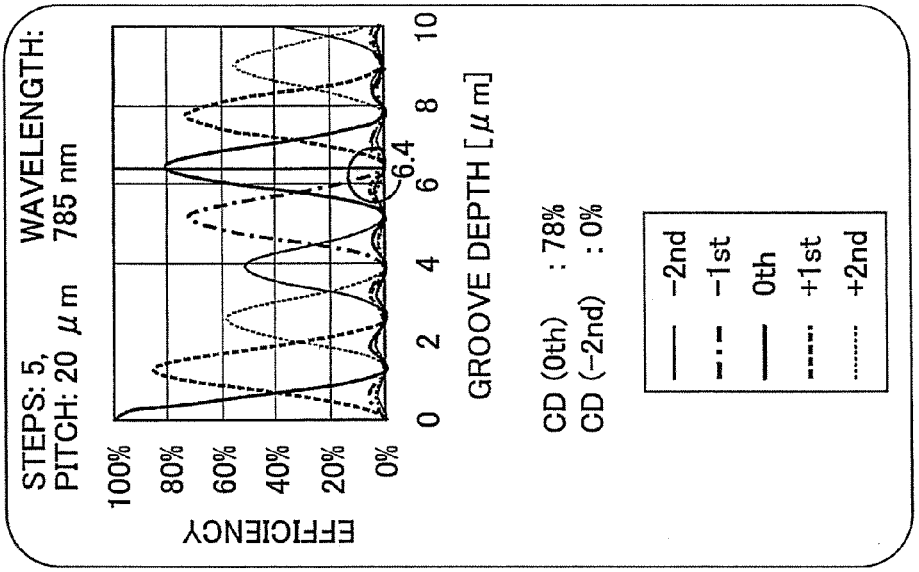
FIGS. 10A through 10C are graphs showing the relationship between the groove depth and diffraction efficiency of a five-step diffraction structure for first light, second light, and third light, respectively.
Figure 10B:
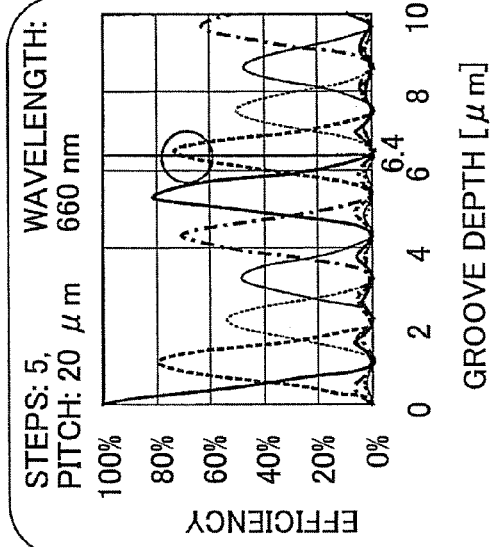
Figure 10C:
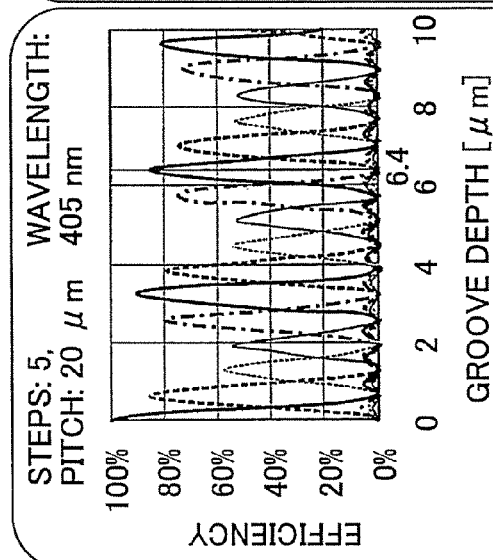

FIGS. 10A through 10C are graphs showing the relationship between the groove depth and diffraction efficiency of a five-step diffraction structure for the first light, the second light, and the third light, respectively. The results in the graphs are obtained by vector calculation using the RCWA method. In the vector calculation, the pitch of the five-step diffraction structure is set at 20 μm. As the results show, when PMMA is used as the material of the five-step diffraction structure, favorable diffraction efficiencies can be achieved for all of the wavelengths with a groove depth D of 6.4 μm. With a groove depth D of 6.4 μm, the diffraction efficiencies for 0th order diffracted light of the first light, +1st order diffracted light of the second light, and −2nd order diffracted light of the third light are 84%, 73%, and 0%, respectively. Also, the diffraction efficiency for 0th order diffracted light of the third light is high at 78%.

FIG. 11A is a drawing illustrating light being focused on the CD 137 and FIG. 11B is a drawing illustrating a light spot formed on the CD 137. A portion of light that passes through the center zone 502a is diffracted as −2nd diffracted light and is focused on the CD 137. On the other hand, a portion of light that passes through the second zone 502b is diffracted as 0th order diffracted light without change. The 0th order diffracted light is not focused on the CD 137 but is diffused like a flare and therefore does not influence information recording/reproduction.

The second zone 502b made of PMMA may also be configured as a four-step diffraction structure having a groove depth D of 4.8 μm (phase difference per step for the first light is 2λ), a three-step diffraction structure having a groove depth D of 3.2 μm (phase difference per step for the first light is 2λ), or a three-step diffraction structure having a groove depth D of 6.4 μm (phase difference per step for the first light is 4λ).

The third zone 502c is a flat surface where no diffraction structure is formed. In FIG. 3, the height of the third zone 502c with respect to the lowest step (level) of the diffraction structures in the center zone 502a and the second zone 502b is set at an integral multiple of the first light wavelength. In the first embodiment, the height of the third zone 502c is set at 4.0 μm that is five times the first light wavelength.

A portion of the second light or the third light that passes through the third zone 502c is out of the effective diameter and is therefore unnecessary for forming a light spot. As shown in FIG. 11B, the unnecessary light spreads wide like a flare on the DVD 127 or the CD 137. As described above, the height of the third zone 502c with respect to the lowest step (level) of the diffraction structures in the center zone 502a and the second zone 502b is an integral multiple of the first light wavelength. Although the height of the third zone 502c is set at 4.0 μm that is five times the first light wavelength in this embodiment, the height of the third zone 502c is not limited to 4 μm.

Figure 12:
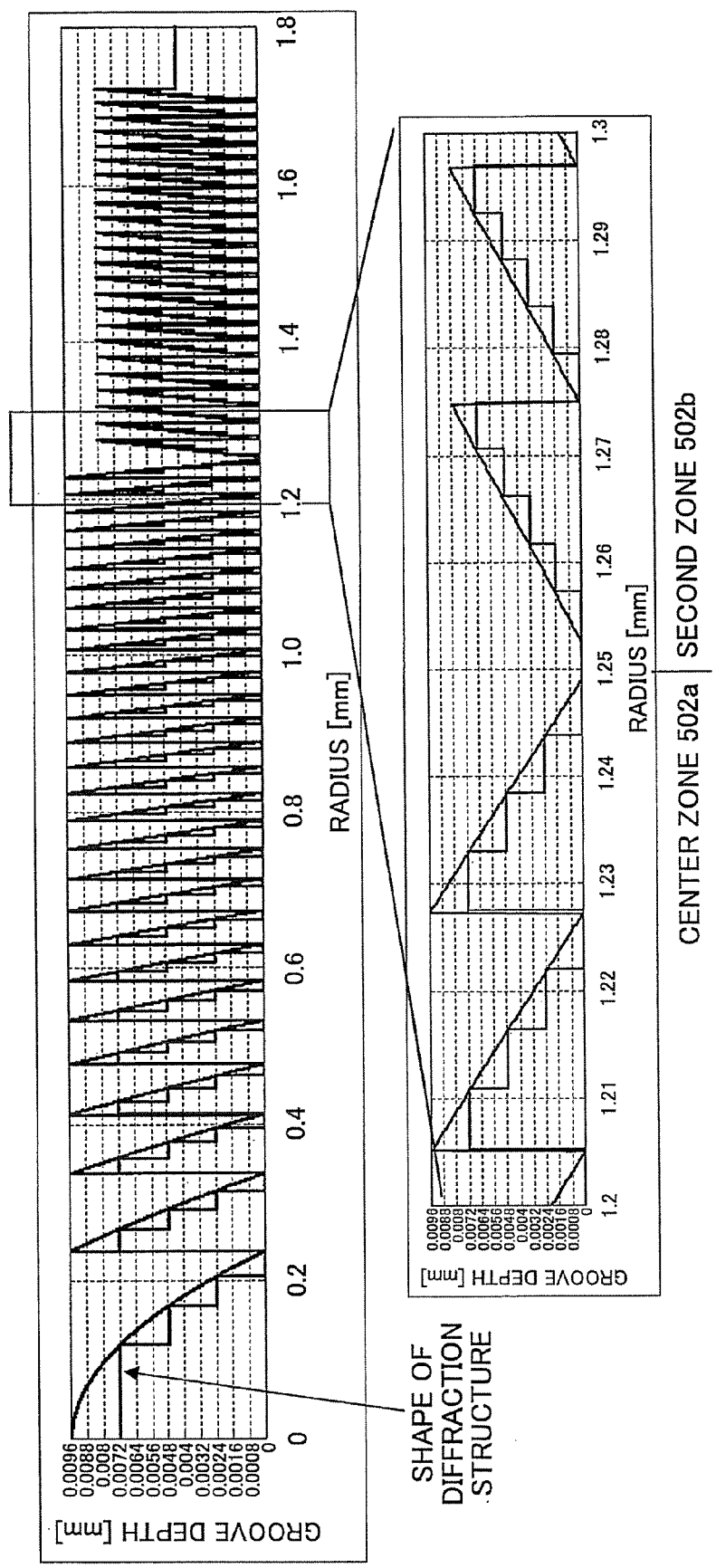
FIG. 12 is a detailed drawing of a diffraction structure formed on the first diffraction plane of the first exemplary aberration correcting unit.

FIG. 12 is a detailed drawing of a diffraction structure formed on the first diffraction plane 502 of the aberration correcting unit 501. The center zone 502a and the second zone 502b have different optical path difference coefficients and therefore do not connect smoothly to each other. To obviate this problem, a connecting zone having a height that is an integral multiple of the first light wavelength is provided so that the center zone 502a and the second zone 502b connect smoothly to each other. In the first embodiment, the height of the connecting zone is set at the same height as that of the lowest step (level) of the diffraction structure.

Increasing the number of steps of each step-like structure increases the diffraction efficiency of the diffraction structure, since the step-like structure becomes closer to a sawtooth kinoform structure. However, increasing the number of steps makes the pitch between the steps narrower and makes it difficult to precisely produce the aberration correcting unit 501. This, in turn, may cause a production error and thereby reduce the diffraction efficiency.

When the pitch 200 is the same, decreasing the groove depth D increases the diffraction efficiency and makes the diffraction structure less susceptible to changes in wavelength and temperature. Therefore, it is preferable to make the groove depth D as small as possible and the number of steps as many as possible.

In the first embodiment, the signs of corresponding diffraction orders of light diffracted by the center zone 502a and the second zone 502b are inverted to greatly change the relationship between the diffraction efficiencies of the first, second, and third lights, the shape of the diffraction structure, and the groove depth. Thus, the first embodiment makes it possible to provide a diffraction structure having a small groove depth and a large number of steps and thereby makes it possible to provide a diffraction plane that functions efficiently both as an aberration correcting unit and an NA limiting element.

Figure 13:
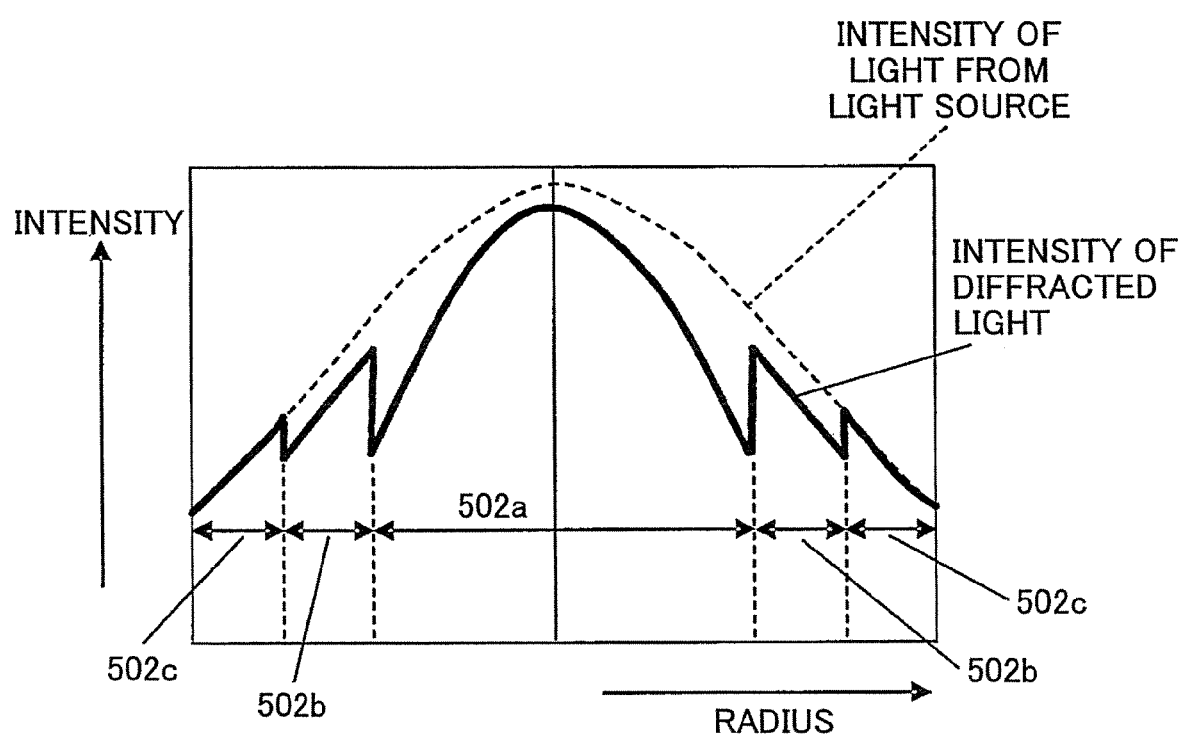
FIG. 13 is a graph showing the relationship between the distance from the center of a diffraction plane and the intensity of diffracted light.

Normally, the diffraction efficiency of a diffraction structure decreases as the pitch of the diffraction structure becomes narrower. The pitch of the diffraction structure on the first diffraction plane 502 becomes narrower as it nears the outer circumference. Therefore, the diffraction efficiency of the diffraction structure decreases as it nears the outer circumference. FIG. 13 is a graph showing the relationship between the distance from the center of the first diffraction plane 502 and the intensity of diffracted light. In FIG. 13, a dotted line indicates the intensity of light from the light source and a solid line indicates the intensity of diffracted light. As the graph shows, the intensity of light diffracted by the center zone 502a decreases as the distance (radius) from the center of the first diffraction plane 502 increases. The pitch of the diffraction structure in the second zone 502b is narrower than that in the center zone 502a. However, since the diffraction structure in the second zone 502b has five steps and the groove depth is smaller than that of the center zone 502a, the intensity of the diffracted light is not decreased much.

The numbers of steps and the groove depths of diffraction structures are not limited to those mentioned above. The first diffraction plane 502 of the first embodiment makes it possible to control the NA for diffracted light by inverting the sign of the diffraction order of the diffracted light and thereby to prevent producing light that is unnecessary for forming a light spot.

As shown in FIG. 5, the second diffraction plane 503 of the aberration correcting unit 501 has the following two concentric zones within an area where light passes through: a center zone 503a and a second zone 503b that is second from the center.

The center zone 503a has a radius of 1.6 mm and corresponds to an NA of 0.65 for the HD-DVD 117. A diffraction structure formed in the center zone 503a is designed to transmit a portion of the first light with a wavelength of 405 nm without change so that the transmitted portion of the first light is focused on the Blu-ray disk 107 and also to diffract another portion of the first light to correct the spherical aberration caused by the difference in substrate thickness of the HD-DVD 117.

In other words, the second diffraction plane 503 is configured to transmit a portion of incoming light as 0th order diffracted light and another portion of the incoming light as ±1st or higher order diffracted light. Therefore, the second diffraction plane 503 and the objective lens 106 function together as a bifocal lens. The second diffraction plane 503 as described above makes it possible to form an appropriate light spot on either of the Blu-ray disk 107 and the HD-DVD 117 having different substrate thicknesses by focusing the same wavelength light up to the diffraction limit. The 0th order diffracted light and the ±1st or higher order diffracted light are focused at different focal positions along the optical axis and thereby form light spots on the Blu-ray disk 107 and the HD-DVD 117, respectively.

When one of the 0th order diffracted light and the ±1st or higher order diffracted light is being used to record/reproduce information on an optical recording medium, the other diffracted light is not focused but is diffused on the optical recording medium. Since the intensity of the diffused light is low, it does not influence the information recording/reproduction.

The second zone 503b has an inner radius of 1.6 mm and an outer radius of 2.2 mm and corresponds to an NA of between 0.65 for the HD-DVD 117 and 0.85 for the Blu-ray disk 107. The second zone 503b is a flat surface where no diffraction structure is formed and is designed to transmit the first light, the second light, and the third light without change. Light transmitted by the second zone 503b is focused on the Blu-ray disk 107 by the objective lens 106, but not focused on the HD-DVD 117, the DVD 127, and the CD 137. In other words, transmitted light is diffused like a flare on the HD-DVD 117, the DVD 127, and the CD 137 as shown in FIG. 11B.

Thus, the second diffraction plane 503 is designed to correct aberration of the first light and adjust the NA of the objective lens 106 for the HD-DVD 117. The first diffraction plane 502 thereby makes it possible to form a desirable light spot on the HD-DVD 117.

As shown by the cut-away side view in FIG. 3, the center zone 503a of the aberration correcting unit 501 is made up of concentrically arranged orbicular ridges and grooves. The orbicular ridges or grooves each have a step-like structure made of three steps including the lowest step (level). The pitch between the orbicular ridges becomes narrower from the center to the outer circumference so that the diffraction structure made of the orbicular ridges and grooves have a lens effect.

The pitches are so determined that a portion of the first light is diffracted as +1st order diffracted light and used for the HD-DVD 117 so that the aberration of the first light is corrected. Optical path difference coefficients of the center zone 503a are shown in table 7 below.

TABLE 7

| Production wavelength | 405 nm |
|---|---|
| Optical path difference coefficients | C1: 1.4489E−02 |
| | C2: 5.2486E−04 |
| | C3: −3.1683E−04 |
| | C4: 1.6526E−04 |
| | C5: −5.4715E−05 |
| | C6: 6.9544E−06 |

The minimum pitch between the orbicular ridges in the center zone 503a is 8.5 μm and the number of the orbicular ridges is 95.

The height of the orbicular ridges or the depth of the orbicular grooves (groove depth) in the second diffraction plane 503 is described below. As described above, the center zone 503a and the objective lens 106 function together as a bifocal lens for the first light. Therefore, the groove depth of the diffraction structure in the center zone 503a is preferably determined so that the first light is diffracted as 0th order diffracted light and +1st order diffracted light and the 0th order diffraction efficiency becomes high for the second light and the third light.

In a three-step diffraction structure, to provide the maximum diffraction efficiencies for 0th order diffracted light, −1st order diffracted light, +1st order diffracted light, −2nd order diffracted light, and +2nd order diffracted light, the phase difference by the groove depth H of a sawtooth structure and the phase difference per step of a step-like structure are preferably determined as shown in table 8 below.

TABLE 8

| | Three steps | |
|---|---|---|
| Diffraction order | Phase difference by H | Phase difference per step |
| 0th order | 3λ, 6λ, . . . | Nλ |
| −1st order | 2λ, 5λ, . . . | (0.67 + N)λ |
| +1st order | 1λ, 4λ, . . . | (0.33 + N)λ |
| −2nd order | 1λ, 4λ, . . . | (0.33 + N)λ |
| +2nd order | 2λ, 5λ, . . . | (0.67 + N)λ |

*N indicates an integer

The height of orbicular ridges or the depth of orbicular grooves (groove depth) of the three-step diffraction structure is preferably determined based on table 8 so that the diffraction efficiency for desired diffracted light of each of the first light, the second light, and the third light becomes as high as possible. In a three-step structure, the phase difference per step for each of the second light and the third light is preferably obtained as an integral multiple of the corresponding wavelength. The phase difference per step for the first light is preferably between an integral multiple of the corresponding wavelength and 0.33 times the wavelength. FIGS. 14A through 14C are graphs showing the relationship between the groove depth and diffraction efficiency of a three-step diffraction structure for first light, second light, and third light, respectively. The results in the graphs are obtained by vector calculation using the RCWA method. In the vector calculation, the pitch of the three-step diffraction structure is set at 8 μm. As the results show, when PMMA is used as the material of the three-step diffraction structure, favorable diffraction efficiencies can be achieved for all of the wavelengths with a groove depth D of 0.293 μm. With a groove depth D of 0.293 μm, the diffraction efficiencies for 0th order diffracted light of the first light, +1st order diffracted light of the first light, 0th order diffracted light of the second light, and 0th order diffracted light of the third light are 38%, 35%, 74%, and 81%, respectively. A groove depth D of 0.293 μm corresponds to a depth of 0.1465 μm per step. A depth of 0.1465 μm per step corresponds to a phase difference per step of 0.18 times the first light wavelength. The diffraction efficiency for the first light is shared between 0th order diffracted light and +1st order diffracted light. A depth of 0.1465 μm per step also corresponds to a phase difference per step of about 0.18 times the second light wavelength or the third light wavelength. Although the phase differences for the second light and the third light do not match the phase differences shown in table 8, a depth of 0.1465 still provides sufficient diffraction efficiency.

In the first embodiment, as described above, PMMA is used as the material of the second diffraction plane 503, the number of steps of a diffraction structure on the second diffraction plane 503 is three, and the second diffraction plane 503 is configured to efficiently produce 0th order diffracted light and +1st order diffracted light. However, the second diffraction plane 503 may also be configured otherwise. Also, in the first embodiment, the second diffraction plane 503 is configure to allocate the diffraction efficiency for the first light almost evenly to 0th order diffracted light and +1st order diffracted light. However, it is more preferable to change the ratio between 0th order diffracted light and +1st order diffracted light depending on the purpose. For example, 0th order diffracted light can be increased by decreasing the groove depth of the diffraction structure and +1st order diffracted light can be increased by increasing the groove depth. When an optical pickup is to be configured to both record and reproduce information on the Blu-ray disk 107 and to only reproduce information on the HD-DVD 117, it is preferable to increase the ratio of 0th order diffracted light.

The second zone 503b is a flat surface where no diffraction structure is formed. In FIG. 3, the height of the second zone 503b with respect to the lowest step (level) of the diffraction structure in the center zone 503a is set at an integral multiple of the first light wavelength. In the first embodiment, the height of the second zone 503b is set at the same height as that of the lowest step of the diffraction structure.

Light that is transmitted by the second zone 503b is not used to form a light spot on the HD-DVD 117. As shown in FIG. 11B, the transmitted light is diffused like a flare on the HD-DVD 117, the DVD 127, and the CD 137.

Figure 15:
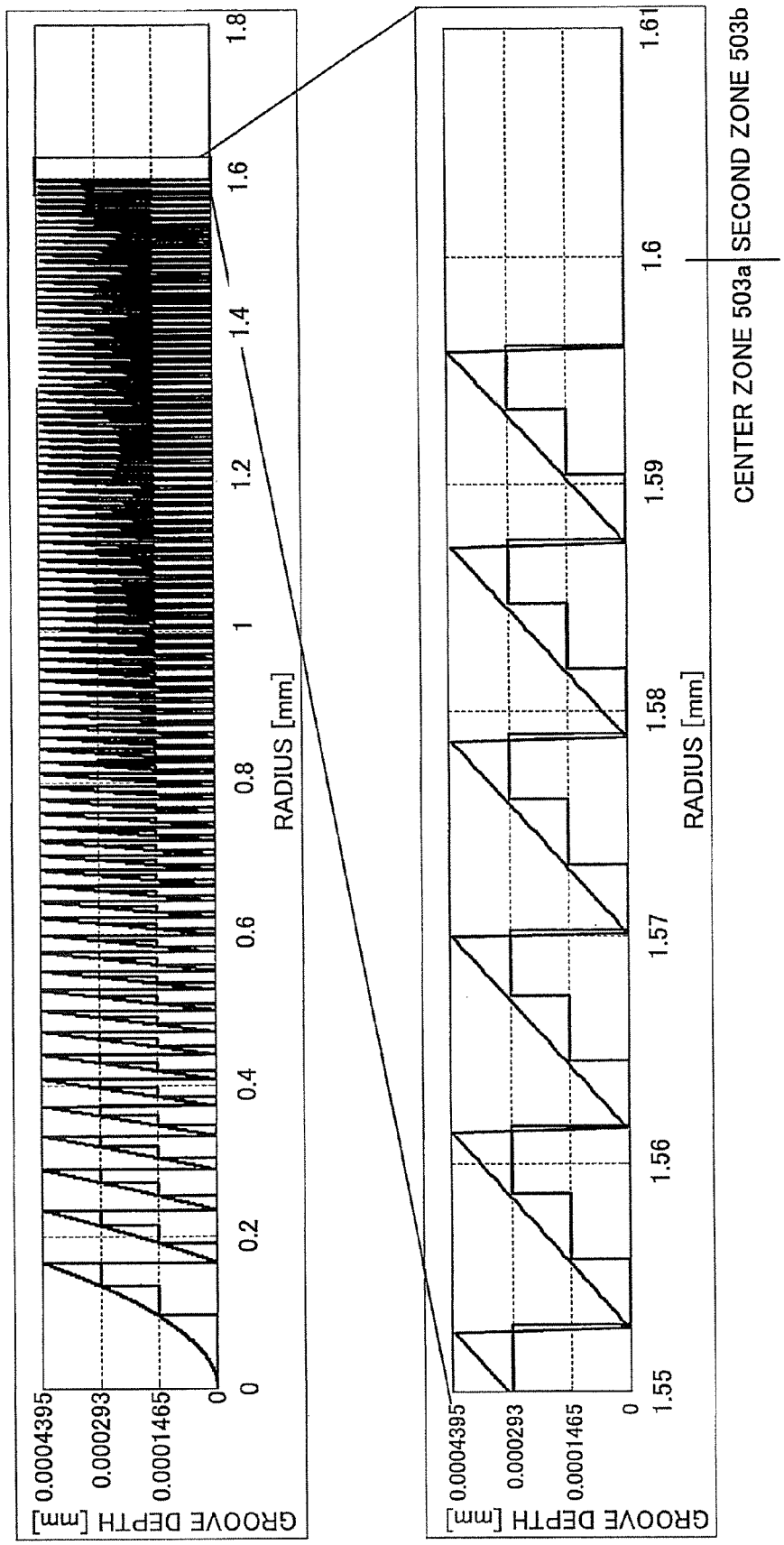
FIG. 15 is a detailed drawing of a diffraction structure formed on the second diffraction plane of the first exemplary aberration correcting unit.

FIG. 15 is a detailed drawing of a diffraction structure formed on the second diffraction plane 503. The second diffraction plane 503 and the objective lens 106 function together as a bifocal lens and thereby make it possible to form a desirable light spot on either of the Blu-ray disk 107 and the HD-DVD 117. Also, the second diffraction plane 503 efficiently transmits 0th order diffracted light of the second light and the third light.

Figure 16:
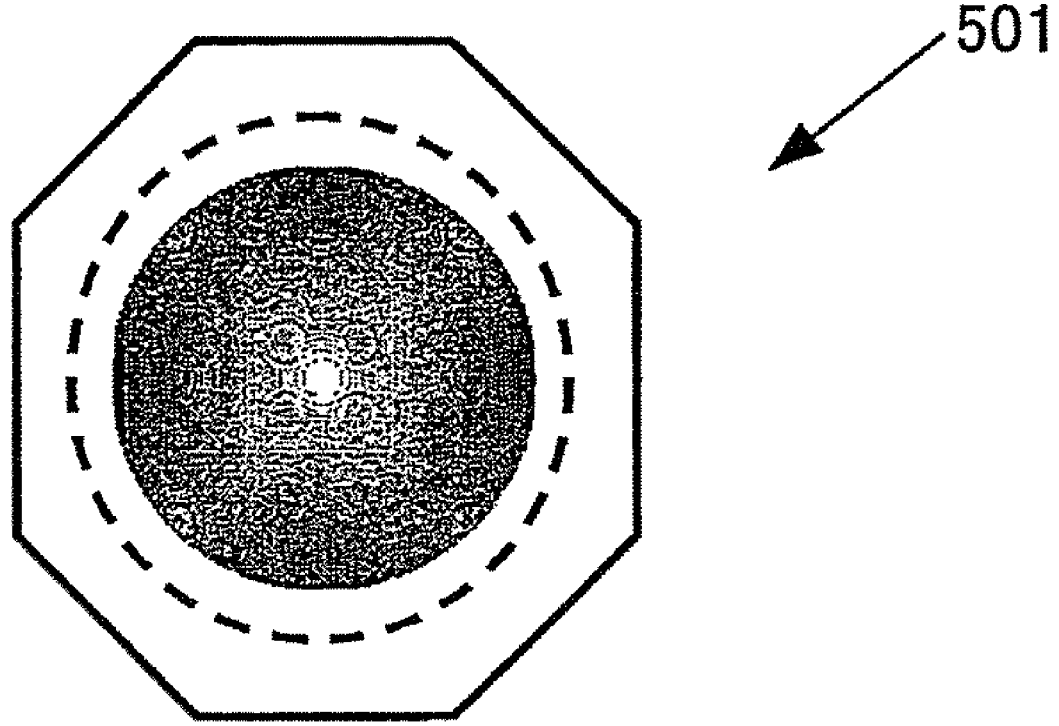
FIG. 16 is a drawing illustrating an exemplary outer shape of an aberration correcting unit.

The outer shape of the aberration correcting unit 501 is described below. As shown in FIGS. 4 and 5, the aberration correcting unit 501 has a circular shape. In this embodiment, a polygonal shape is also regarded as a circular shape. For example, an aberration correcting unit having a polygonal shape as shown in FIG. 16 may be used.

PMMA used in the first embodiment as the material of the aberration correcting unit 501 is also widely used for other optical components because it can be injection-molded and is suitable for mass production. One disadvantage of PMMA is that it has high hygroscopicity. High hygroscopicity may cause changes in optical characteristics, such as a refractive index and transmittance, of an optical component and may also deform an optical component.

Figure 17A:
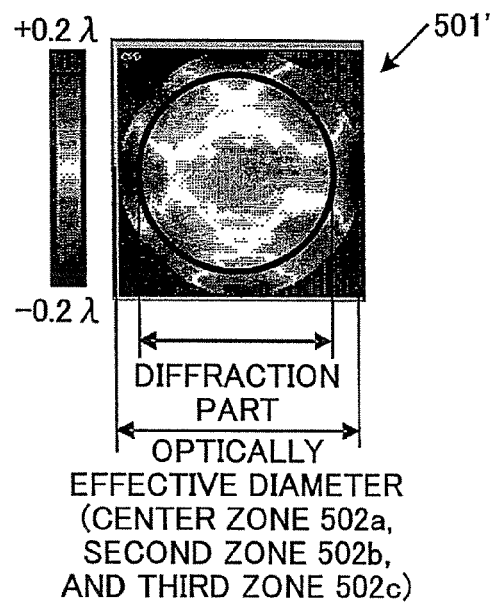
FIGS. 17A through 17D are drawings illustrating wavefront shapes of light with a wavelength of 405 nm transmitted through a square-shaped aberration correcting unit.
Figure 17B:
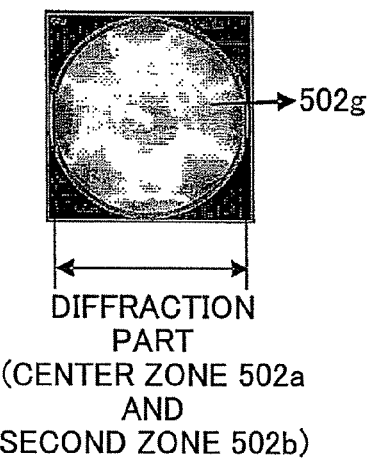
Figure 17C:
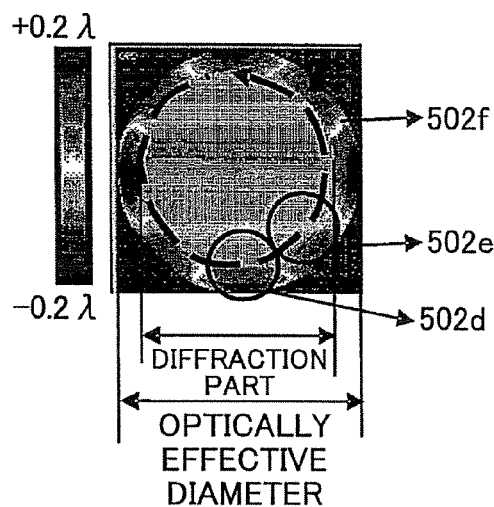

FIGS. 17A through 17D are drawings illustrating wavefront shapes of light with a wavelength of 405 nm transmitted through a square-shaped aberration correcting unit 501'. FIG. 17A shows a wavefront shape of transmitted light within the optically effective diameter (the center zone 502a, the second zone 502b, and the third zone 502c) of the square-shaped aberration correcting unit 501'. FIG. 17B shows a wavefront shape 502g of transmitted light in a diffraction part (the center zone 502a and the second zone 502b). FIG. 17C shows a wavefront shape 502f of transmitted light in a flat surface part (the third zone 502c).

Figure 17D:
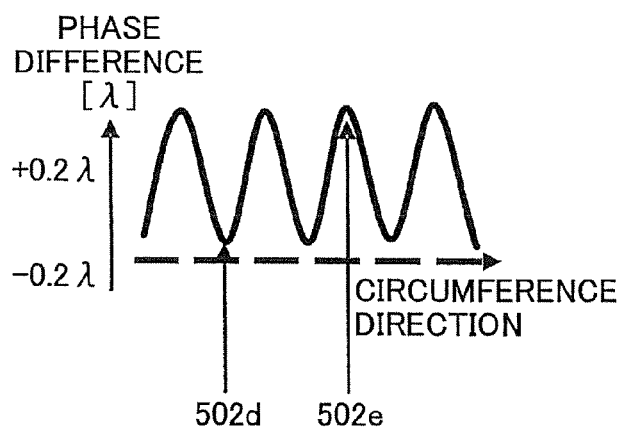

Based on each wavefront shape, wavefront aberration of transmitted light was calculated. The peak-to-valley (PV) value of the wavefront shape of the transmitted light within the optically effective diameter shown in FIG. 17A was $0.5\lambda$ and the wavefront aberration was $0.1 \lambda\text{rms}$. Thus, the overall wavefront accuracy of transmitted light within the optically effective diameter was low. Normally, wavefront aberration of $0.02 \lambda\text{rms}$ or lower is preferable for an optical component. The wavefront aberration of transmitted light in the diffraction part shown in FIG. 17B was comparatively small at $0.02 \lambda\text{rms}$. The wavefront aberration of transmitted light in the flat surface part shown in FIG. 17C was comparatively large at $0.13 \lambda\text{rms}$. As the results show, the large wavefront aberration in the flat surface part is degrading the entire wavefront accuracy. FIG. 17D is a plot of the wavefront shape 502f in the flat surface part along the circumference. In the flat surface part, the wavefront shape f is undulating along the outline of the square-shaped aberration correcting unit 501'. It is supposed that the undulation of the wavefront shape f degrades the wavefront accuracy.

As shown in FIG. 17C, in the boundary between the diffraction part and the flat surface part, a point 502d is closer than a point 502e to the outline of the square-shaped aberration correcting unit 501'. The hygroscopicity of PMMA at the point 502d and the hygroscopicity of PMMA at the point 502e are different. This difference in hygroscopicity causes deformation of the aberration correcting unit 501' and thereby causes undulation of the wavefront shape f.

Figure 18A:
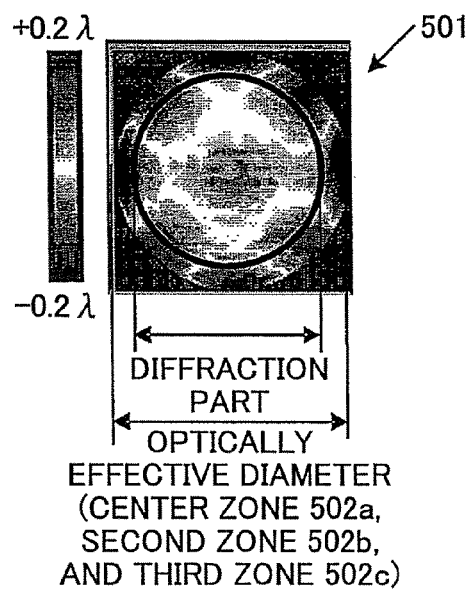
FIGS. 18A through 18D are drawings illustrating wavefront shapes of light with a wavelength of 405 nm transmitted through a circular-shaped aberration correcting unit.
Figure 18B:
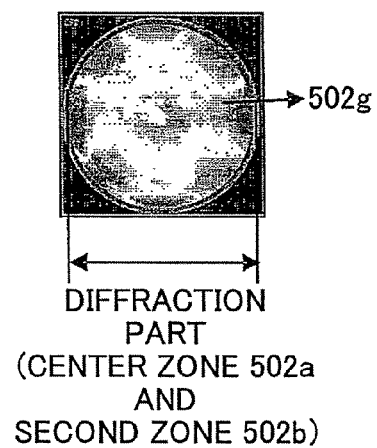
Figure 18C:
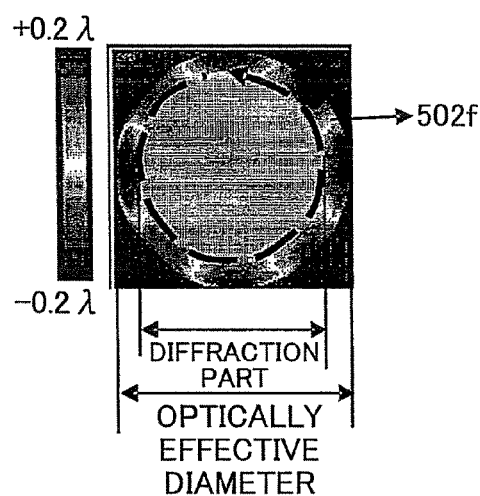

FIGS. 18A through 18D are drawings illustrating wavefront shapes of light with a wavelength of 405 nm transmitted through the aberration correcting unit 501 of the first embodiment. The aberration correcting unit 501 has a circular shape. FIG. 18A shows a wavefront shape of transmitted light within the optically effective diameter (the center zone 502a, the second zone 502b, and the third zone 502c) of the aberration correcting unit 501. FIG. 18B shows a wavefront shape 502g of transmitted light in a diffraction part (the center zone 502a and the second zone 502b). FIG. 18C shows a wavefront shape 502f of transmitted light in a flat surface part (the third zone 502c).

Figure 18D:
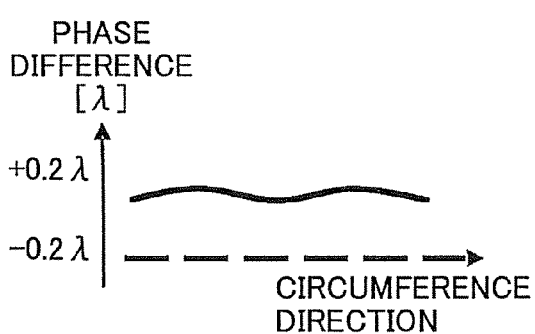

FIG. 18D is a plot of the wavefront shape in the flat surface part along the circumference direction. Based on each wavefront shape, wavefront aberration of transmitted light was calculated. The PV value of the wavefront shape of the transmitted light within the optically effective diameter shown in FIG. 18A was $0.1\lambda$ and the wavefront aberration was $0.02 \lambda\text{rms}$. The wavefront aberration of transmitted light in the diffraction part shown in FIG. 18B was $0.015 \lambda\text{rms}$. The wavefront aberration of transmitted light in the flat surface part shown in FIG. 18C was $0.017 \lambda\text{rms}$ and undulation of the wavefront shape f was not observed. Thus, the wavefront accuracy of transmitted light was high.

As the results show, with a circular shape, which is the same as the shape of the boundary between the diffraction part and the flat-surface part, the deformation of the aberration correcting unit 501 resulting from the difference in hygroscopicity of PMMA can be prevented and undulation of the wavefront shape f can be reduced. Thus, the aberration correcting unit 501 having a circular shape makes it possible to provide a high-precision optical pickup.

Figure 19:
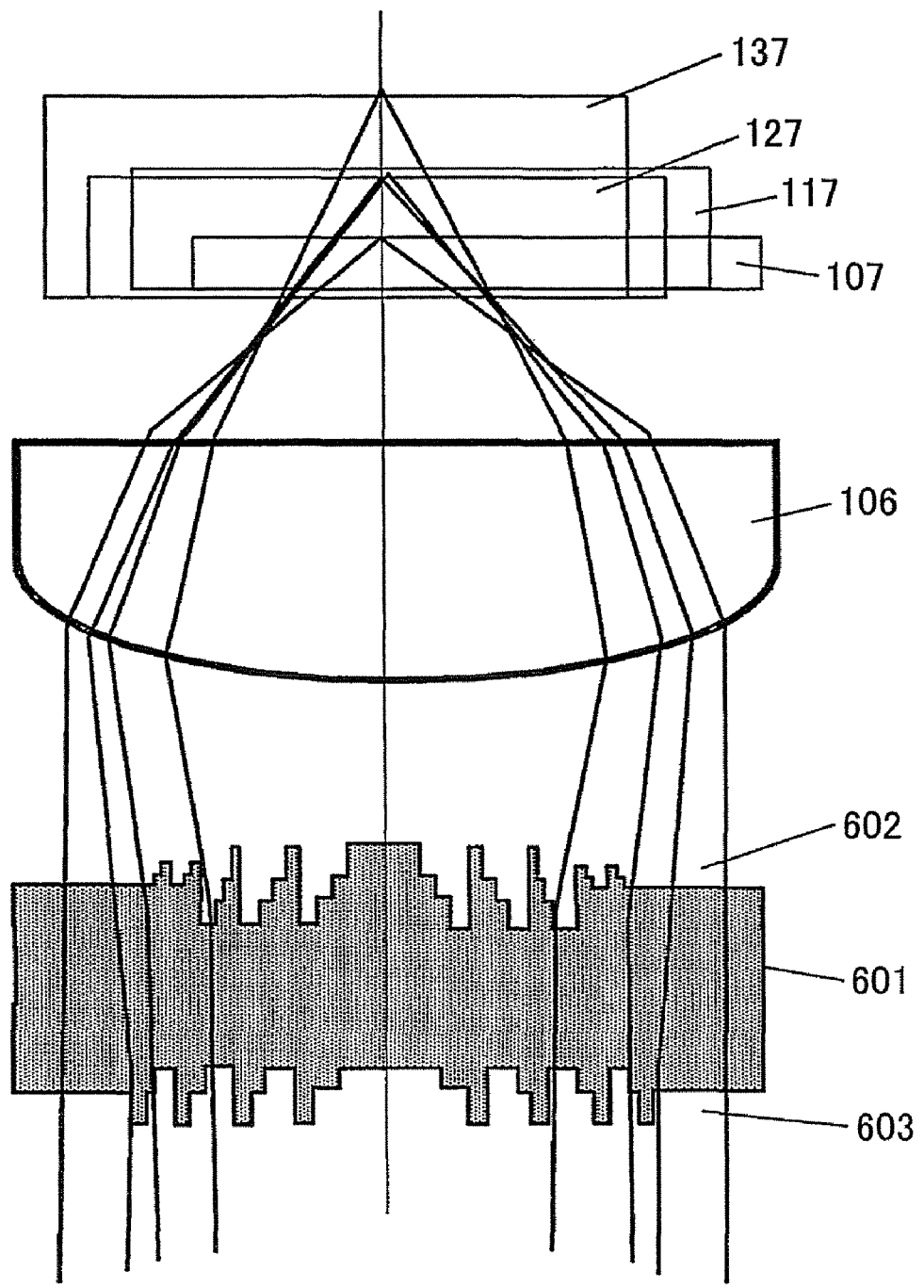
FIG. 19 is a cut-away side view of a second exemplary aberration correcting unit and an objective lens.

FIG. 19 is an enlarged cut-away side view of an aberration correcting unit 601 according to a second embodiment of the present invention and an objective lens 106. The configuration of an optical pickup and the characteristics of the objective lens 106 used in the second embodiment are substantially the same as those in the first embodiment. The aberration correcting unit 601 has a first diffraction plane 602 and a second diffraction plane 603. The first diffraction plane 602 has a configuration different from that of the first diffraction plane 502 of the aberration correcting unit 501. The configuration of the second diffraction plane 603 is substantially the same as that of the second diffraction plane 503.

Figure 20:
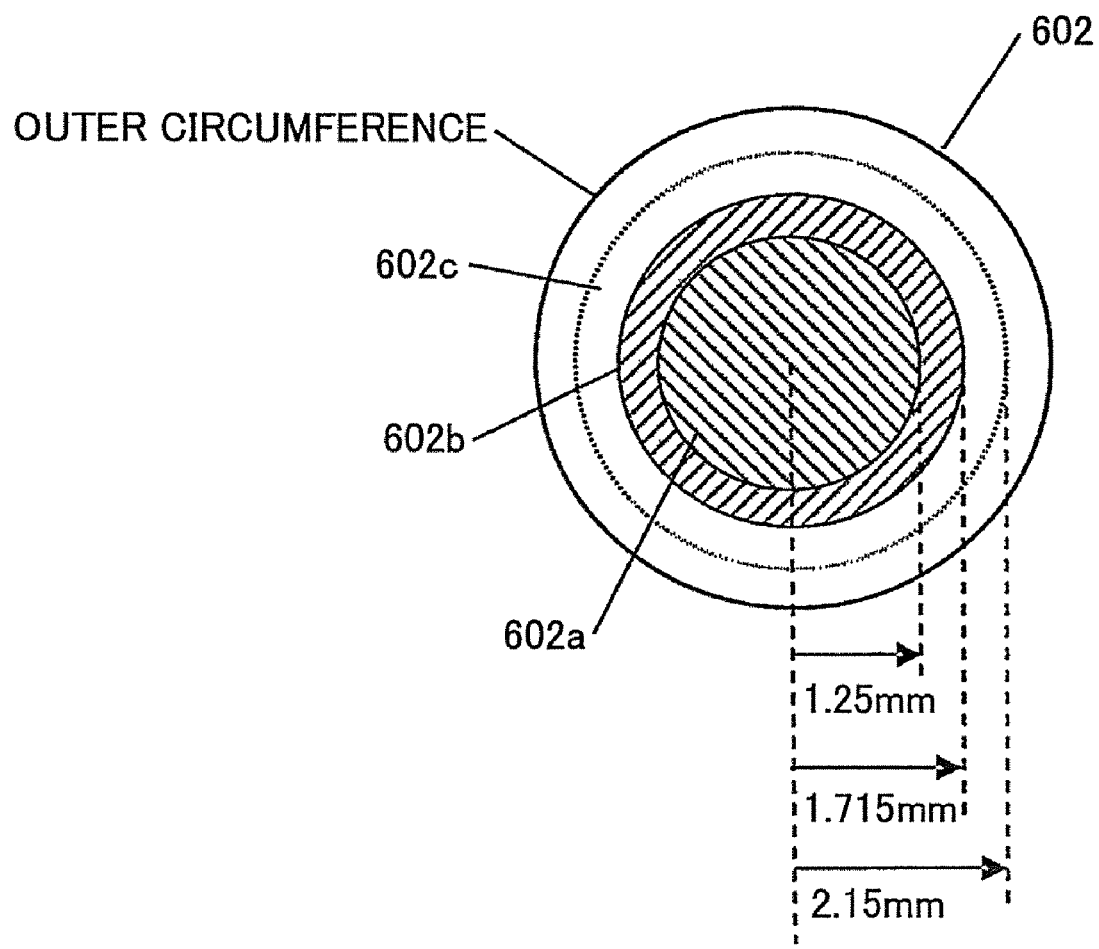
FIG. 20 is a drawing illustrating a first diffraction plane of the second exemplary aberration correcting unit.

As shown in FIG. 20, the first diffraction plane 602 has the following three concentric zones within an area through which light passes: a center zone 602a, a second zone 602b, and a third zone 602c. The center zone 602a has a radius of 1.25 mm and corresponds to an NA of 0.45 for the CD 137. The second zone 602b has an inner radius of 1.25 mm and an outer radius of 1.715 mm and corresponds to an NA between 0.45 for the CD 137 and 0.65 for the DVD 127.

A diffraction structure formed in the center zone 602a is designed to transmit the first light with a wavelength of 405 nm without change and to diffract the second light and the third light to correct spherical aberration caused by the difference in substrate thickness of the DVD 127 and the CD 137 and by the difference in wavelength of the second light and the third light.

A diffraction structure formed in the second zone 602b is designed to transmit the first light with a wavelength of 405 nm without change, to diffract the second light to correct spherical aberration caused by the difference in substrate thickness of the DVD 127 and the difference in wavelength of the second light, and so as not to focus the third light on the recording surface of the CD 137.

The third zone 602c is a flat surface where no diffraction structure is formed and is designed to transmit the first light, the second light, and the third light without change. Light transmitted by the third zone 602c is focused on the Blu-ray disk 107 by the objective lens 106, but not focused on the HD-DVD 117, the DVD 127, and the CD 137.

In other words, the first diffraction plane 602 is designed to correct aberration of the second light and the third light and to adjust the NA of the objective lens 106 for the DVD 127 and the CD 137. Thus, the first diffraction plane 602 makes it possible to form a desirable light spot on the DVD 127 and the CD 137.

As shown in FIG. 19, the number of steps and the groove depth of the diffraction structure in the center zone 602a are substantially the same as those of the center zone 502a of the aberration correcting unit 501. Thus, the center zone 602a is configured to diffract light in substantially the same manner as the center zone 502a. The pitch between orbicular ridges in the diffraction structure becomes narrower from the center to the outer circumference so that the diffraction structure made of orbicular ridges and grooves have a lens effect. The pitches are so determined that −1st order diffracted light is produced and used for the DVD 127 and −2nd order diffracted light is produced and used for the CD 137. In other words, the pitches are determined so that the aberration of light for the DVD 127 and the CD 137 is corrected. Optical path difference coefficients of the center zone 602a are shown in table 9 below.

TABLE 9

| Production wavelength | 660 nm |
|---|---|
| Optical path difference coefficients | $C_1$: −1.1611E−02 |
| | $C_2$: 1.2103E−04 |
| | $C_3$: −6.8989E−04 |
| | $C_4$: 6.9288E−04 |
| | $C_5$: −2.8399E−04 |
| | $C_6$: 3.4154E−05 |

As shown by the cut-away side view in FIG. 19, the second zone 602b of the aberration correcting unit 601 is also made up of concentrically arranged orbicular ridges and grooves. The orbicular ridges or grooves each have a step-like structure made of three steps including the lowest step (level). The pitch between the orbicular ridges becomes narrower from the center to the outer circumference so that the diffraction structure made of the orbicular ridges and grooves has a lens effect.

The pitches are so determined that −1st order diffracted light is produced and used for the DVD 127 so that the aberration of light for the DVD 127 is corrected. Optical path difference coefficients of the second zone 602b are shown in table 10 below.

TABLE 10

| Production wavelength | 660 nm |
|---|---|
| Optical path difference coefficients | $C_1$: −1.0463E−02 |
| | $C_2$: −2.7475E−03 |

TABLE 10-continued

| | $C_3$: 2.2497E−03 |
|---|---|
| | $C_4$: −9.3015E−04 |
| | $C_5$: 2.0046E−04 |
| | $C_6$: −1.7426E−05 |

The depth of step-like grooves (groove depth) in the second zone 602b is so determined that the diffraction structure does not produce −2nd order diffracted light and thereby limits the NA for the CD 137. The minimum pitch between the orbicular ridges in the second zone 602b is 17.8 μm and the number of the orbicular ridges is 24.

The second zone 602b is preferably designed to diffract the second light to correct its aberration and not to focus the third light on the CD 137. In a three-step diffraction structure, the phase difference per step for the first light with a wavelength of 405 nm is preferably obtained as an integral multiple of the wavelength so that the 0th order diffraction efficiency is maximized. The phase difference per step for the second light with a wavelength of 660 nm is preferably obtained by adding 0.33 times the wavelength and an integral multiple of the wavelength so that the +1st order diffraction efficiency is maximized. The phase difference per step for the third light with a wavelength of 785 nm is preferably determined so that ±2nd order diffracted light is not produced.

Figure 21A:
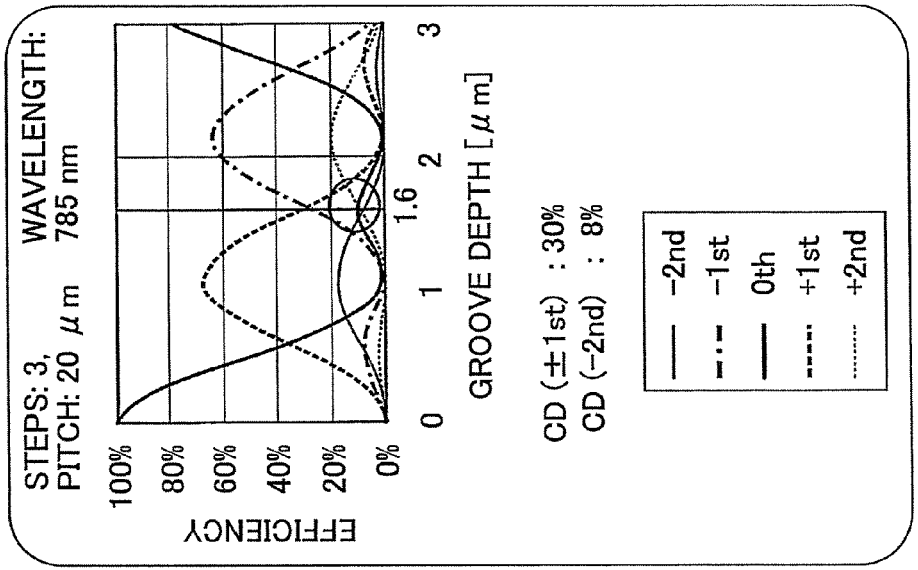
FIGS. 21A through 21C are graphs showing the relationship between the groove depth and diffraction efficiency of a three-step diffraction structure for first light, second light, and third light, respectively.
Figure 21B:
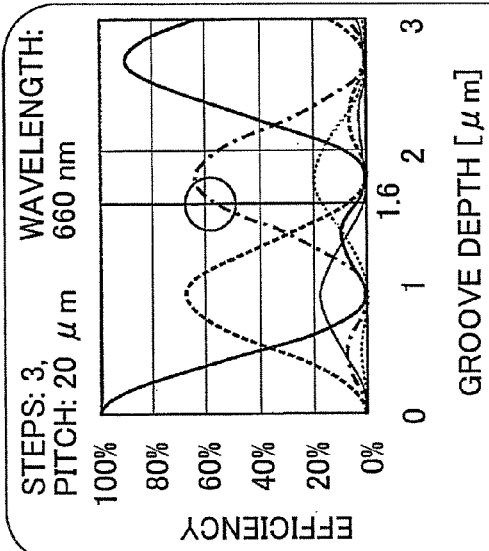
Figure 21C:
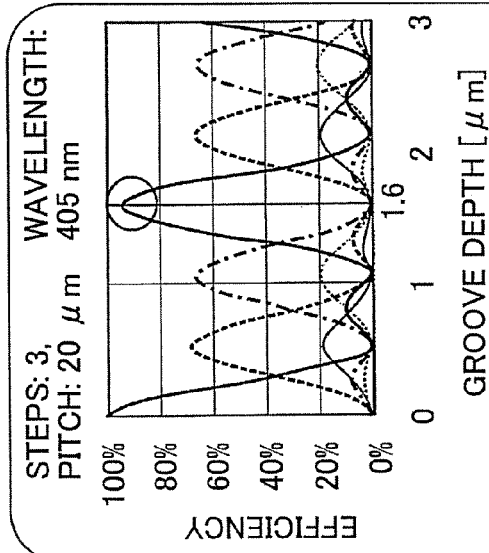

FIGS. 21A through 21C are graphs showing the relationship between the groove depth and diffraction efficiency of a three-step diffraction structure for first light, second light, and third light, respectively. The results in the graphs are obtained by vector calculation using the RCWA method. In the vector calculation, the pitch of the three-step diffraction structure is set at 20 μm. As the results show, when PMMA is used as the material of the three-step diffraction structure, favorable diffraction efficiencies can be achieved for all of the wavelengths with a groove depth D of 1.6 μm. With a groove depth D of 1.6 μm, the diffraction efficiencies for 0th order diffracted light of the first light, −1st order diffracted light of the second light, and −2nd order diffracted light of the third light are 94%, 56%, and 8%, respectively. Also, the diffraction efficiency for ±1st order diffracted light of the third light is high at 30%.

In a manner similar to that shown in FIGS. 11A and 11B, a portion of light that passes through the center zone 602a is diffracted as −2nd order diffracted light and is focused on the CD 137. On the other hand, a portion of light that passes through the second zone 602b is diffracted as ±1st order diffracted light. The ±1st order diffracted light is not focused on the CD 137 but is diffused like a flare and therefore does not influence information recording/reproduction.

Figure 22:
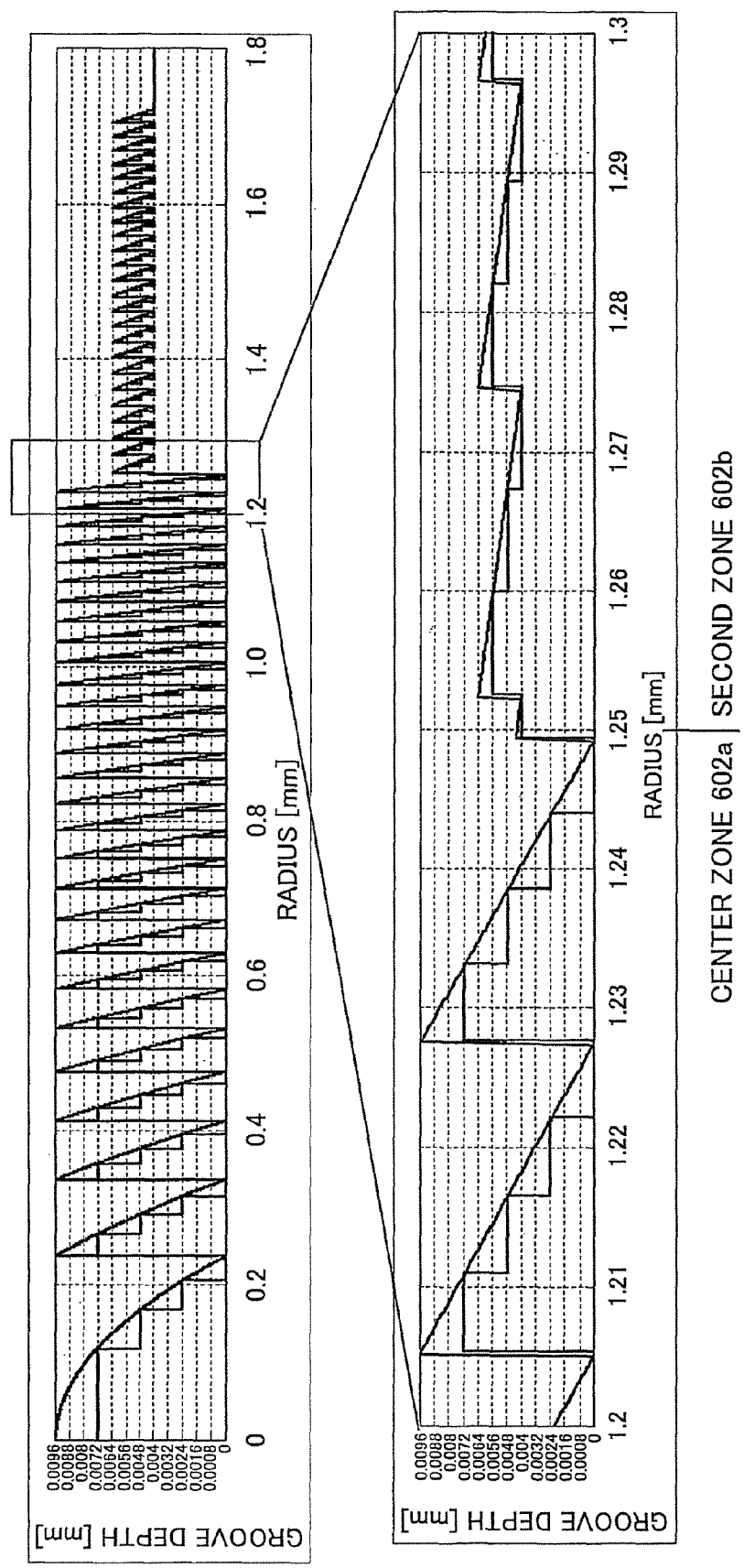
FIG. 22 is a detailed drawing of a diffraction structure formed on the first diffraction plane of the second exemplary aberration correcting unit.

FIG. 22 is a detailed drawing of a diffraction structure formed on the first diffraction plane 602 of the aberration correcting unit 601. The center zone 602a and the second zone 602b have different optical path difference coefficients and therefore do not connect smoothly to each other. To obviate this problem, a connecting zone having a height that is an integral multiple of the first light wavelength is provided so that the center zone 602a and the second zone 602b connect smoothly to each other.

Unlike in the first embodiment, the signs of corresponding diffraction orders of light diffracted by the center zone 602a and the second zone 602b are the same. A diffraction plane with such a configuration can function efficiently both as an aberration correcting unit and an NA limiting element.

Figure 23:
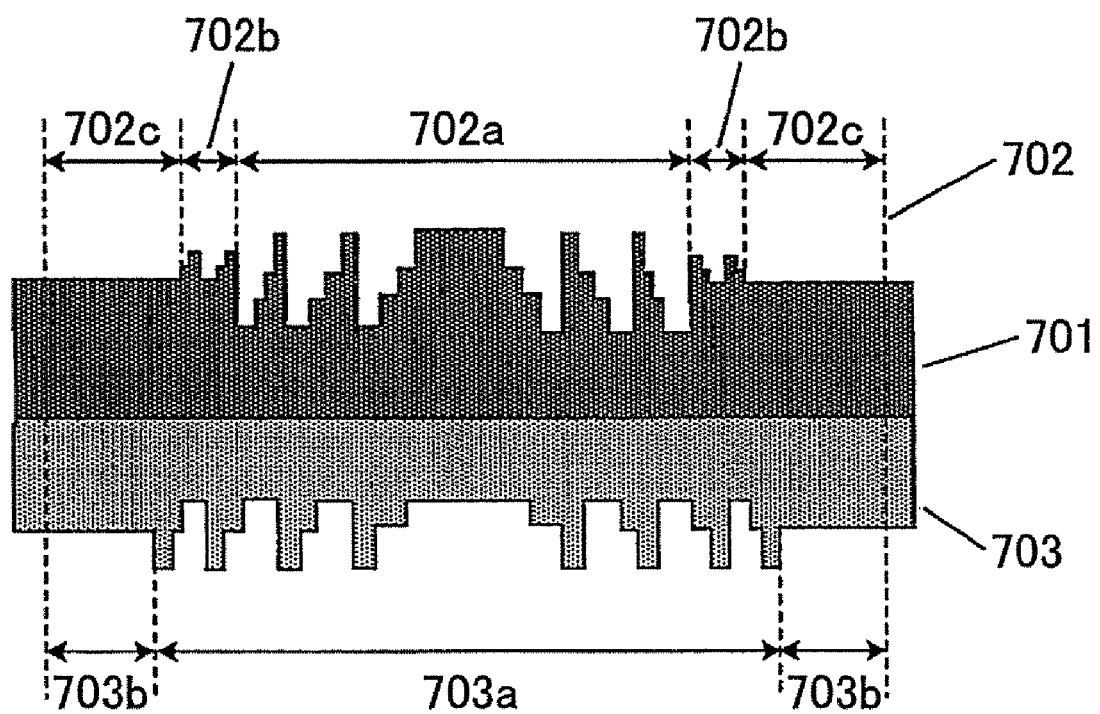
FIG. 23 is an enlarged cut-away side view of a third exemplary aberration correcting unit according to a third embodiment of the present invention.

FIG. 23 is an enlarged cut-away side view of an aberration correcting unit 701 according to a third embodiment of the present invention. The configuration of an optical pickup and the characteristics of an objective lens used in the third embodiment are substantially the same as those in the first embodiment. As shown in FIG. 23, the aberration correcting unit 701 has a first diffraction plane 702 and a second diffraction plane 703. The first diffraction plane 702 has substantially the same configuration as that of the first diffraction plane 502 of the first embodiment or the first diffraction plane 602 of the second embodiment. The second diffraction plane 703 has a configuration different from that of the second diffraction plane 503 of the first embodiment. The first diffraction plane 702 and the second diffraction plane 703 are made of different materials.

The groove depth D of a step-like structure in the second diffraction plane 703 is set at a very small value (a diffraction plane with such shallow grooves is hereafter called a shallow groove diffraction plane) so as to cause a phase difference of 1λ or lower for each of the first light, the second light, and the third light. In this case, the groove depth D can be determined almost regardless of the dispersion characteristics of the material.

Figure 24A:
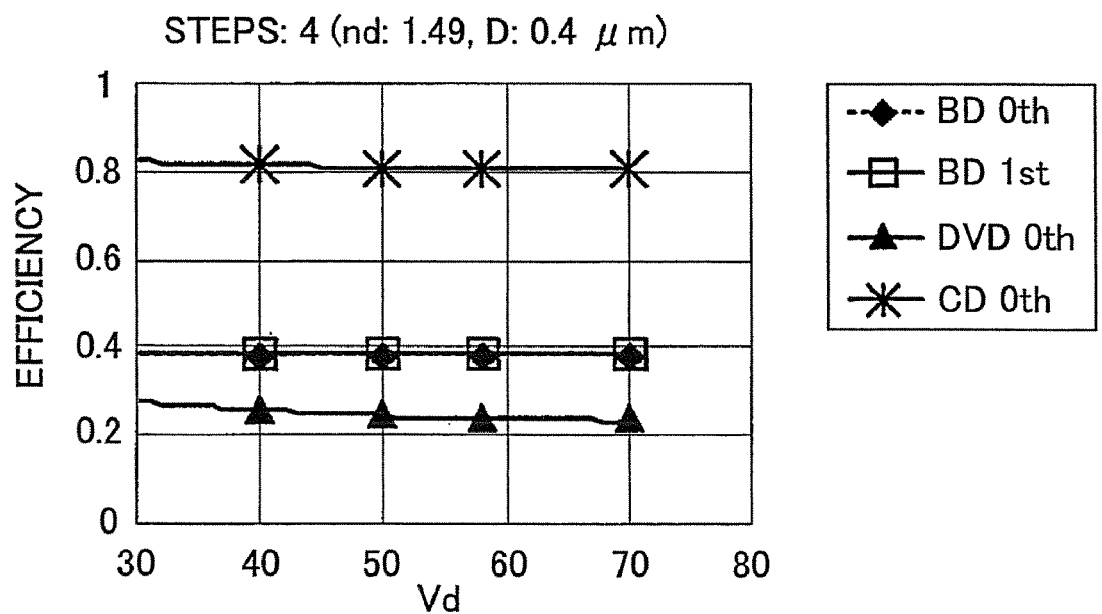
FIGS. 24A and 24B are graphs showing the relationship between the dispersion characteristic of a material of a shallow groove diffraction plane and the diffraction efficiency for each diffracted light.
Figure 24B:
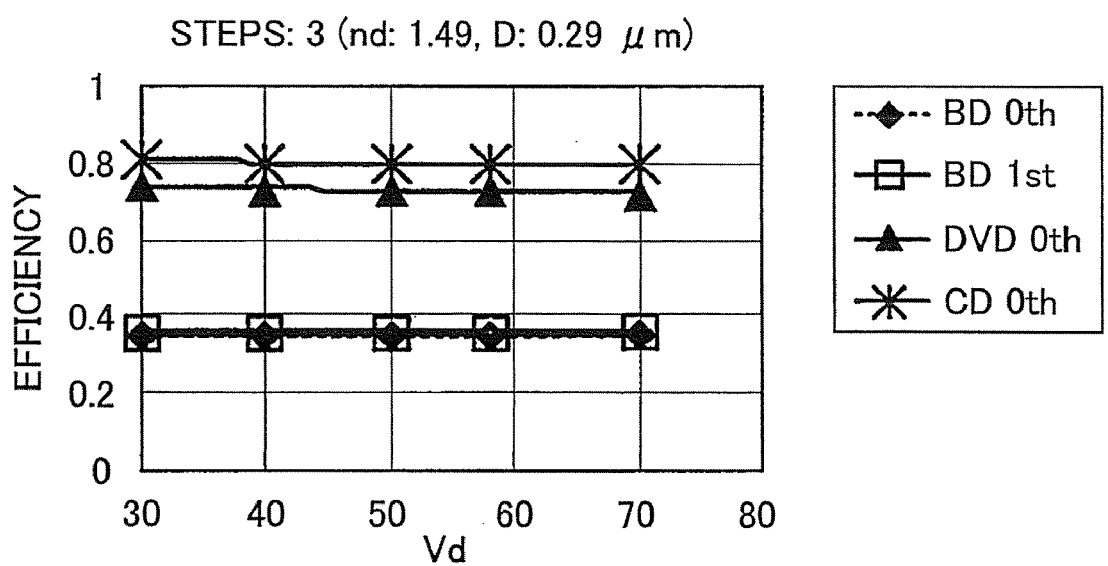

FIGS. 24A and 24B are graphs showing the relationship between the dispersion characteristic of a material of a shallow groove diffraction plane (phase difference by groove depth D is 1λ or lower) and the diffraction efficiency for each diffracted light. In the case of a shallow groove diffraction plane, the diffraction efficiency is substantially constant regardless of the dispersion characteristic of the material. Therefore, when the grooves are shallow, different materials may be used for the first diffraction plane 702 and the second diffraction plane 703.

Figure 25A:
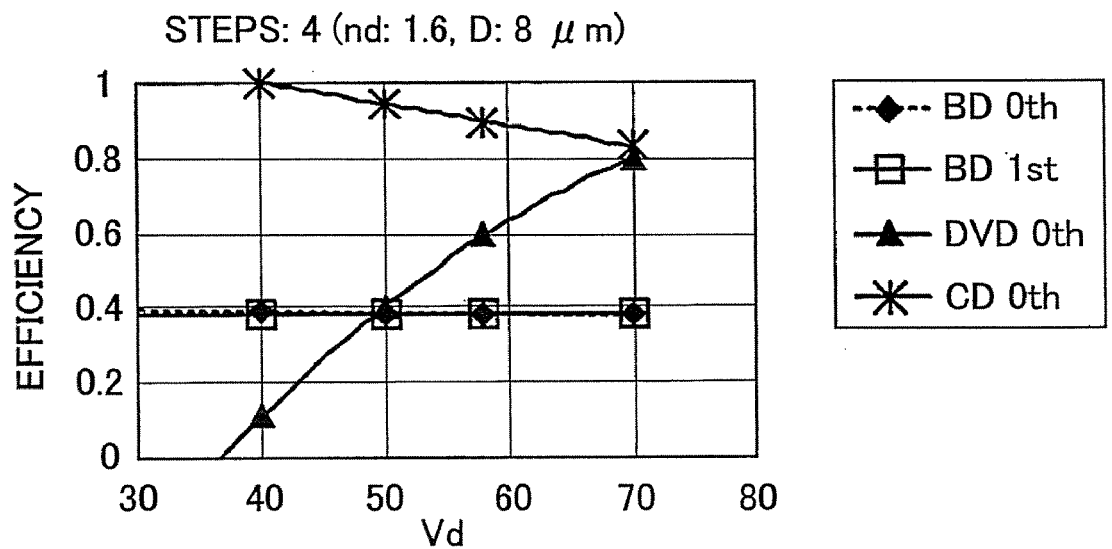
FIGS. 25A and 25B are graphs showing the relationship between the dispersion characteristic of a material of a deep groove diffraction plane and the diffraction efficiency for each diffracted light.
Figure 25B:
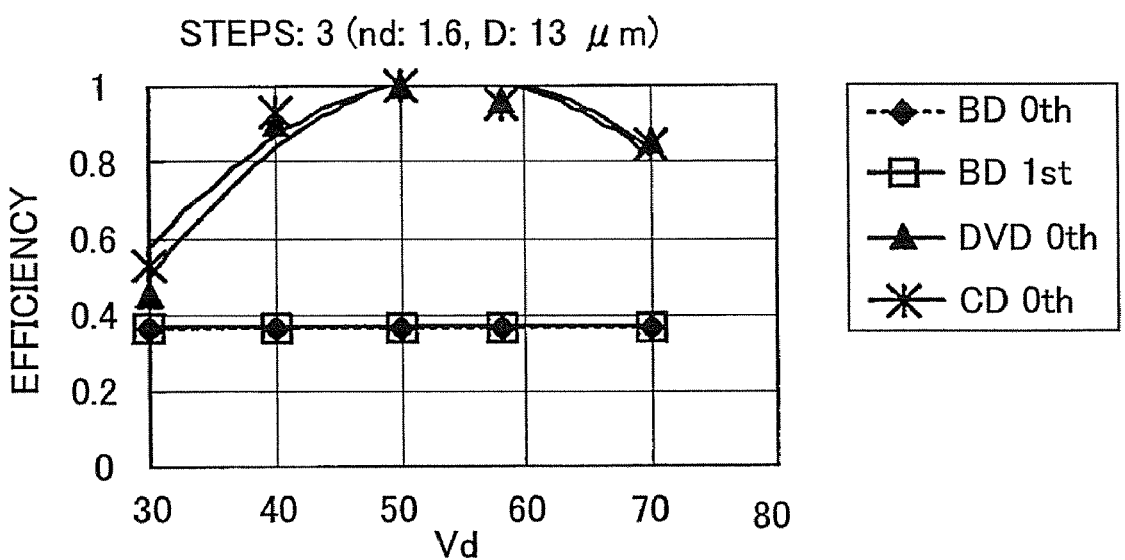

FIGS. 25A and 25B are graphs showing the relationship between the dispersion characteristic of a material (with a refractive index nd of 1.6 for D line) of a deep groove diffraction plane (groove depth D is between about 10 μm and 13 μm) and the diffraction efficiency for each diffracted light. In the case of a deep groove diffraction plane, the diffraction efficiency varies depending on the dispersion characteristic of the material. In this case, to achieve desired diffraction efficiency, it is preferable to use an ultra-low dispersion material with a Vd of about 70 for a four-step diffraction structure and a low-dispersion material with a Vd of about 50 for a three-step diffraction structure.

Thus, using different materials for the first diffraction plane and the second diffraction plane makes it possible to increase the diffraction efficiency of an aberration correcting unit.

Figure 26:
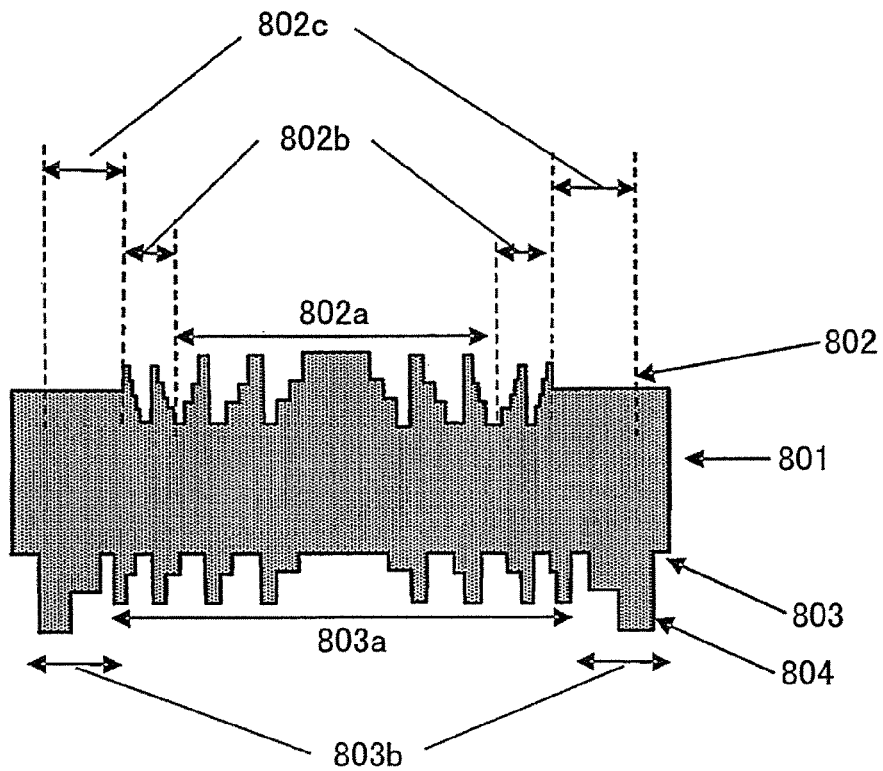
FIG. 26 is an enlarged cut-away side view of a fourth exemplary aberration correcting unit according to a fourth embodiment of the present invention.

FIG. 26 is an enlarged cut-away side view of an aberration correcting unit 801 according to a fourth embodiment of the present invention. The aberration correcting unit 801 has a first diffraction plane 802 and a second diffraction plane 803. In the aberration correcting unit 801, a step-like structure 804 is formed in a zone corresponding to a flat surface part of any one of the aberration correcting units 501, 601, and 701 (the third zone 502c, 602c, or 702c; or the second zone 503b, 603b, or 703b). In the example shown in FIG. 26, the step-like structure 804 is formed in a second zone 803b of the second diffraction plane 803. The step-like structure 804 is provided to correct chromatic aberration for the Blu-ray disk 107 for which short wavelength light and an optical system with a high NA are used.

In an optical information processing apparatus for recording and reproducing information on an optical recording medium, a semiconductor laser is used as a light source. The oscillation wavelengths of semiconductor lasers may differ from one to another and even the oscillation wavelength of a semiconductor laser may vary according to temperature change. Since the refractive index of an optical material changes depending on the wavelength of light (dispersion), variation in light source wavelength causes 3rd order spherical aberration. Such spherical aberration is one of the problems to be solved in optically recording or reproducing information. The amount of spherical aberration related to wavelength change becomes greater when a light source with a short wavelength and an optical system with a high NA are used.

This is because the change in refractive index of an optical material increases as the wavelength of light decreases and, as a result, the variation of spherical aberration related to wavelength change increases. Also, the variation of spherical aberration increases in proportion to the 4th power of NA. Therefore, when a light source with a short wavelength and an optical system with a high NA are used, wavelength change exerts greater influence on the accuracy of optical information recording and reproduction.

Figure 27:
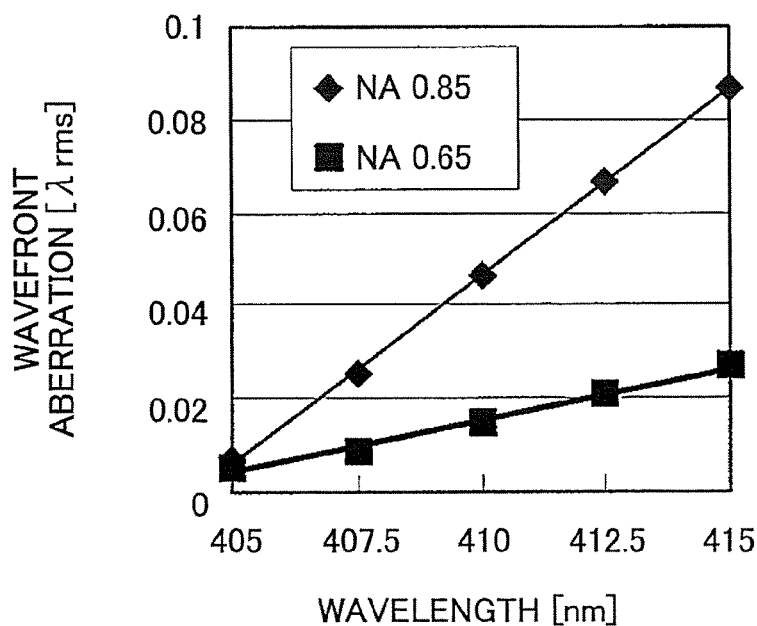
FIG. 27 is a graph showing the relationship between variation of wavefront aberration and wavelength change of light having an original wavelength of 405 nm when objective lenses with NAs of 0.65 and 0.85 are used.

FIG. 27 is a graph showing the relationship between variation of wavefront aberration and wavelength change of light having an original wavelength of 405 nm when objective lenses with NAs of 0.65 and 0.85 are used. As shown in FIG. 27, with a first objective lens having an NA of 0.65, wavefront aberration is contained equal to or below 0.03 λrms that is a performance requirement of the first objective lens even when the wavelength increases 10 nm from 405 nm design wavelength of the first objective length to 415 nm. However, with a second objective lens having an NA of 0.85, wavefront aberration exceeds 0.03λ rms when the wavelength increases 3 nm and makes it difficult to record and reproduce information.

Assuming that an optical information processing apparatus is used in ambient temperatures between 10° C. and 80° C., the wavelength of a semiconductor laser changes about 3 nm. Also, the variation of center wavelength is assumed to be about ±5 nm. When an objective lens with an NA of 0.85 is used in an optical system, it is necessary to correct spherical aberration caused by wavelength change as mentioned above.

The step-like structure 804 of the aberration correcting unit 801 is divided into concentric zones (steps) around the optical axis. The heights of the concentric zones increase as the distance from the optical axis increases. The height of each of the concentric zones is determined so as to cause an optical path difference of an integral multiple of 405 nm design wavelength of the objective lens 106.

Figure 28:
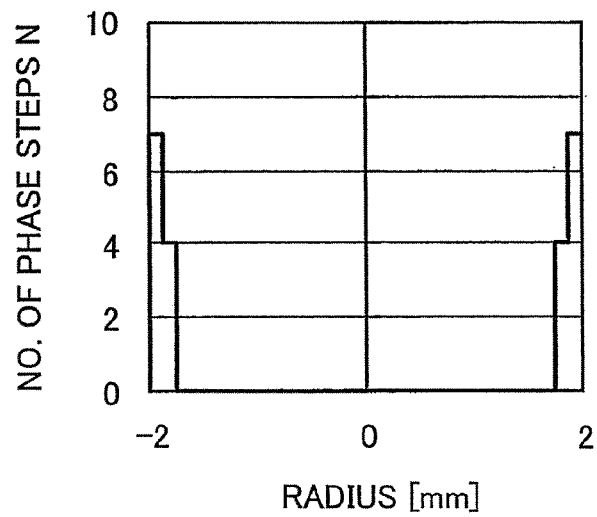
FIG. 28 is a graph showing the number of phase steps of a step-like structure.

FIG. 28 is a graph showing the number of phase steps of the step-like structure 804. In FIG. 28, the horizontal axis shows the position (radius) from the optical axis and the vertical axis shows the number of phase steps N. In the fourth embodiment, the numbers of phase steps N of the concentric zones are set at 8 and 4 (N=8, 4) and the step-like structure 804 is formed in the second zone 803b of the second diffraction plane 803. With this configuration, the step-like structure 804 has an effect only when a light spot is formed on the Blu-ray disk 107.

Figure 29:
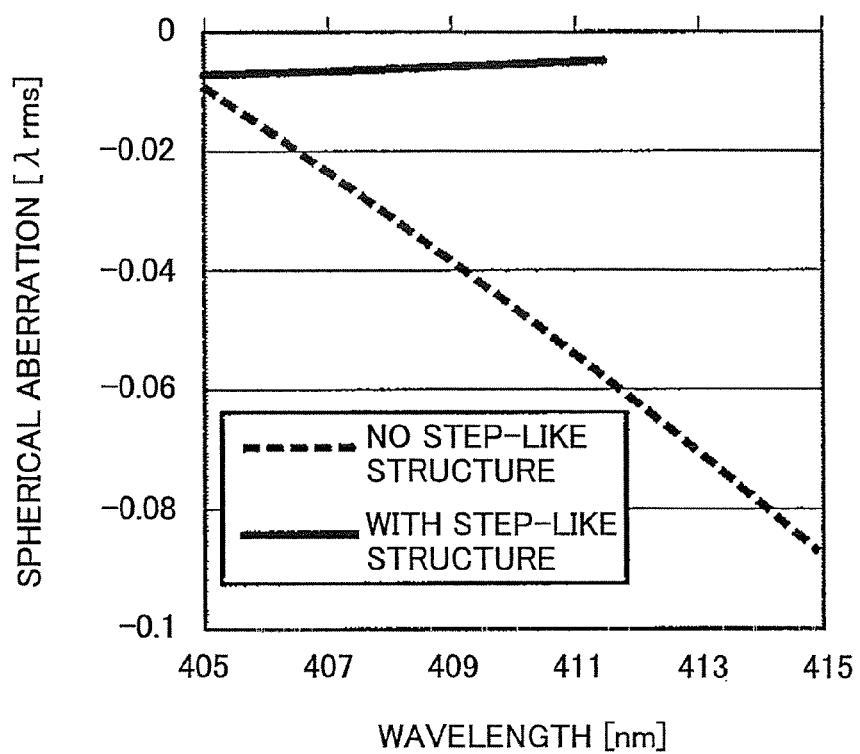
FIG. 29 is a graph showing the relationship between wavelength change and the amount of spherical aberration.
Figure 30:
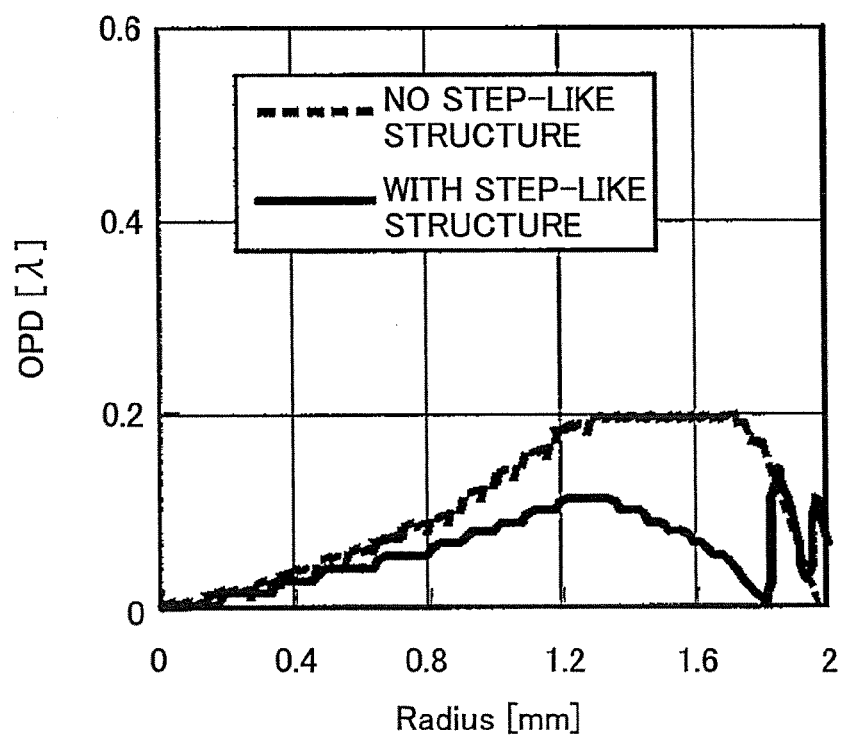
FIG. 30 is a graph showing change in wavefront phase when the wavelength changes 6 nm.

FIG. 29 is a graph showing the relationship between wavelength change and the amount of spherical aberration. In FIG. 29, the dotted line shows the relationship when the step-like structure 804 is not formed in the second diffraction plane 803 and the solid line shows the relationship when the step-like structure 804 is formed in the second diffraction plane 803. As the graph shows, the step-like structure 804 makes it possible to correct 3rd order spherical aberration. FIG. 30 is a graph showing change in wavefront phase when the wavelength changes 6 nm. The graph shows that the wavefront phase becomes discontinuous at the boundary between the concentric zones of the step-like structure 804. Thus, the step-like structure corrects 3rd order spherical aberration by causing the wavefront to change discontinuously.

The heights and positions (radius) of the concentric zones are not limited to those mentioned in the fourth embodiment and may be changed depending on the shape and the design wavelength of an objective lens, the material of an aberration correcting unit, and NAs to be provided.

Figure 31:
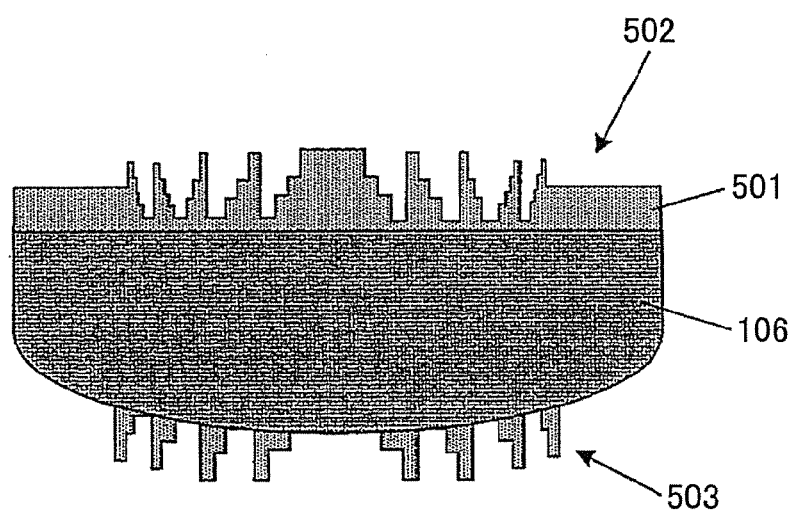
FIG. 31 is a cut-away side view of a fifth exemplary aberration correcting unit integrated with an objective lens according to a fifth embodiment of the present invention.

According to a fifth embodiment of the present invention, an aberration correcting unit is made up of one or more diffraction planes described in the first through fourth embodiments and an objective lens integrated with the diffraction planes. An exemplary aberration correcting unit shown in FIG. 31 is produced by combining the aberration correcting unit 501 of the first embodiment and the objective lens 106. The first and second diffraction planes 502 and 503 are formed on opposite surfaces of the objective lens 106. This configuration prevents misalignment between the optical axes of the objective lens 106 and an aberration correcting unit and thereby makes it possible to reduce wavefront degradation, to improve the efficiency of the assembly process, and to reduce costs.

The exemplary aberration correcting unit of the fifth embodiment may also be configured to include only one of the first and second diffraction planes 502 and 503. In this case, a diffraction plane may be formed on either side (incident side or exit side) of the objective lens 106. Also, a diffraction plane(s) and the objective lens 106 may be formed as a monolithic structure. Further, it is possible to form a diffraction structure(s) directly on the objective lens 106. In this case, an ultraviolet curing resin is preferable as the material of the diffraction structure in terms of ease of production.

An exemplary aberration correcting unit according to a sixth embodiment of the present invention is described below. The configuration of an optical pickup and the characteristics of an objective lens used in the sixth embodiment are substantially the same as those in the first embodiment. The exemplary aberration correcting unit of the sixth embodiment (hereafter called a sixth aberration correcting unit) has a diffraction structure configured to reduce total coma aberration in an optical pickup caused by horizontal misalignment between the optical axes of the sixth aberration correcting unit and the objective lens 106 (hereafter may be just called "horizontal misalignment"). Total coma aberration of an optical pickup in this case means coma aberration of a light spot formed on an optical recording medium.

A first diffraction plane of the sixth aberration correcting unit has a function to change the finite magnification of light and thereby to convert the light into divergent light and a function to apply spherical aberration to the divergent light. The sixth aberration correcting unit corrects spherical aberration using the two functions.

Figure 32A:
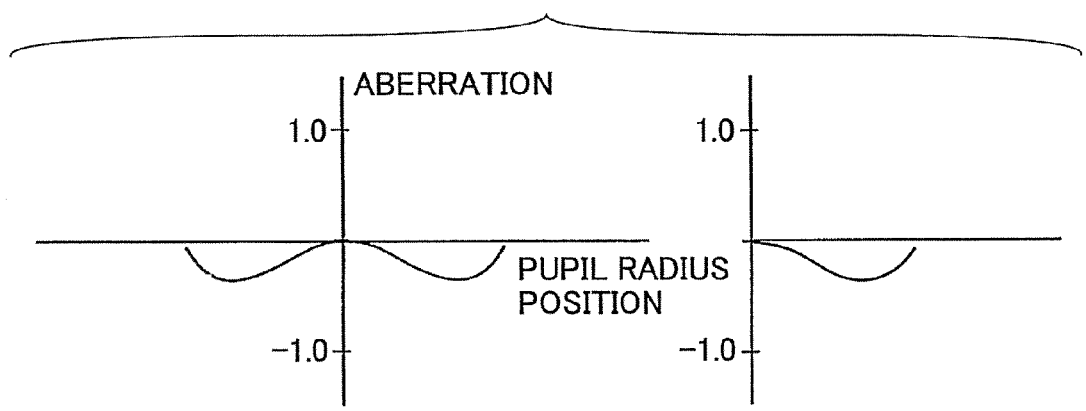
FIGS. 32A and 32B are graphs showing aberration caused by an objective lens and spherical aberration of divergent light diffracted by a diffraction plane of a sixth exemplary aberration correcting unit according to a sixth embodiment of the present invention when the working distance is set at 0.57 mm for DVDs and the horizontal misalignment between the optical axes of the optical lens and the sixth exemplary aberration correcting unit is 0 μm.
Figure 32B:
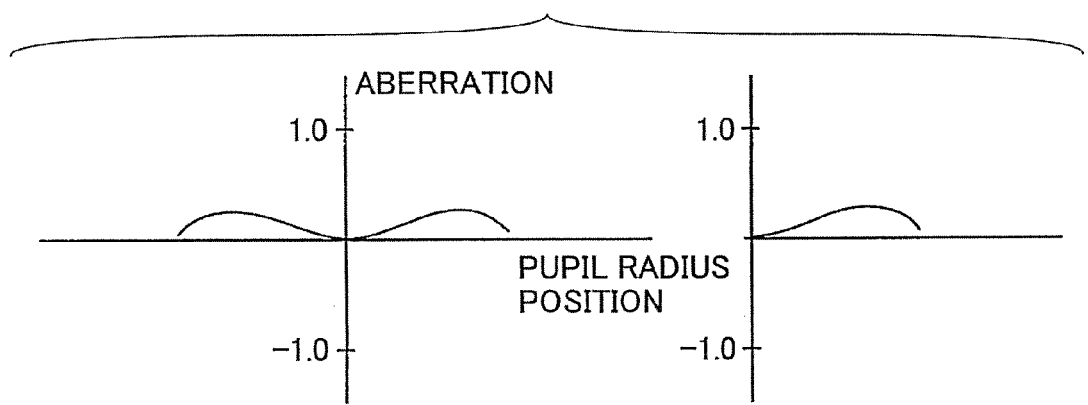

When the second light with a wavelength of 660 nm for DVDs enters the first diffraction plane of the sixth aberration correcting unit, the finite magnification of the second light is changed and the second light is thereby output to the objective lens 106 as divergent light. At the same time, spherical aberration is applied to the divergent light by the first diffraction plane. FIG. 32A is a graph showing the relationship between aberration caused by an objective lens and pupil radius positions, and FIG. 32B is a graph showing the relationship between spherical aberration of the divergent light and pupil radius positions. As the graphs show, the aberration caused by an objective lens and the spherical aberration of the divergent light are in opposite directions and therefore offset each other. Thus, the above configuration makes it possible to sufficiently correct spherical aberration and thereby to form an accurate light spot on a DVD.

The amounts of the aberration caused by an objective lens and the spherical aberration of the divergent light can be adjusted by setting the working distance, when designing a diffraction plane, to suit the second light with a wavelength of 660 nm used for DVDs. "Working distance" (WD) in this case means a distance an objective lens can move in the optical axis direction.

Figure 32C:
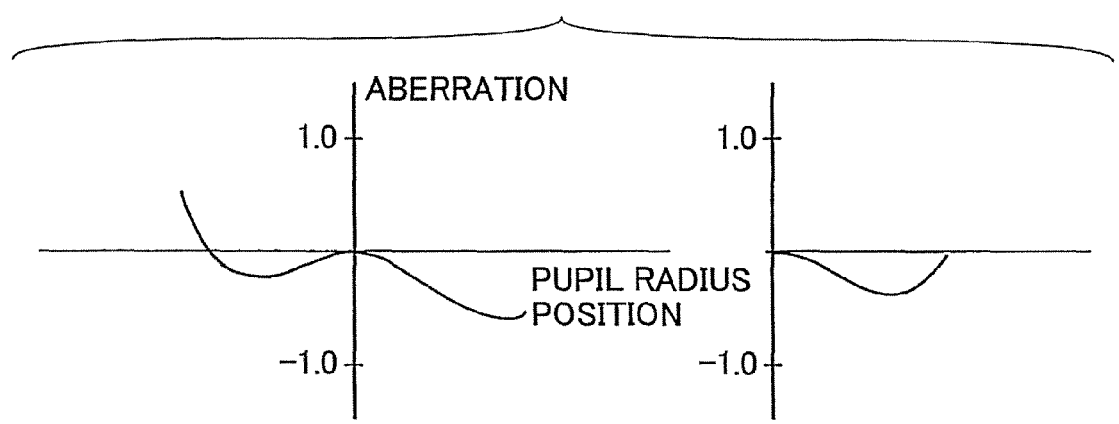
FIGS. 32C and 32D are graphs showing aberration caused by an objective lens and spherical aberration of divergent light diffracted by the diffraction plane of the sixth exemplary aberration correcting unit when the working distance is set at 0.57 mm for DVDs and the horizontal misalignment is 200 μm.
Figure 32D:
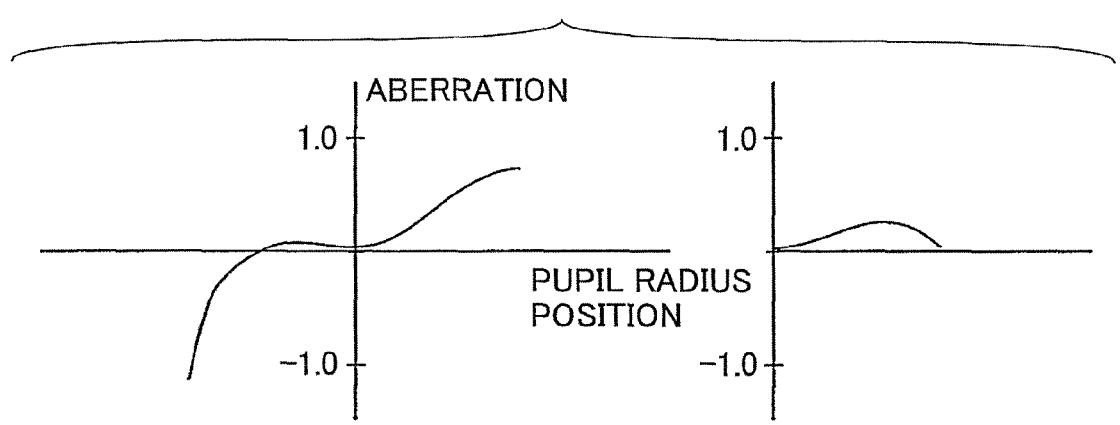
Figure 33:
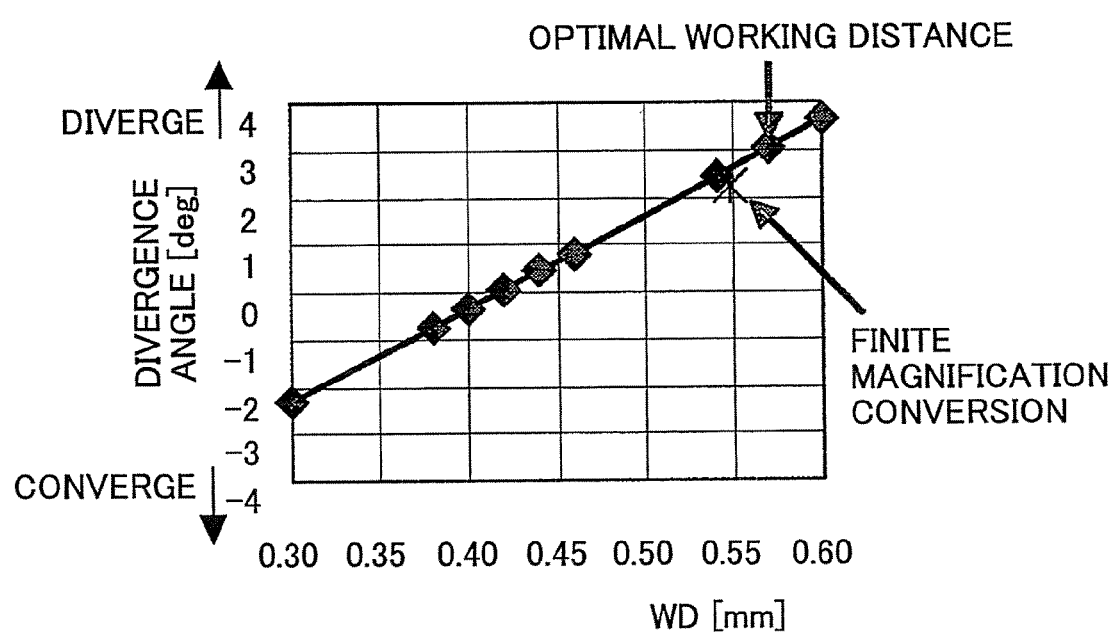
FIG. 33 is a graph showing the relationship between the working distance and the divergence angle of light entering an objective lens.

FIG. 33 is a graph showing the relationship between the working distance and the divergence angle of light entering an objective lens. As shown in FIG. 33, the working distance and the divergence angle change linearly. Therefore, the amount of aberration caused by an objective lens can be adjusted by changing the working distance and optimally designing a diffraction plane according to the working distance. For example, the working distance is set at 0.57 mm in FIGS. 32A through 32D, at 0.42 mm in FIGS. 34A through 34D, and at 0.60 mm in FIGS. 35A through 35D.

Figure 34A:
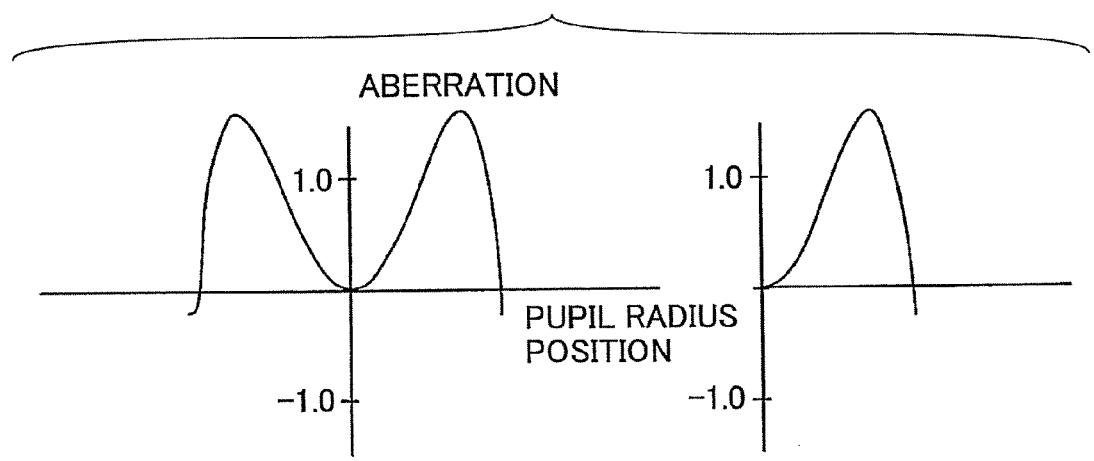
FIGS. 34A and 34B are graphs showing aberration caused by an objective lens and spherical aberration of divergent light diffracted by a diffraction plane of the sixth exemplary aberration correcting unit when the working distance is set at 0.42 mm for DVDs and horizontal misalignment between the optical axes of the optical lens and the sixth exemplary aberration correcting unit is 0 μm.
Figure 34B:
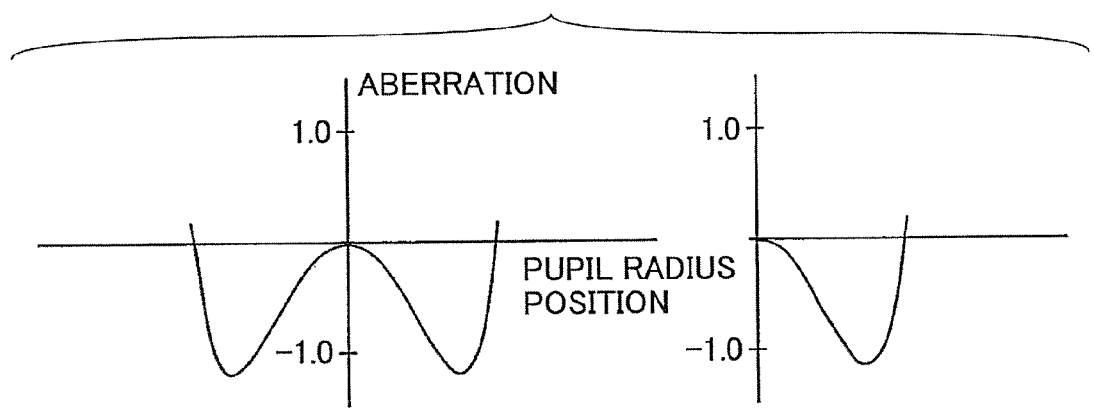
Figure 35A:
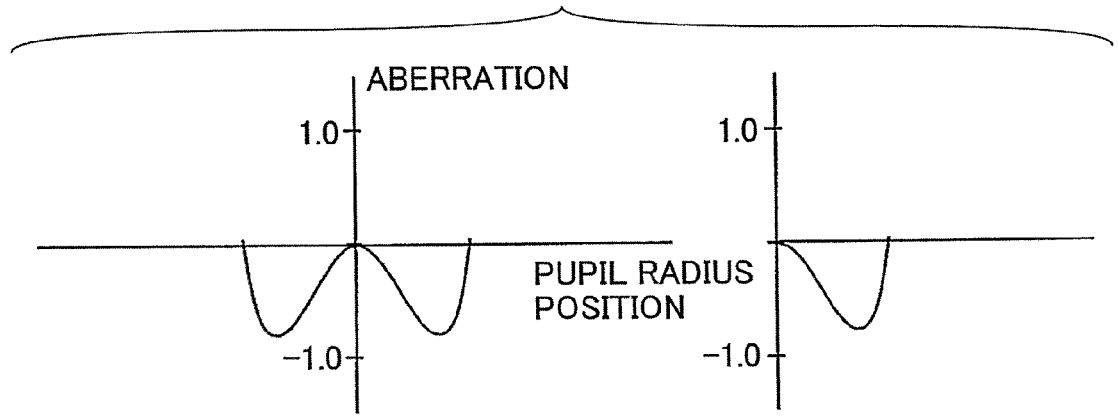
FIGS. 35A and 35B are graphs showing aberration caused by an objective lens and spherical aberration of divergent light diffracted by a diffraction plane of the sixth exemplary aberration correcting unit when the working distance is set at 0.60 mm for DVDs and the horizontal misalignment between the optical axes of the optical lens and the sixth exemplary aberration correcting unit is 0 μm.
Figure 35B:
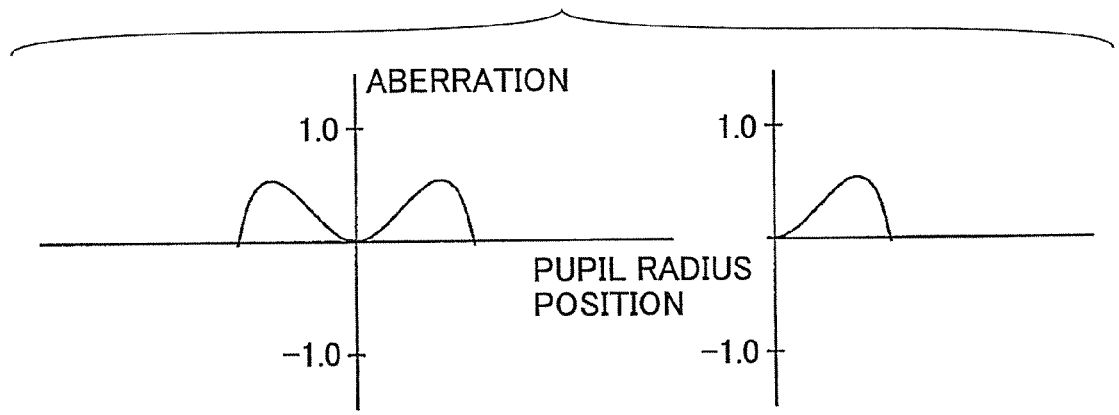
Figure 35C:
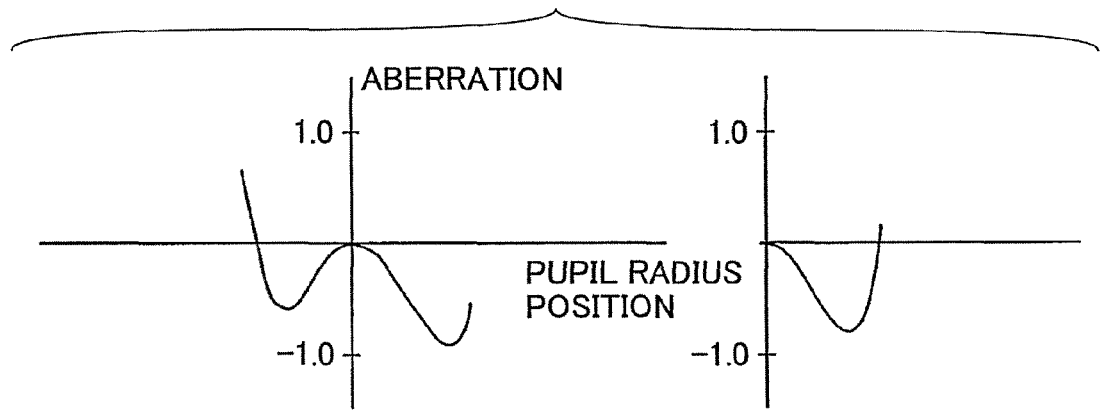
FIGS. 35C and 35D are graphs showing aberration caused by an objective lens and spherical aberration of divergent light diffracted by the diffraction plane of the sixth exemplary aberration correcting unit when the working distance is set at 0.60 mm for DVDs and the horizontal misalignment is 200 μm.
Figure 35D:
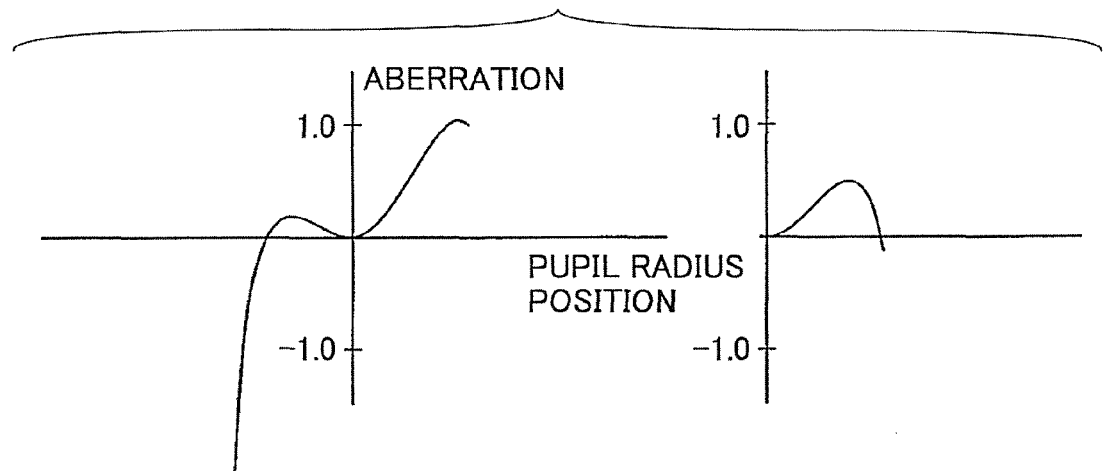

As shown in FIGS. 32A, 34A, and 35A, the aberration caused by an objective lens varies depending on the working distance. In any of the above configurations, the aberration caused by an objective lens (FIG. 32A, 34A, or 35A) and the spherical aberration of the divergent light (FIG. 32B, 34B, or 35B) are in opposite directions and are substantially the same in amount, and therefore offset each other. Thus, the above configurations make it possible to sufficiently correct spherical aberration and thereby to form an accurate light spot on a DVD. Diffraction planes designed for working distances of 0.42 mm, 0.57 mm, and 0.60 mm have different phase coefficients and therefore the numbers of orbicular ridges in the diffraction planes are set, for example, at 10, 65, and 77, respectively.

Figure 36:
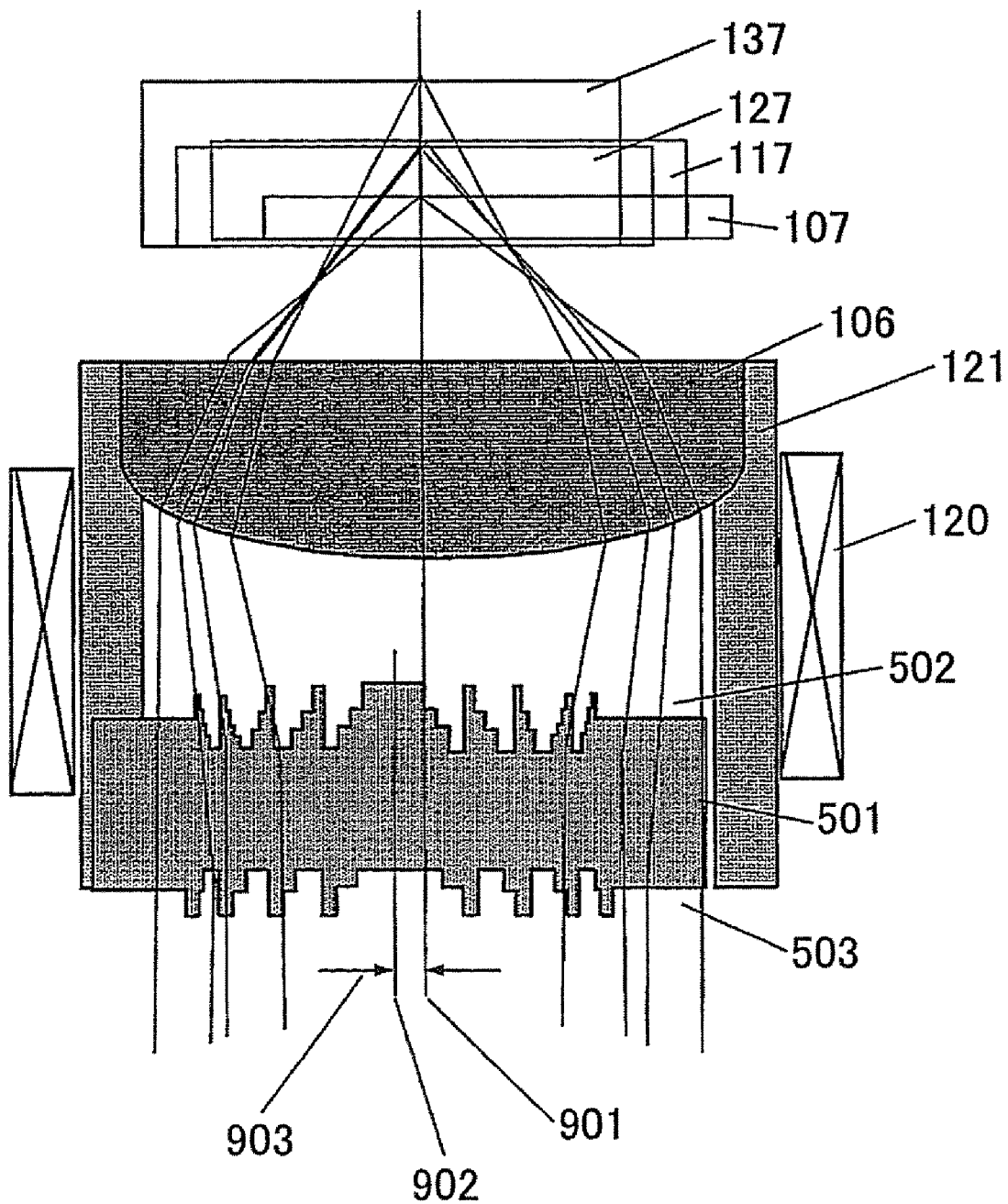
FIG. 36 is an enlarged cut-away side view of an exemplary aberration correcting unit and an objective lens the optical axes of which are misaligned horizontally.

FIG. 36 is an enlarged cut-away side view of the aberration correcting unit 501 and the objective lens 106 the optical axes of which are misaligned horizontally. Aberration caused by the horizontal misalignment between the optical axes of the aberration correcting unit 501 and the objective lens 106 is described below.

In FIG. 36, an optical axis 901 of the objective lens 106 and an optical axis 902 of the aberration correcting unit 501 are misaligned horizontally (horizontal misalignment 903). In other words, the optical axis 902 is shifted in a direction perpendicular to the optical axis 901. FIG. 32C is a graph showing the relationship between aberration caused by an objective lens and pupil radius positions, and FIG. 32D is a graph showing the relationship between spherical aberration of divergent light and pupil radius positions. In both of the graphs, it is assumed that the working distance is set at 0.57 for DVDs and the horizontal misalignment is 200 μm.

When the second light with a wavelength of 660 nm for the DVD 127 enters the first diffraction plane 502 of the aberration correcting unit 501, the finite magnification of the second light is changed and the second light is thereby output to the objective lens 106 as divergent light. At the same time, spherical aberration is applied to the divergent light by the first diffraction plane 502. FIG. 32C shows aberration caused by the objective lens 106, and FIG. 32D shows spherical aberration of the divergent light.

Coma aberration caused by a horizontal shift of the wavefront related to the objective lens 106 (FIG. 32C) and coma aberration caused by a horizontal shift of the spherical aberration of the divergent light (FIG. 32D) are in opposite directions and are substantially the same in amount, and therefore offset each other. Thus, the above configurations make it possible to sufficiently correct coma aberration even when the optical axes of the aberration correcting unit 501 and the objective lens 106 are misaligned.

Figure 37:
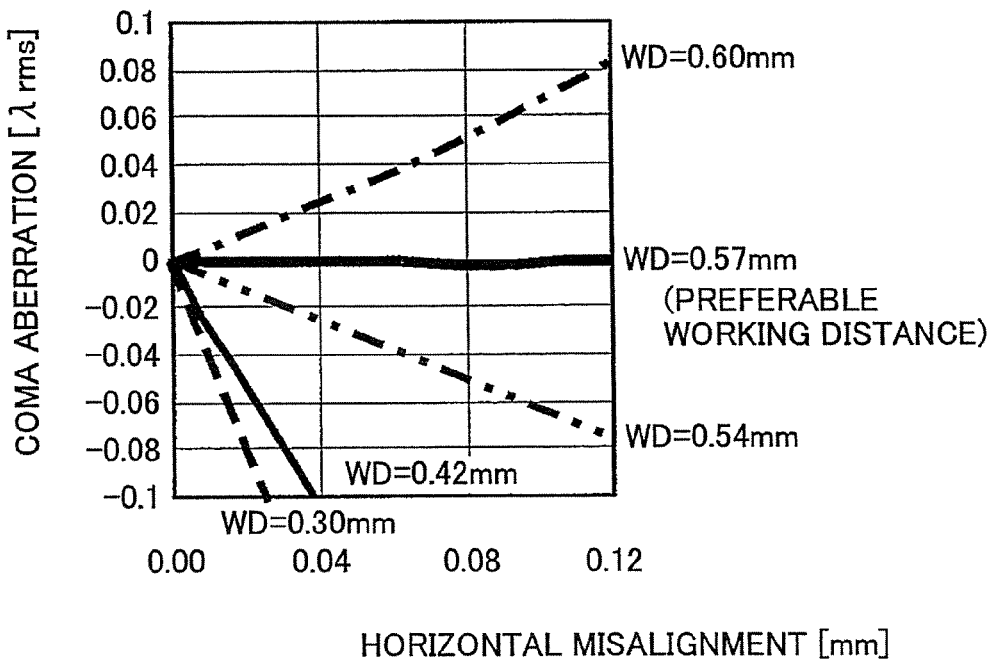
FIG. 37 is a graph showing the relationship between horizontal misalignment and coma aberration on a DVD for different working distances.

FIG. 37 is a graph showing the relationship between horizontal misalignment and coma aberration on a DVD for different working distances. In the graph, the horizontal axis shows horizontal misalignment and the vertical axis shows coma aberration. When the working distance is 0.57 mm (FIGS. 32C and 32D), almost no coma aberration is observed regardless of the amount of horizontal misalignment. When the working distance is 0.42 mm (FIGS. 34C and 34D) or 0.6 mm (FIGS. 35C and 35D), the amount of coma aberration increases as the amount of horizontal misalignment increases. In these cases, as shown in FIGS. 34C, 34D, 35C, and 35D, the coma aberration related to the objective lens 106 and the coma aberration related to the spherical aberration of the divergent light are not symmetrical in direction and amount and therefore do not offset each other.

Figure 34C:
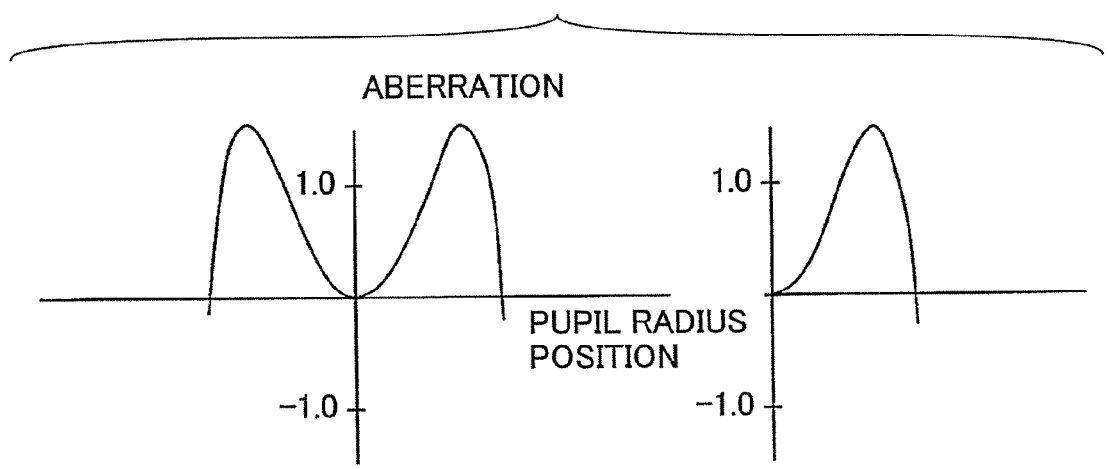
FIGS. 34C and 34D are graphs showing aberration caused by an objective lens and spherical aberration of divergent light diffracted by the diffraction plane of the sixth exemplary aberration correcting unit when the working distance is set at 0.42 mm for DVDs and the horizontal misalignment is 200 μm.
Figure 34D:
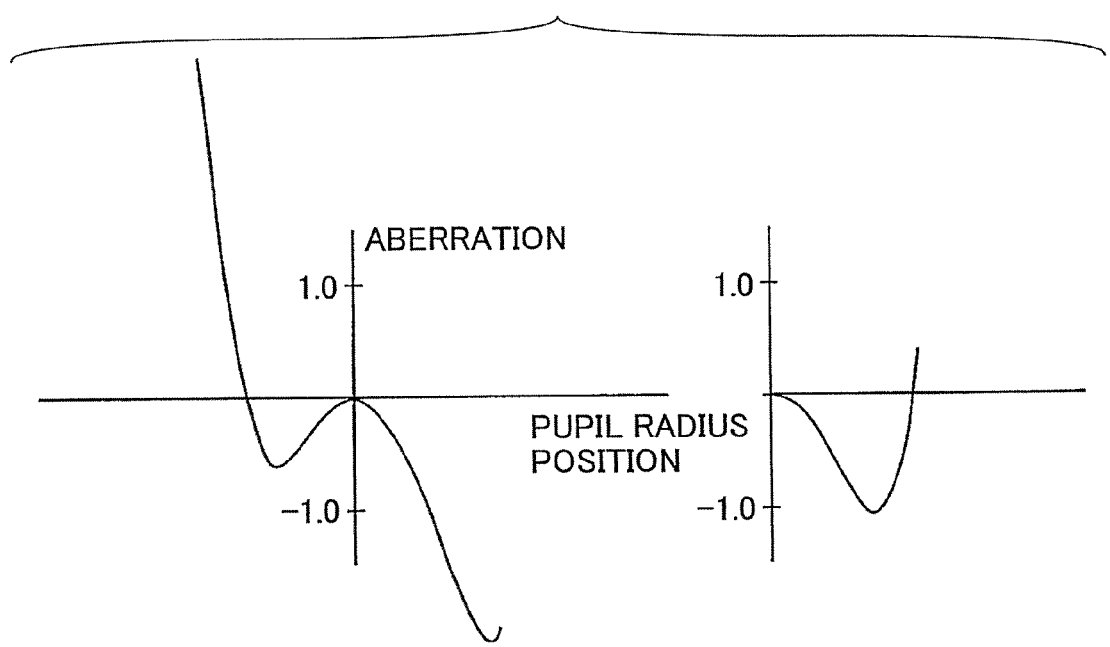

Light output from a diffraction plane designed for a working distance of 0.42 mm is substantially collimated. In this case, as shown in FIG. 34C, coma aberration is not caused by a horizontal shift of the wavefront related to the objective lens 106. As a result, the coma aberration related to the objective lens 106 and the coma aberration related to the spherical aberration of the divergent light become asymmetrical and therefore do not offset each other. In other words, to reduce coma aberration caused by horizontal misalignment, light to be output from a diffraction plane and to enter an objective lens is preferably divergent light.

Using a diffraction plane configured to reduce coma aberration caused by horizontal misalignment as described above makes it possible to loosen the assembly tolerance or manufacturing tolerance, for example, in assembling the aberration correcting unit 501, the objective lens 106, and the cylindrical lens barrel 121, in producing the objective lens 106 and the aberration correcting unit 501 as a monolithic structure, or in forming the first and second diffraction planes 502 and 503, and thereby makes it possible to constantly produce high-precision optical pickups.

A design policy for an optical pickup according to embodiments of the present invention is described below. As described above, diffraction planes designed for working distances of 0.42 mm, 0.57 mm, and 0.60 mm have different phase coefficients and therefore the numbers of orbicular ridges in the diffraction planes are set, for example, at 10, 65, and 77, respectively. Thus, the number of orbicular ridges in a diffraction plane increases as the working distance increases and the pitch between the orbicular ridges or grooves becomes narrower. As a result, the manufacturing tolerance of a diffraction plane becomes stricter. Although a diffraction plane designed for a working distance of 0.57 mm effectively reduces coma aberration caused by horizontal misalignment, the number of orbicular ridges becomes large. When designing a diffraction plane, it is necessary to achieve a balance between the capability to correct coma aberration caused by horizontal misalignment and the manufacturing tolerance. Designing a diffraction plane in such a manner makes it possible to allow greater assembly tolerance concerning horizontal misalignment and greater manufacturing tolerance concerning the pitches between orbicular ridges or grooves in a diffraction structure, and thereby makes it possible to provide a stable and highly accurate diffracting device.

Figure 38:
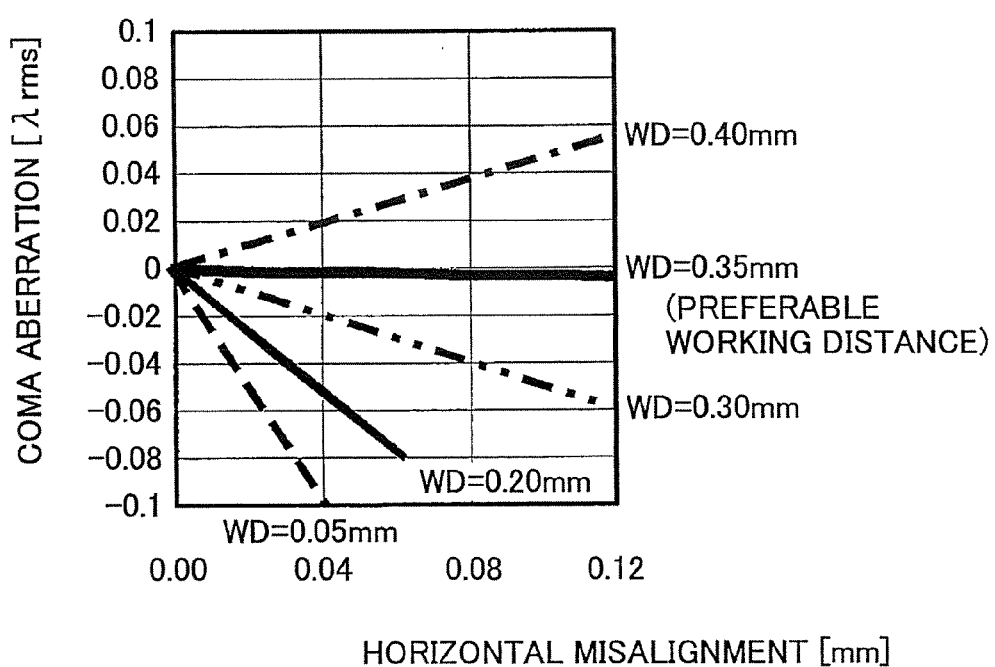
FIG. 38 is a graph showing the relationship between horizontal misalignment and coma aberration on a CD for different working distances.

Although the exemplary diffraction plane described above is configured to correct coma aberration caused by horizontal misalignment for DVDs, a diffraction plane may be configured to correct coma aberration caused by horizontal misalignment for CDs. FIG. 38 is a graph showing the relationship between horizontal misalignment and coma aberration on a CD for different working distances. In the graph, the horizontal axis shows horizontal misalignment and the vertical axis shows coma aberration. When the working distance is 0.35 mm, almost no coma aberration is observed regardless of the amount of horizontal misalignment.

Figure 39:
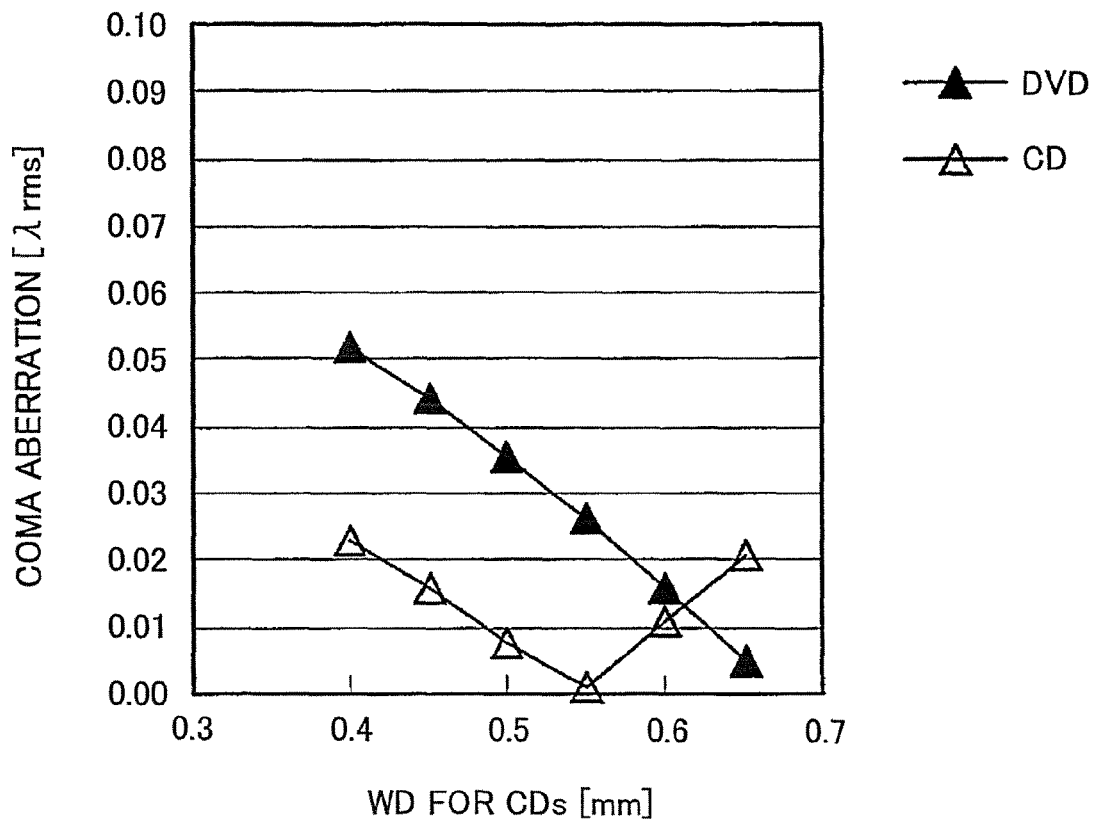
FIG. 39 is a graph showing the relationship between working distances and coma aberration on a CD and a DVD when the horizontal misalignment is 30 μm.

Next, an exemplary configuration for reducing coma aberration caused by horizontal misalignment for both DVDs and CDs is described. FIG. 39 is a graph showing the relationship between working distances and coma aberration on a CD and a DVD when the horizontal misalignment is 30 µm. In the graph, the horizontal axis shows working distances for CDs that use −2nd order diffracted light and the vertical axis shows coma aberration. In the sixth embodiment described above, the first diffraction plane of the sixth aberration correction unit is configured differently for DVDs and CDs to correct coma aberration caused by horizontal misalignment. To reduce coma aberration caused by horizontal misalignment for both DVDs and CDs, the diffraction structure in the first diffraction plane is preferably designed to provide a working distance of 0.62.

Figure 40:
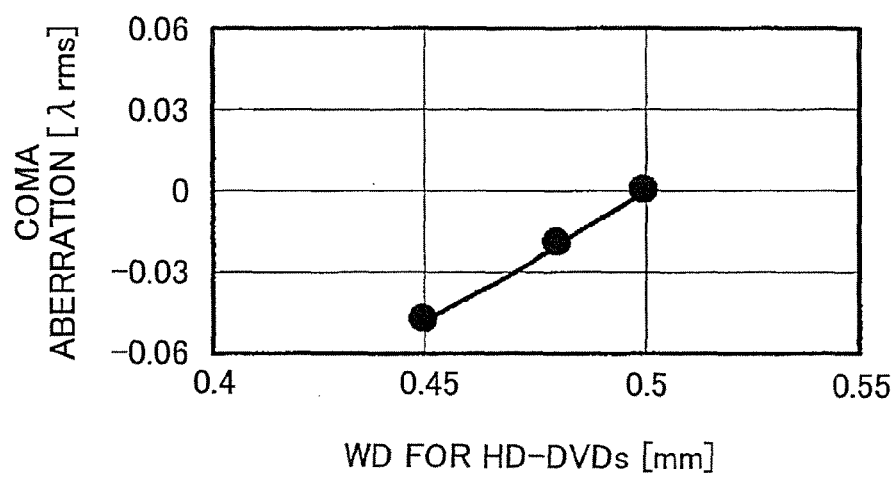
FIG. 40 is a graph showing the relationship between working distances and coma aberration on an HD-DVD when the horizontal misalignment is 30 μm.

Also, the diffraction structure in the second diffraction plane of the sixth aberration correction unit may be configured to correct coma aberration caused by horizontal misalignment for HD-DVDs. FIG. 40 is a graph showing the relationship between working distances and coma aberration on an HD-DVD when the horizontal misalignment is 30 µm. In the graph, the horizontal axis shows working distances for HD-DVDs and the vertical axis shows coma aberration. When the working distance is 0.5 mm, almost no coma aberration is observed. The number of orbicular ridges in a diffraction structure designed for a working distance of 0.5 mm is 100. A diffraction structure designed for a working distance of 0.47 mm may also be used in a case where coma aberration of up to 0.03 λrms at horizontal misalignment of 30 µm is acceptable.

As described above, the first diffraction plane of the sixth aberration correcting unit according to the sixth embodiment has a function to change the finite magnification of light and thereby to convert the light into divergent light and a function to apply spherical aberration to the divergent light, and is configured to correct spherical aberration using the two functions. Also, the first diffraction plane of the sixth aberration correcting unit is designed taking into account the balance between the capability to correct coma aberration caused by horizontal misalignment and the manufacturing tolerance concerning the pitches between orbicular ridges or grooves in a diffraction structure. Thus, the sixth embodiment makes it possible to allow greater assembly tolerance and greater manufacturing tolerance.

An exemplary aberration correcting unit (hereafter called seventh aberration correcting unit) according to a seventh embodiment of the present invention is described below. The configuration of an optical pickup and the characteristics of an objective lens used in the seventh embodiment are substantially the same as those in the first embodiment. The seventh aberration correcting unit, like the sixth aberration correcting unit, has a diffraction structure configured to reduce total coma aberration in an optical pickup caused by horizontal misalignment between the optical axes of the seventh aberration correcting unit and the objective lens 106.

A first diffraction plane of the seventh aberration correcting unit has a function to change the finite magnification of light and thereby to convert the light into divergent light and a function to cause spherical aberration to the divergent light. The seventh aberration correcting unit corrects spherical aberration using the two functions.

In the sixth embodiment, as described above, when the second light with a wavelength of 660 nm for DVDs enters the first diffraction plane (for a WD of 0.57 mm) of the sixth aberration correcting unit, the finite magnification of the second light is changed and the second light is thereby output to the objective lens 106 as divergent light. At the same time, spherical aberration is applied to the divergent light by the first diffraction plane. As shown in FIGS. 32A and 32B, the aberration caused by an objective lens and the spherical aberration of the divergent light are in opposite directions and therefore offset each other. Thus, the sixth embodiment makes it possible to sufficiently correct spherical aberration and thereby to form an accurate light spot on a DVD.

Figure 41A:
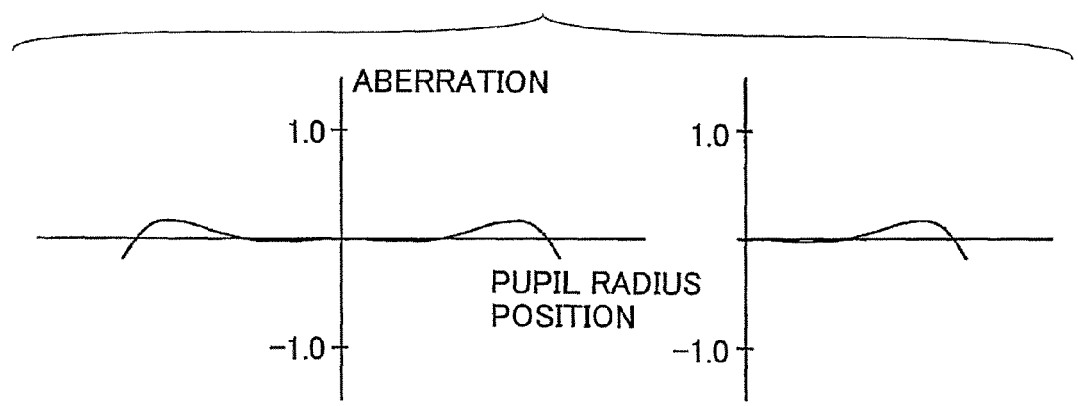
FIGS. 41A and 41B are graphs showing aberration caused by an objective lens and spherical aberration of divergent light diffracted by a diffraction plane of a seventh exemplary aberration correcting unit when the working distance is set at 0.54 mm for DVDs and horizontal misalignment between the optical axes of the optical lens and the seventh exemplary aberration correcting unit is 0 μm.
Figure 41B:
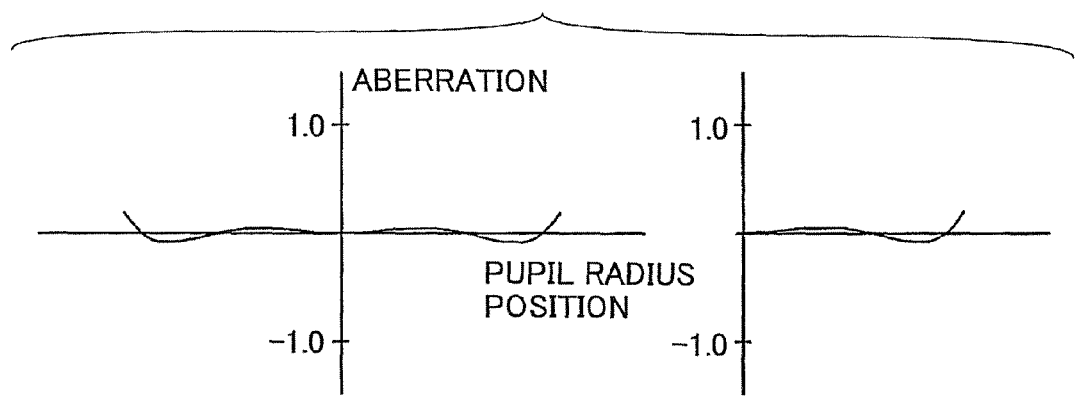

Meanwhile, FIG. 41A shows aberration caused by an objective lens where the second light with a wavelength of 660 nm is diffracted by a first diffraction plane designed for a working distance of 0.54 mm and output to the objective lens 106 as divergent light. In this case, as shown in FIG. 41A, the wavefront phase of the second light is substantially flat. This means that the aberration caused by an objective lens is corrected just by changing the finite magnification of the second light. Accordingly, as shown in FIG. 41B, the amount of spherical aberration applied to the divergent light by the first diffraction plane designed for a working distance of 0.54 mm is substantially zero. When the number of orbicular ridges and the minimum pitch of a diffraction structure designed for a working distance of 0.54 mm are Nm2 and Pm2, respectively, a number of orbicular ridges Na1 and a minimum pitch Pa1 of the diffraction structure in the first diffraction plane of the seventh aberration correcting unit of the seventh embodiment are so determined that formulas Na1≧Nm2 and Pa1≦Pm2 become true.

An advantage of setting the number of orbicular ridges Na1 and the minimum pitch Pa1 to satisfy formulas Na1≧Nm2 and Pa1≦Pm2 is described below. As described above, to reduce coma aberration caused by horizontal misalignment between the optical axes of the objective lens 106 and the first diffraction plane 502 of the aberration correcting unit 501, it is necessary to design the first diffraction plane 502 so that coma aberration caused by a horizontal shift of the wavefront related to the objective lens 106 (FIG. 32C) and coma aberration caused by a horizontal shift of the spherical aberration of the divergent light (FIG. 32D) occur in opposite directions.

Meanwhile, when collimated light is focused by an objective lens on a DVD, positive spherical aberration occurs as shown in FIG. 34A. To make coma aberration caused by horizontal misalignment symmetrical as shown in FIGS. 32A and 32B, a diffraction structure is preferably designed to make the divergence angle of divergent light larger than that of FIG. 41A so that negative spherical aberration occurs and to apply positive spherical aberration to the divergent light to offset the negative spherical aberration.

Normally, the divergence angle of light diffracted by a diffraction structure becomes larger as the pitch of the diffraction structure becomes narrower and the number of orbicular ridges in the diffraction structure becomes larger. Therefore, to make the divergence angle of divergent light larger than that of FIG. 41A where aberration caused by an objective lens is corrected just by changing the finite magnification of light, it is necessary to increase the number of orbicular ridges and to reduce the minimum pitch of a diffraction structure. In other words, the number of orbicular ridges and the minimum pitch of a diffraction structure is preferably determined to satisfy formulas Na1≧Nm2 and Pa1≦Pm2.

Using a diffraction plane configured to reduce coma aberration caused by horizontal misalignment as described above makes it possible to loosen the assembly tolerance or manufacturing tolerance, for example, in assembling the aberration correcting unit 501, the objective lens 106, and the cylindrical lens barrel 121, in producing the objective lens 106 and the aberration correcting unit 501 as a monolithic structure, or in forming the first and second diffraction planes 502 and 503, and thereby makes it possible to constantly produce high-precision optical pickups.

Figure 42:
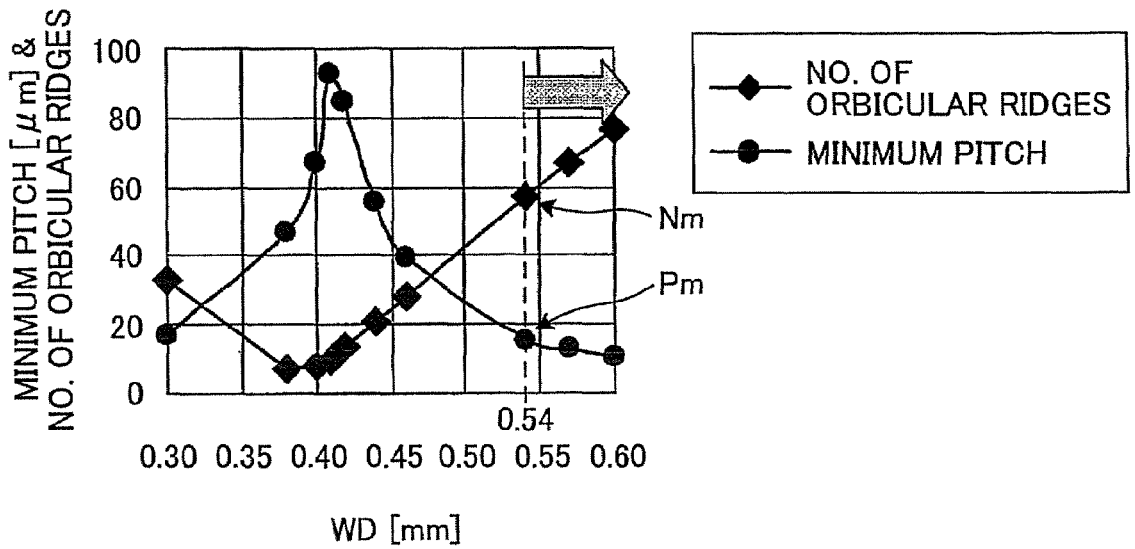
FIG. 42 is a graph showing the numbers of orbicular ridges and the minimum pitches of diffraction structures optimally designed for corresponding working distances.

FIG. 42 is a graph showing the numbers of orbicular ridges and the minimum pitches of diffraction structures optimally designed for corresponding working distances. As mentioned above, when the number of orbicular ridges and the minimum pitch of a diffraction structure designed for a working distance of 0.54 mm are Nm2 and Pm2, respectively, the number of orbicular ridges Na1 and the minimum pitch Pa1 of the diffraction structure in the first diffraction plane of the seventh aberration correcting unit of the seventh embodiment are so determined that formulas Na1≧Nm2 and Pa1≦Pm2 become true.

Figure 43:
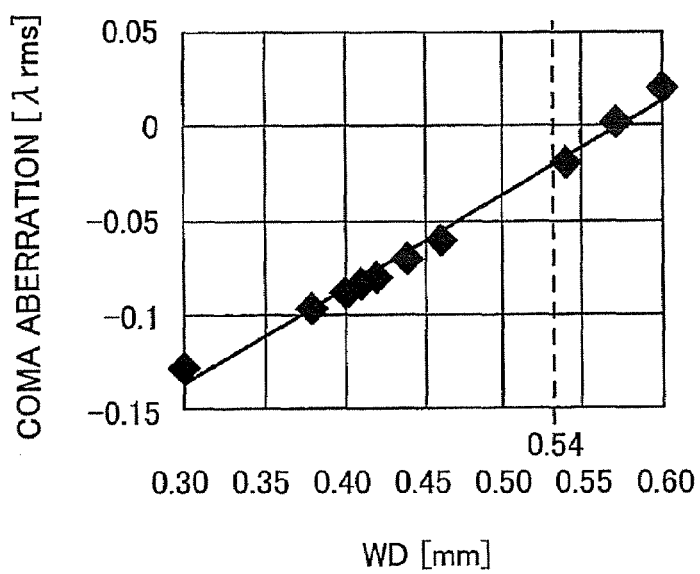
FIG. 43 is a graph showing coma aberration caused by horizontal misalignment of 30 μm in diffraction structures optimally designed for corresponding working distances.

FIG. 43 is a graph showing coma aberration caused by horizontal misalignment of 30 μm in diffraction structures optimally designed for corresponding working distances. As the graph shows, coma aberration caused by horizontal misalignment is minimized at working distances corresponding to the numbers of orbicular ridges and the minimum pitches that satisfy formulas Na1≧Nm2 and Pa1≦Pm2.

Although the first diffraction plane of the seventh aberration correcting unit described above is configured to correct coma aberration caused by horizontal misalignment for DVDs, the first diffraction plane may be configured to correct coma aberration caused by horizontal misalignment for CDs. When the number of orbicular ridges and the minimum pitch of a diffraction structure where aberration caused by an objective lens is corrected for CDs just by changing the finite magnification of light are Nm3 and Pm3, respectively, the number of orbicular ridges Na1 and the minimum pitch Pa1 of the diffraction structure in the first diffraction plane of the seventh aberration correcting unit of the seventh embodiment may be determined to satisfy formulas Na1≧Nm3 and Pa1≦Pm3. Using a diffraction plane configured as described above to reduce coma aberration on a CD caused by horizontal misalignment makes it possible to loosen the assembly tolerance and the manufacturing tolerance.

Next, an exemplary configuration for reducing coma aberration caused by horizontal misalignment for both DVDs and CDs. FIG. 39 is a graph showing the relationship between working distances and coma aberration on a CD and a DVD when the horizontal misalignment is 30 μm. In the graph, the horizontal axis shows working distances for CDs that use −2nd order diffracted light and the vertical axis shows coma aberration. In the seventh embodiment described above, the first diffraction plane of the seventh aberration correction unit is configured differently for DVDs and CDs to correct coma aberration caused by horizontal misalignment. Since the number of ridges Nm2 (DVD) is equal to or larger than the number of ridges Nm3 (CD) (Nm2≧Nm3) and the minimum pitch Pm2 (DVD) is equal to or smaller than the minimum pitch Pm3 (CD) (Pm2≦Pm3), the diffraction structure of the first diffraction plane of the seventh aberration correcting unit is preferably designed to satisfy formulas Na1≧Nm3 and Pa1≦Pm3 to reduce coma aberration caused by horizontal misalignment for both DVDs and CDs.

Figure 44:
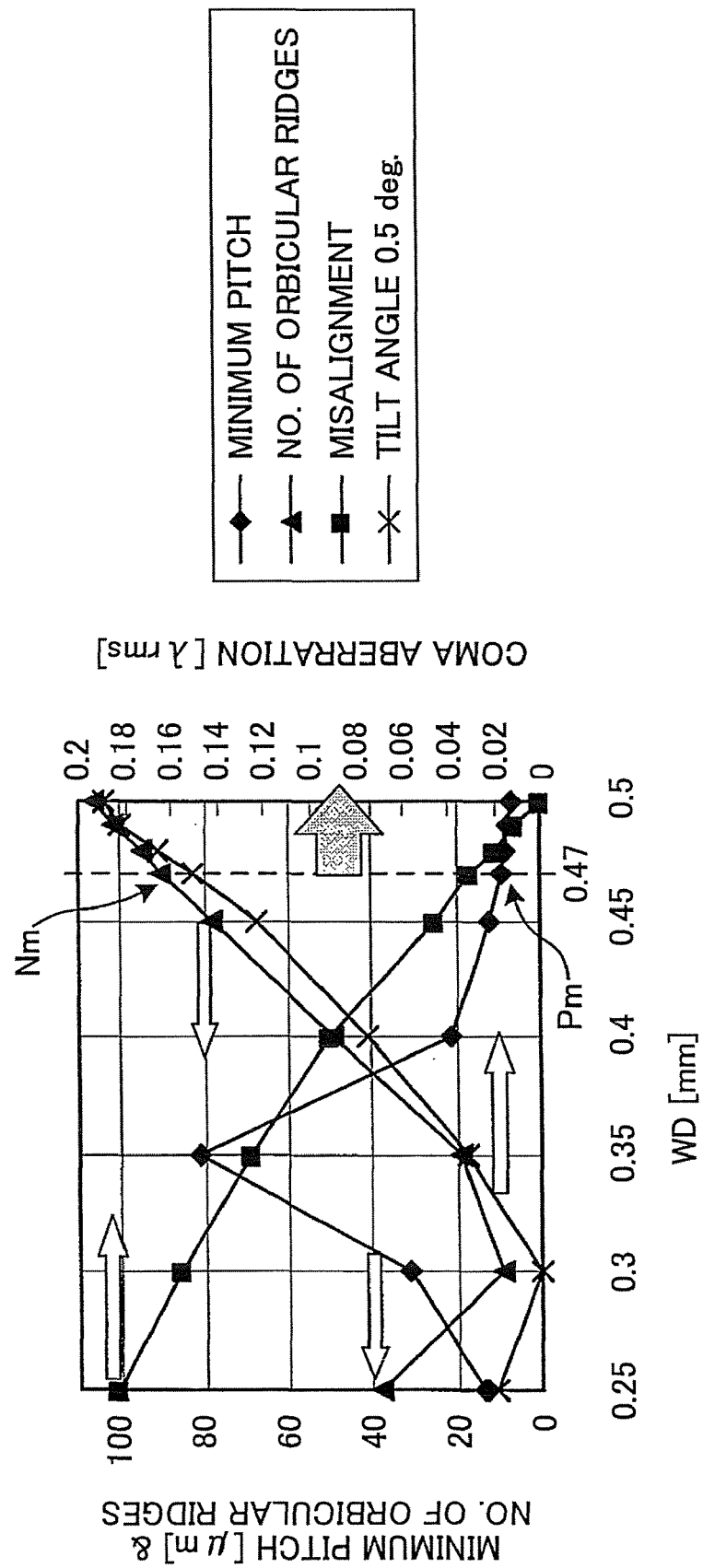
FIG. 44 is a graph showing the relationship between coma aberration on an HD-DVD when there is horizontal misalignment of 30 μm, coma aberration that occurs when the incident angle of a chief ray is tilted 0.5 degrees, and the numbers of orbicular ridges and the minimum pitches of diffraction structures optimally designed for corresponding working distances for HD-DVDs.

Also, the diffraction structure in the second diffraction plane of the seventh aberration correction unit may be configured to correct coma aberration caused by horizontal misalignment for HD-DVDs. FIG. 44 is a graph showing the relationship between coma aberration on an HD-DVD when there is horizontal misalignment of 30 μm, coma aberration that occurs when the incident angle of a chief ray is tilted 0.5 degrees, and the numbers of orbicular ridges and the minimum pitches of diffraction structures optimally designed for corresponding working distances for HD-DVDs. When a diffraction structure is designed for a working distance of 0.47 mm, aberration of the first light caused by an objective lens is corrected just by changing its finite magnification. When the number of orbicular ridges and the minimum pitch of a diffraction structure designed for a working distance of 0.47 mm are Nm1 and Pm1, respectively, the number of orbicular ridges Na2 and the minimum pitch Pa2 of the diffraction structure in the second diffraction plane of the seventh aberration correcting unit of the seventh embodiment are determined to satisfy formulas Na2≧Nm1 and Pa2≦Pm1.

Using a diffraction plane configured as described above to reduce coma aberration on an HD-DVD caused by horizontal misalignment makes it possible to loosen the assembly tolerance and the manufacturing tolerance.

Figure 45:
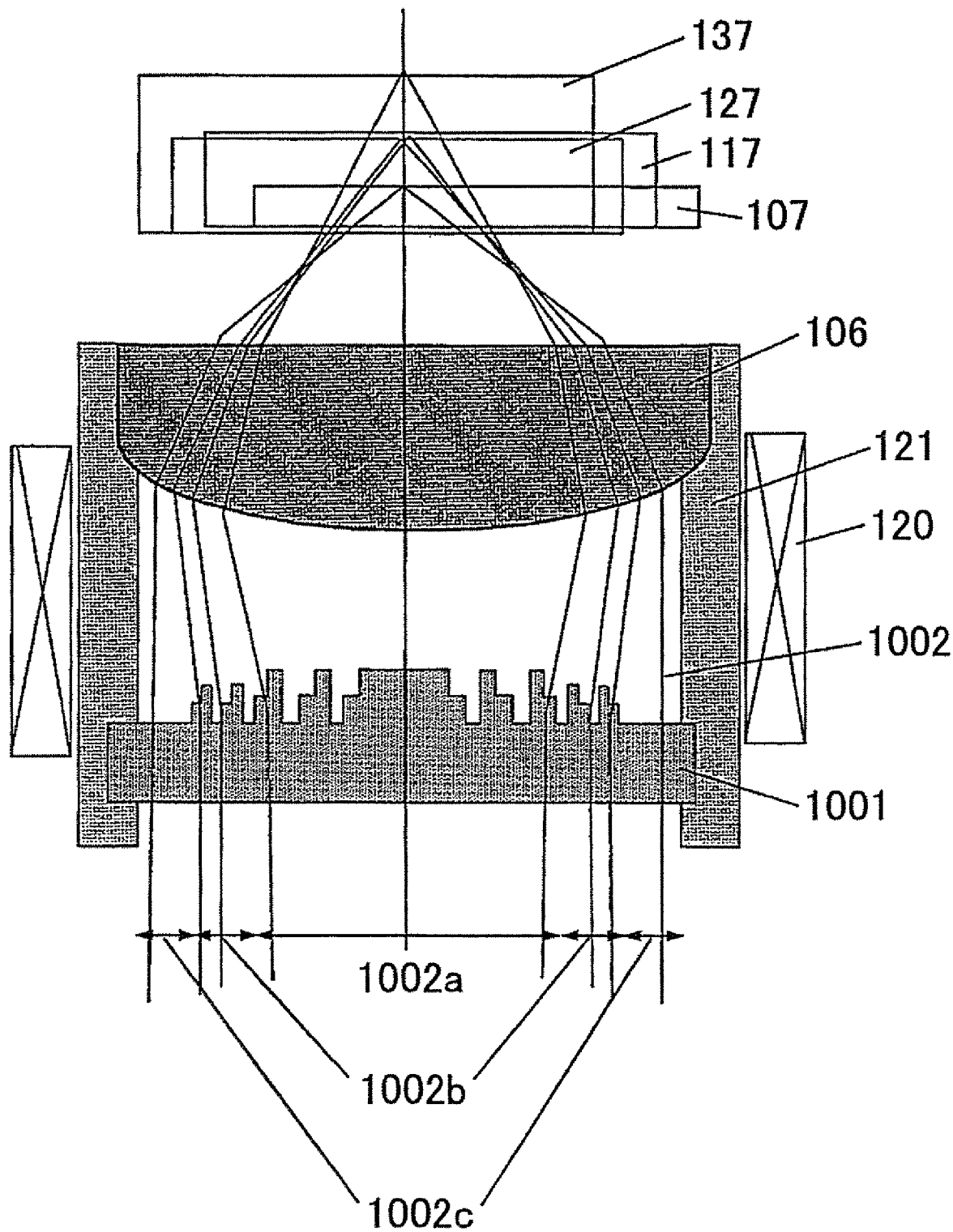
FIG. 45 is a cut-away side view of an eighth exemplary aberration correcting unit according to an eighth embodiment of the present invention and an objective lens.
Figure 46:
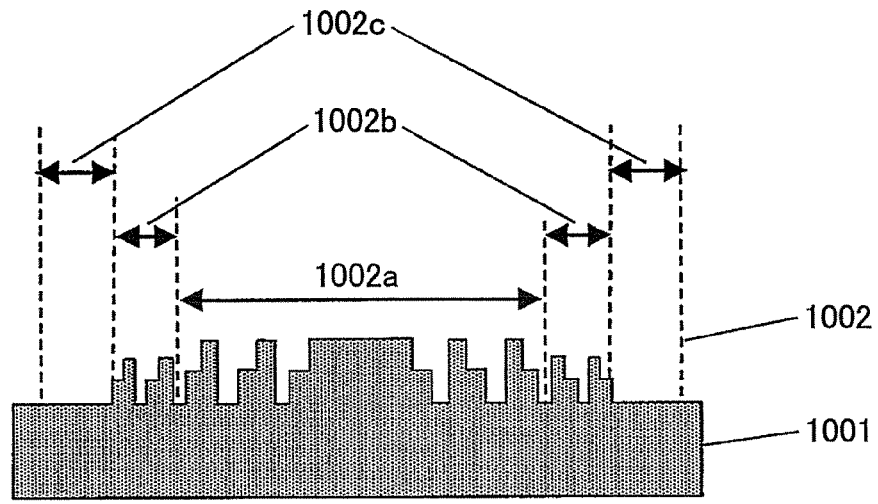
FIG. 46 is an enlarged cut-away side view of the eighth exemplary aberration correcting unit.

FIG. 45 is an enlarged cut-away side view of an aberration correcting unit 1001 according to an eighth embodiment of the present invention and the objective lens 106. FIG. 46 is an enlarged cut-away side view of the aberration correcting unit 1001. The aberration correcting unit 1001 has a diffraction plane 1002 where a diffraction structure is formed. A diffraction plane is a surface having a diffraction structure (or a diffraction grating) made of narrow ridges and grooves. It is not necessary to form the diffraction structure on the entire surface. The diffraction structure may be formed on part of a flat surface or a curved surface.

The configuration of an optical pickup and the characteristics of an objective lens used in the eighth embodiment are substantially the same as those in the first embodiment.

Figure 47:
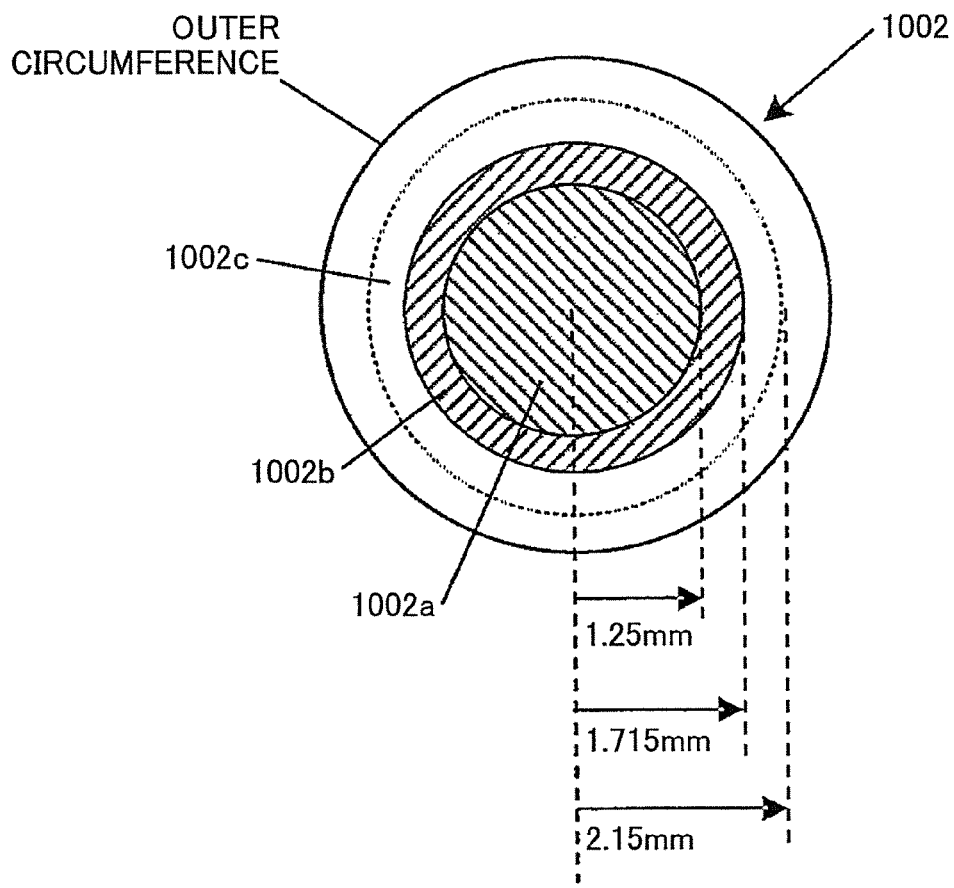
FIG. 47 is a drawing illustrating a diffraction plane of the eighth exemplary aberration correcting unit.

As shown in FIG. 47, the diffraction plane 1002 has the following three concentric zones within an area through which light passes: a center zone 1002a, a second zone 1002b that is second from the center, and a third zone 1002c that is third from the center.

The center zone 1002a has a radius of 1.25 mm and corresponds to an NA of 0.45 for the CD 137. A diffraction structure formed in the center zone 1002a is designed to transmit a portion of the first light with a wavelength of 405 nm without change, to diffract another portion of the first light, and to diffract the second light with a wavelength of 660 nm and the third light with a wavelength of 785 nm. Thus, the diffraction structure in the center zone 1002a is configured to correct spherical aberration caused by the difference in substrate thickness of the HD-DVD 117, the DVD 127, and the CD 137 and the difference in wavelength of the first light, the second light, and the third light.

The second zone 1002b has an inner radius of 1.25 mm and an outer radius of 1.715 and corresponds to an NA of between 0.45 for the CD 137 and 0.65 for the HD-DVD 117 and the DVD 127. A diffraction structure formed in the second zone 1002b is designed to transmit a portion of the first light with a wavelength of 405 nm without change, to diffract another portion of the first light, to diffract the second light with a wavelength of 660 nm, and so as not to focus the third light with a wavelength of 785 nm on the recording surface of the CD 137.

The third zone 1002c has an inner radius of 1.715 mm and an outer radius of 2.15 mm and corresponds to an NA of between 0.65 for the HD-DVD 117 and the DVD 127 and 0.85 for the Blu-ray disk 107. The third zone 1002c is a flat surface where no diffraction structure is formed and is designed to transmit the first light, the second light, and the third light without change. Light transmitted by the third zone 1002c is focused on the Blu-ray disk 107 by the objective lens 106, but not focused on the HD-DVD 117, the DVD 127, and the CD 137.

In other words, the diffraction plane 1002 is designed to correct aberration of the first light, the second light, and the third light and to adjust the NA of the objective lens 106 for the HD-DVD, 117, the DVD 127, and the CD 137. Thus, the diffraction plane 1002 makes it possible to form a desirable light spot on any one of four different types of optical recording media.

As shown by the cut-away side view in FIG. 46, the center zone 1002a of the aberration correcting unit 1001 is made up of concentrically arranged orbicular ridges and grooves. The orbicular ridges or grooves each have a step-like structure made of three steps including the lowest step (level). The pitches between the orbicular ridges become gradually narrower from the center to the outer circumference so that the diffraction structure made of the orbicular ridges and grooves has a lens effect.

The pitches are so determined that −2nd order diffracted light is produced and used for the HD-DVD 117, −1st order diffracted light is produced and used for the DVD 127, and −3rd order diffracted light is produced and used for the CD 137. In other words, the pitches are determined so that the aberration of light for the HD-DVD 117, the DVD 127, and the CD 137 is corrected.

Optical path difference coefficients of the center zone 1002a are shown in table 11 below.

TABLE 11

| Production wavelength | 405 nm |
|---|---|
| Optical path difference coefficients | C1: 3.6904E−03 |
| | C2: −7.2079E−04 |
| | C3: 1.1041E−03 |
| | C4: −7.5289E−04 |
| | C5: 2.1901E−04 |
| | C6: −2.4017E−05 |

As shown by the cut-away side view in FIG. 46, the second zone 1002b of the aberration correcting unit 1001 is made up of concentrically arranged orbicular ridges and grooves. The orbicular ridges or grooves each have a step-like structure made of three steps including the lowest step (level). The pitches between the orbicular ridges become narrower from the center to the outer circumference so that the diffraction structure made of the orbicular ridges and grooves have a lens effect.

The pitches are so determined that −2nd order diffracted light is produced and used for the HD-DVD 117 and −1st order diffracted light is produced and used for the DVD 127.

Optical path difference coefficients of the second zone 1002b are the same as those of the center zone 1002a shown in table 11 above. Also, the center zone 1002a and the second zone 1002b may be configured to have different optical path difference coefficients.

The depth of the orbicular grooves in the second zone 1002b is so determined that the diffraction structure does not produce −3rd order diffracted light and thereby limits the NA for the CD 137. The minimum pitch between the orbicular ridges in the center zone 1002a and the second zone 1002b is 52 μm and the number of the orbicular ridges is 21.

Figure 48:
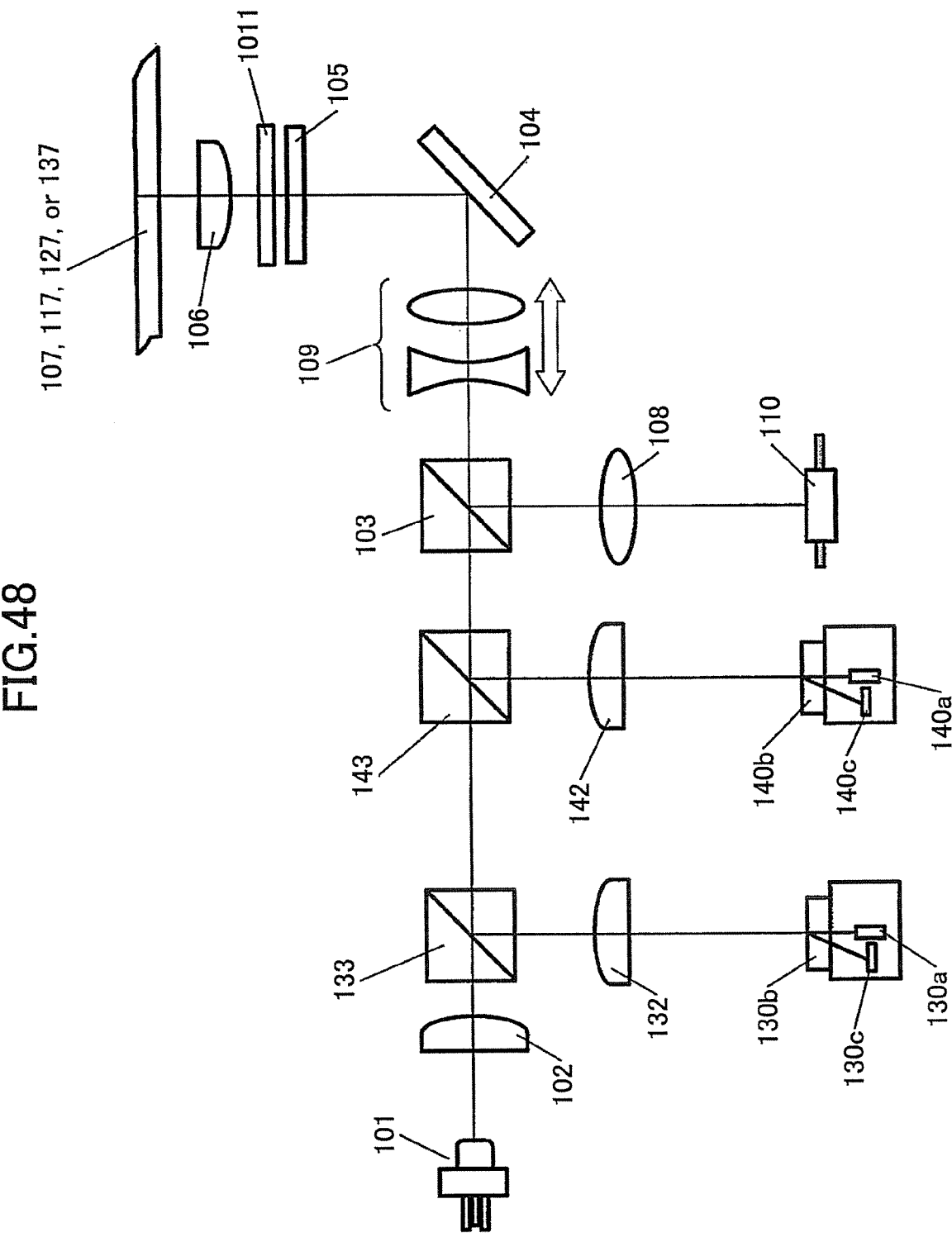
FIG. 48 is a drawing illustrating an exemplary configuration of an exemplary optical pickup according to a ninth embodiment of the present invention.
Figure 49:
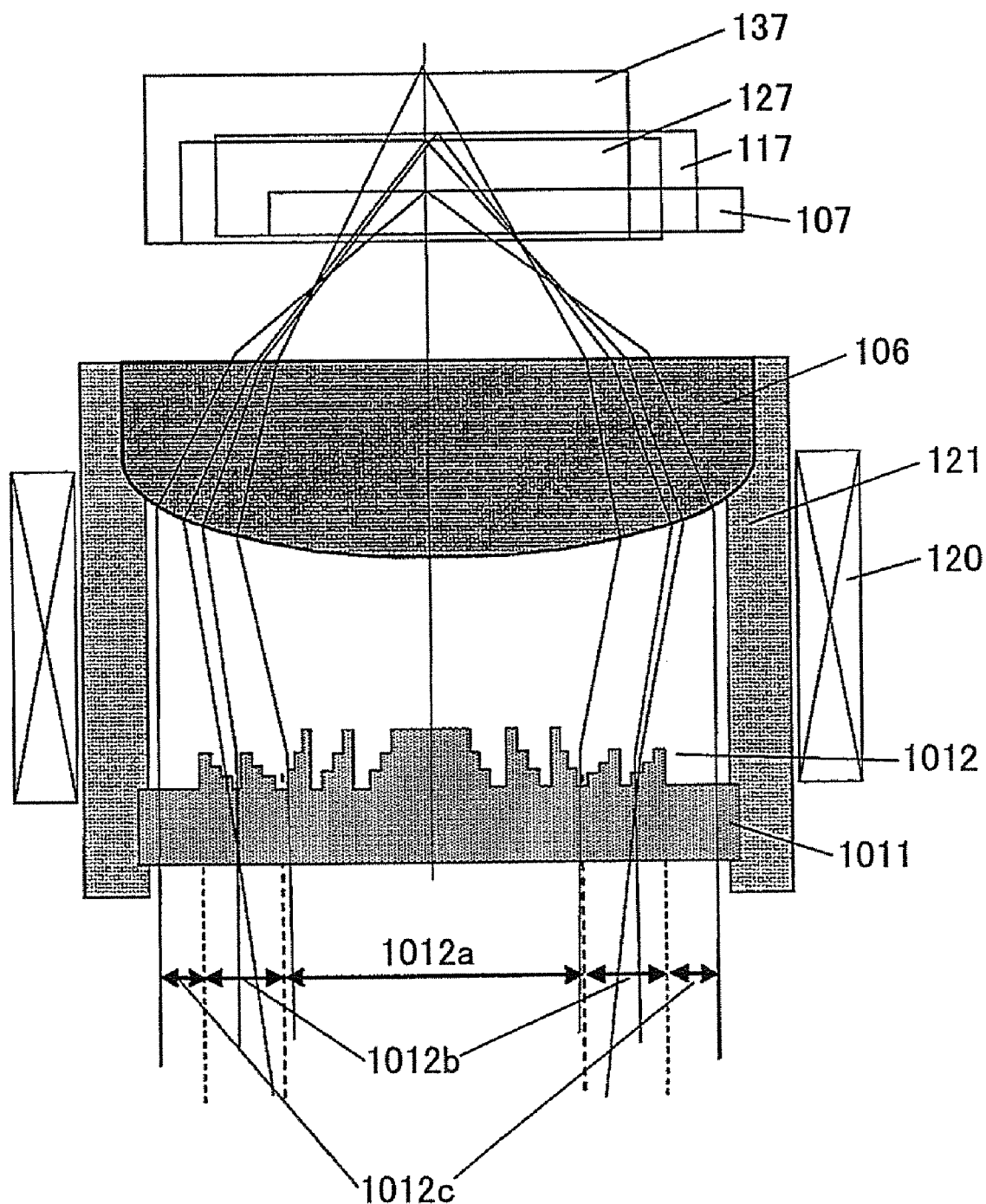
FIG. 49 is an enlarged cut-away side view of a ninth exemplary aberration correcting unit and an objective lens.

FIG. 48 is a drawing illustrating an exemplary configuration of an exemplary optical pickup according to a ninth embodiment of the present invention. The configuration of the exemplary optical pickup of the ninth embodiment differs from that of the exemplary optical pickup of the first embodiment in that a beam expander 109 is added and an aberration correcting unit 1011 is used. FIG. 49 is an enlarged cut-away side view of the aberration correcting unit 1011 and the objective lens 106.

In the ninth embodiment, for the HD-DVD 117, divergent light instead of collimated light is entered into the aberration correcting unit 1011. When reproducing or recording information on the HD-DVD 117, the beam expander 109 is driven to convert collimated light into divergent light. Also, a liquid crystal device may be used to convert collimated light into divergent light.

As shown in FIG. 49, a diffraction plane 1012 of the aberration correcting unit 1011 has the following three concentric zones within an area through which light passes: a center zone 1012*a*, a second zone 1012*b*, and a third zone 1012*c*.

The center zone 1012*a* has a radius of 1.25 mm and corresponds to an NA of 0.45 for the CD 137. The second zone 1012*b* has an inner radius of 1.25 mm and an outer radius of 1.715 mm and corresponds to an NA of between 0.45 for the CD 137 and 0.65 for the DVD 127.

In the ninth embodiment, the signs of corresponding diffraction orders of light diffracted by the center zone 1012*a* and the second zone 1012*b* are inverted to greatly change the relationship between the diffraction efficiencies of the first, second, and third light, the shape of the diffraction structure, and the groove depth. A diffraction plane with such a configuration can function efficiently both as an aberration correcting unit and an NA limiting element.

The exemplary optical pickup of the ninth embodiment may be configured to enter divergent light into the aberration correcting unit 1011 for at least one of optical recording media (Blu-ray disk 107, HD-DVD 117, DVD 127, and CD 137). Such a configuration makes it possible to maintain the diffraction order of light as small as possible and thereby to provide an efficient optical pickup.

As shown by the cut-away side view in FIG. 49, the center zone 1012*a* of the aberration correcting unit 1011 is made up of concentrically arranged orbicular ridges and grooves. The orbicular ridges or grooves each have a step-like structure made of three steps including the lowest step (level). The pitches between the orbicular ridges become gradually narrower from the center to the outer circumference so that the diffraction structure made of the orbicular ridges and grooves has a lens effect.

The pitches are so determined that −1st order diffracted light is produced and used for the HD-DVD 117, −1st order diffracted light is produced and used for the DVD 127, and −2nd order diffracted light is produced and used for the CD 137. In other words, the pitches are determined so that the aberration of light for the HD-DVD 117, the DVD 127, and the CD 137 is corrected.

For the HD-DVD 117, collimated light is converted by the beam expander 109 into divergent light. The divergent light is entered into the aberration correcting unit 1011 to correct the aberration of light for the HD-DVD 117.

As shown by the cut-away side view in FIG. 49, the second zone 1012*b* of the aberration correcting unit 1011 is also made up of concentrically arranged orbicular ridges and grooves. Each of the orbicular ridges or grooves has a step-like structure made of four steps including the lowest step (level). The pitches between the orbicular ridges become gradually narrower from the center to the outer circumference so that the diffraction structure made of the orbicular ridges and grooves have a lens effect.

The pitches are so determined that +1st order diffracted light is produced and used for the HD-DVD 117 and the DVD 127 so that the aberration of light for the HD-DVD 117 and the DVD 127 is corrected.

The depth of step-like grooves (groove depth) in the second zone 1012*b* is so determined that the diffraction structure does not produce +2nd order diffracted light and thereby limits the NA for the CD 137.

Figure 50:
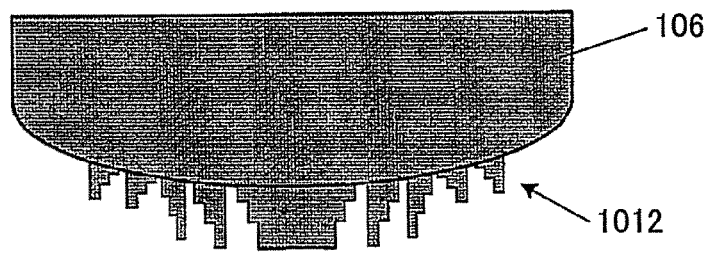
FIG. 50 is a cut-away side view of a tenth exemplary aberration correcting unit integrated with an objective lens according to a tenth embodiment of the present invention.

According to a tenth embodiment of the present invention, an aberration correcting unit is made up of a diffraction plane described in any one of the above embodiments and an objective lens integrated with the diffraction plane. An exemplary aberration correcting unit shown in FIG. 50 is produced by combining the aberration correcting unit 1011 of the ninth embodiment and the objective lens 106. As shown in FIG. 50, the diffraction plane 1012 is formed on a surface of the objective lens 106. This configuration prevents misalignment between the optical axes of the objective lens 106 and an aberration correcting unit and thereby makes it possible to reduce wavefront degradation, to improve the efficiency of the assembly process, and to reduce costs.

Also, the diffraction plane 1012 and the objective lens 106 may be formed as a monolithic structure. Further, it is possible to form a diffraction structure directly on the objective lens 106. In this case, an ultraviolet curing resin is preferable as the material of the diffraction structure in terms of ease of production.

Figure 51A:
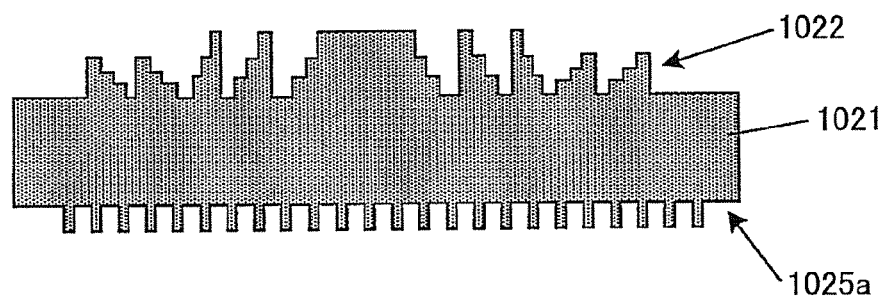
FIGS. 51A and 51B are enlarged cut-away side views of an eleventh aberration correcting unit according to an eleventh embodiment of the present invention.
Figure 51B:
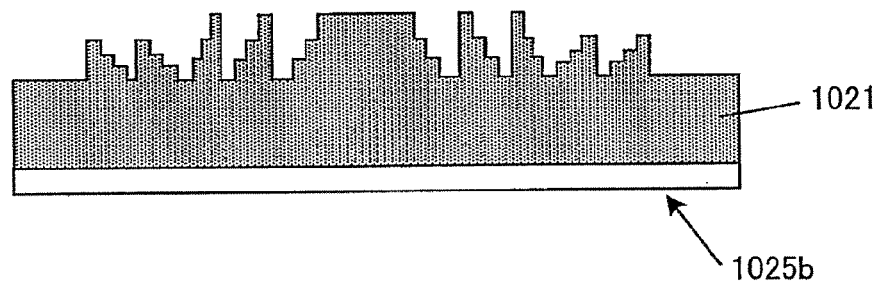

FIGS. 51A and 51B are enlarged cut-away side views of an aberration correcting unit 1021 according to an eleventh embodiment of the present invention. The configuration of an optical pickup and the characteristics of an objective lens used in the eleventh embodiment are substantially the same as those in the first embodiment. The aberration correcting unit 1021 of the eleventh embodiment is made by adding a wavelength plate 1025 to the aberration correcting unit 1001 of the eighth embodiment. The wavelength plate 1025 is used instead of the ¼ wavelength plate 105 shown in FIG. 1.

The wavelength plate 1025 is provided in a light path of an optical system that is common for light beams having wavelengths of 405 nm, 660 nm, and 785 nm. Therefore, it is necessary to configure the wavelength plate 1025 to give a phase difference of 0.25±0.05 to the TM wave and the TE wave of light having various wavelengths. For example, a wavelength plate may be implemented by a fine structure (wavelength plate 1025*a*) as shown in FIG. 51A or a phase difference film (wavelength plate 1025*b*) made of crystal or resin as shown in FIG. 51B. The wavelength plate 1025*a* implemented by a fine structure is especially preferable to give a stable phase difference to light having various wavelengths. The fine structure may be made of a material that is the same as or different from that of the aberration correcting unit 1021.

Forming a wavelength plate and a diffraction plane on the corresponding sides of an aberration correcting unit as described above makes it possible to reduce the number of parts and the size of an optical pickup. Also, using a fine structure as the wavelength plate 1025 makes it possible to form the wavelength plate 1025 and the diffraction plane 1022 as a monolithic structure and thereby makes it possible to reduce the production steps and costs. Further, an aberration correcting unit may be configured to have a liquid crystal device for a finite system and a diffraction plane on the corresponding sides.

Figure 52:
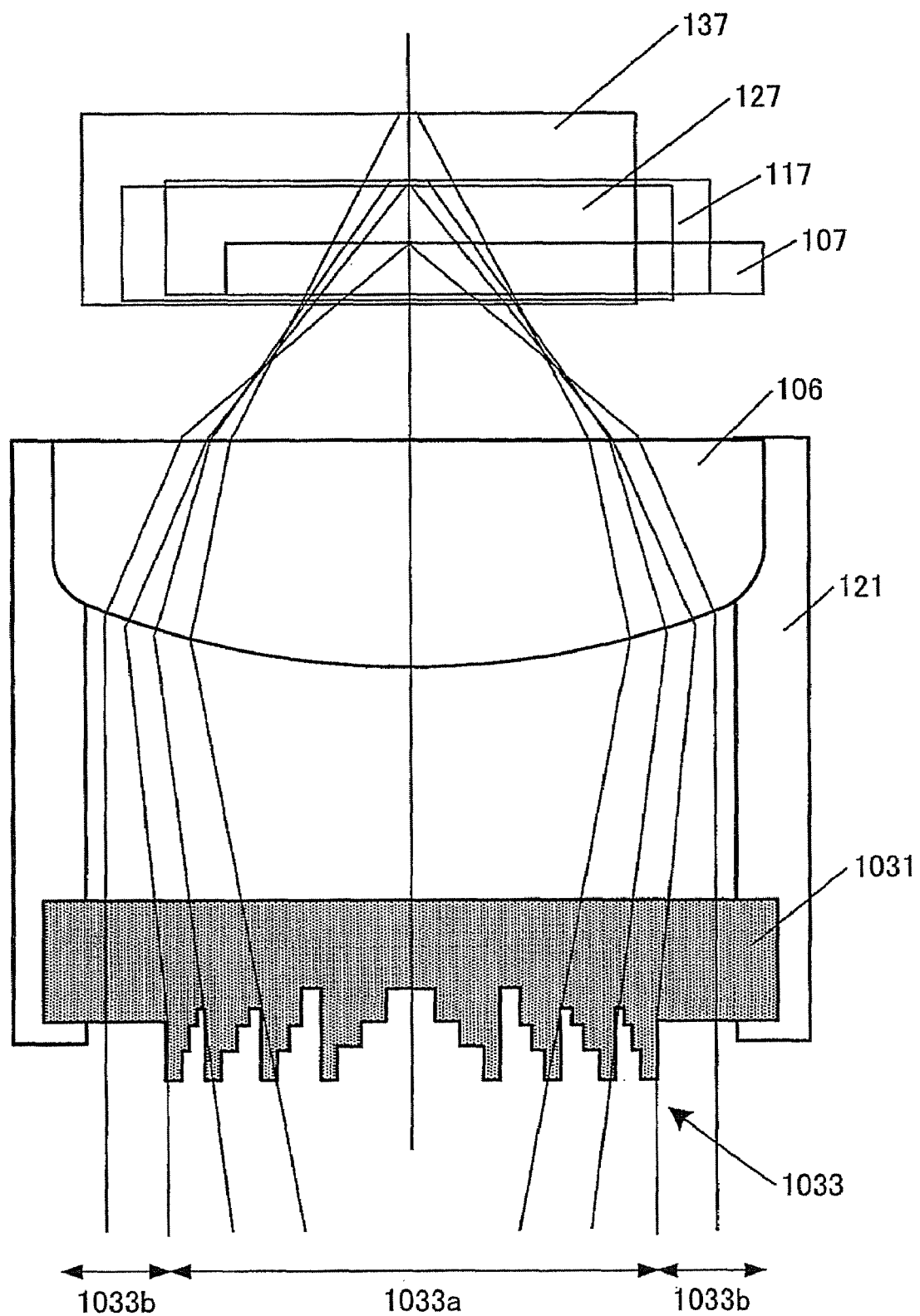
FIG. 52 is a cut-away side view of a twelfth exemplary aberration correcting unit according to a twelfth embodiment of the present invention and an objective lens.
Figure 53:
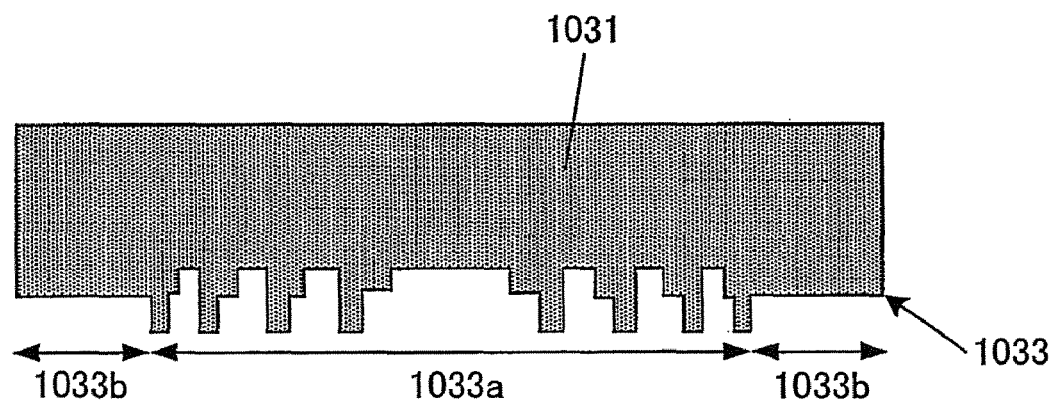
FIG. 53 is an enlarged cut-away side view of the twelfth exemplary aberration correcting unit.
Figure 54:
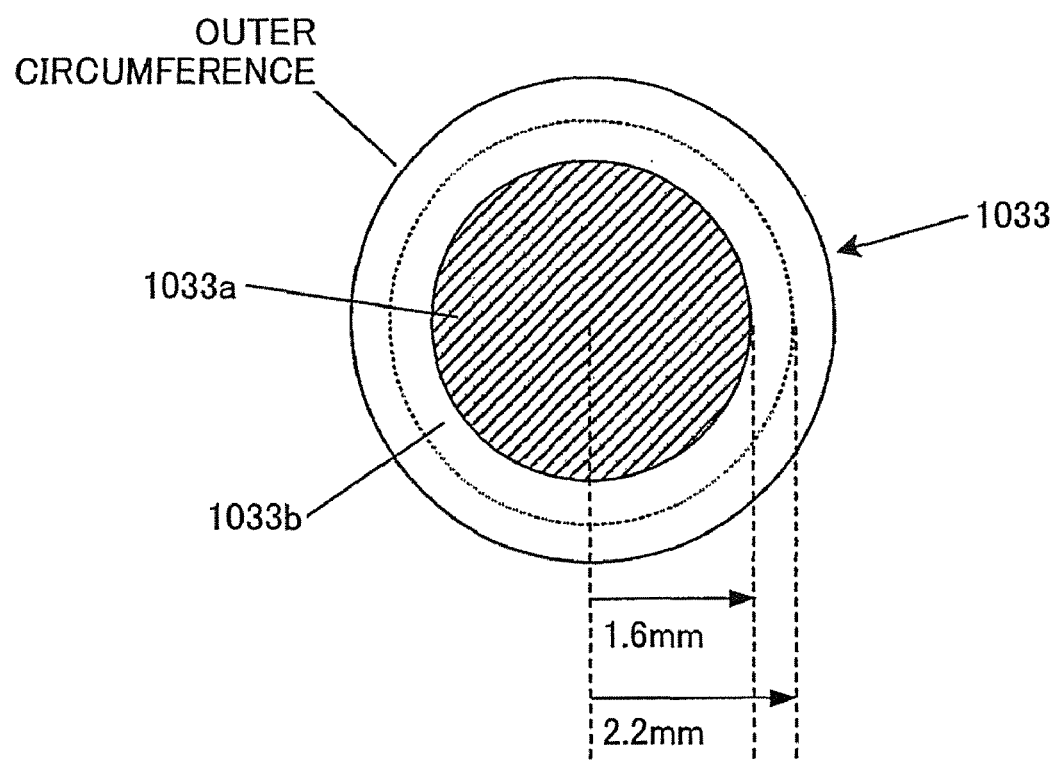
FIG. 54 is a drawing illustrating a diffraction plane of the twelfth exemplary aberration correcting unit.

FIGS. 52 through 54 are drawings used to describe an aberration correcting unit 1031 according to a twelfth embodiment of the present invention. FIGS. 52 and 53 are enlarged cut-away side views of the aberration correcting unit 1031 and FIG. 54 shows a diffraction plane 1033 of the aberration correcting unit 1031. The aberration correcting unit 1031 is configured to correct spherical aberration of light emitted from the semiconductor laser 101 with a wavelength of 405 nm to the HD-DVD 117, which spherical aberration is caused by the objective lens 106 because of the difference in substrate thickness of the HD-DVD 117. Also, the aberration correcting unit 1031 adjusts the NA of the objective lens 106 to suit the HD-DVD 117.

As shown in FIG. 54, the diffraction plane 1033 of the aberration correcting unit 1031 has the following two concentric zones within an area through which light passes: a first zone 1033*a* and a second zone 1033*b*. The first zone 1033*a* has a radius of 1.6 mm and corresponds to an NA of 0.65 for the HD-DVD 117. A diffraction structure formed in the first zone 1033*a* is configured to transmit a portion of the first light with a wavelength of 405 nm as 0th order diffracted light and another portion of the first light as +1st order diffracted light, and to transmit much of the second light with a wavelength of 660 nm and the third light with a wavelength of 785 nm as 0th order diffracted light.

The second zone 1033*b* has an inner radius of 1.6 mm and an outer radius of 2.2 mm and corresponds to an NA between 0.65 for the HD-DVD 117 and 0.85 for the Blu-ray disk 107. The second zone 1033*b* is a flat surface where no diffraction structure is formed.

As shown by the cut-away side view in FIG. 53, the diffraction structure formed in the first zone 1033*a* of the diffraction plane 1033 is made up of concentrically arranged orbicular ridges and grooves and is configured to produce +1st order diffracted light and 0th order diffracted light. More specifically, the diffraction plane 1033 is configured to transmit a portion of incoming light as 0th order diffracted light and another portion of the incoming light as +1st or higher order diffracted light. Therefore, the diffraction plane 1033 and the objective lens 106 function together as a bifocal lens. The diffraction plane 1033 as described above makes it possible to form an appropriate light spot on either of the Blu-ray disk 107 and the HD-DVD 117 having different substrate thicknesses by focusing the same wavelength light up to the diffraction limit. The 0th order diffracted light and the +1st or higher order diffracted light are focused at different focal positions along the optical axis and thereby form light spots on the Blu-ray disk 107 and the HD-DVD 117, respectively.

As described above, the objective lens 106 is optimally designed to accurately record and reproduce information on the Blu-ray disk 107 having a substrate thickness of 0.1 mm. Therefore, when light is focused on the HD-DVD 117 having a substrate thickness of 0.6 mm without using an aberration correcting unit, considerable spherical aberration occurs. The first zone 1033*a* of the diffraction plane 1033 is configured to transmit a portion of the first light as +1st order diffracted light and thereby to correct the spherical aberration of the first light for the HD-DVD 117.

The second zone 1033*b* is a flat surface where no diffraction structure is formed and is configured to transmit a portion of the first light without change. The portion of the first light transmitted by the second zone 1033*b* is focused by the objective lens 106 on the Blu-ray disk 107. On the other hand, the light transmitted by the second zone 1033*b* is not focused on the HD-DVD 117 but is diffused like a flare and therefore does not influence information recording/reproduction. In other words, the second zone 1033*b* makes it possible to limit the NA to 0.65 for the HD-DVD 117 without using a dedicated mechanism or coating.

Figure 55:
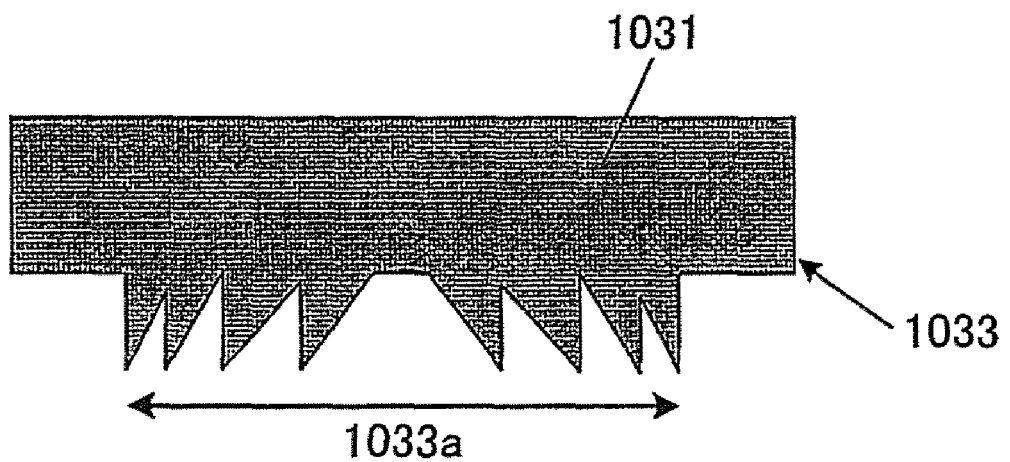
FIG. 55 is a drawing illustrating a variant of the diffraction plane of the twelfth exemplary aberration correcting unit.

In the twelfth embodiment, PMMA is used as the material of the diffraction plane 1033, the number of steps of each of the orbicular ridges or grooves of the diffraction structure in the diffraction plane 1033 is three, and the diffraction plane 1033 is configured to efficiently produce 0th order diffracted light and +1st order diffracted light. However, the diffraction plane 1033 may be configured otherwise. Also, the diffraction structure in the diffraction plane 1033 may be implemented by a sawtooth structure as shown in FIG. 55 that is smaller than the wavelengths of the second light and the third light.

Figure 56:
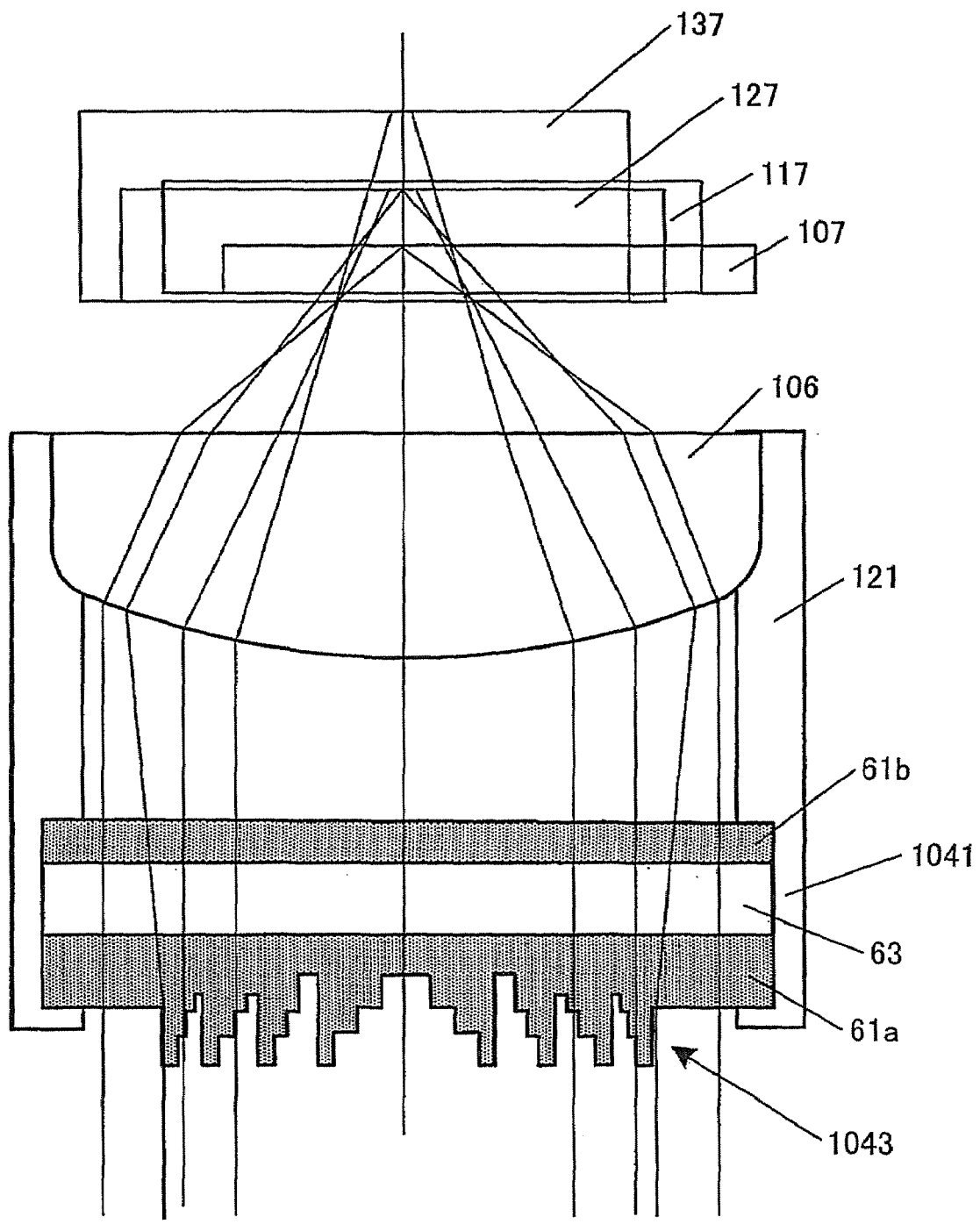
FIG. 56 is a drawing illustrating an exemplary liquid crystal element according to a thirteenth embodiment of the present invention.

FIG. 56 is a drawing illustrating a liquid crystal element according to a thirteenth embodiment of the present invention. The liquid crystal element 1041 includes a part of the aberration correcting unit 1031 of the twelfth embodiment. The configuration of an optical pickup and the characteristics of an objective lens used in the thirteenth embodiment are substantially the same as those in the first embodiment.

The liquid crystal element 1041 is configured to control spherical aberration of light according to a control signal from the outside. As shown in FIG. 56, the liquid crystal element 1041 includes translucent substrates 61*a* and 61*b* and a liquid crystal layer 63 sandwiched between the translucent substrates 61*a* and 61*b*. On the translucent substrate 61*a*, a diffraction structure for correcting spherical aberration of light being focused on the HD-DVD 117 is formed. On the translucent substrate 61*b*, an orbicular optical multilayer film for adjusting the NA for the DVD 127 and the CD 137 is formed.

Figure 57:
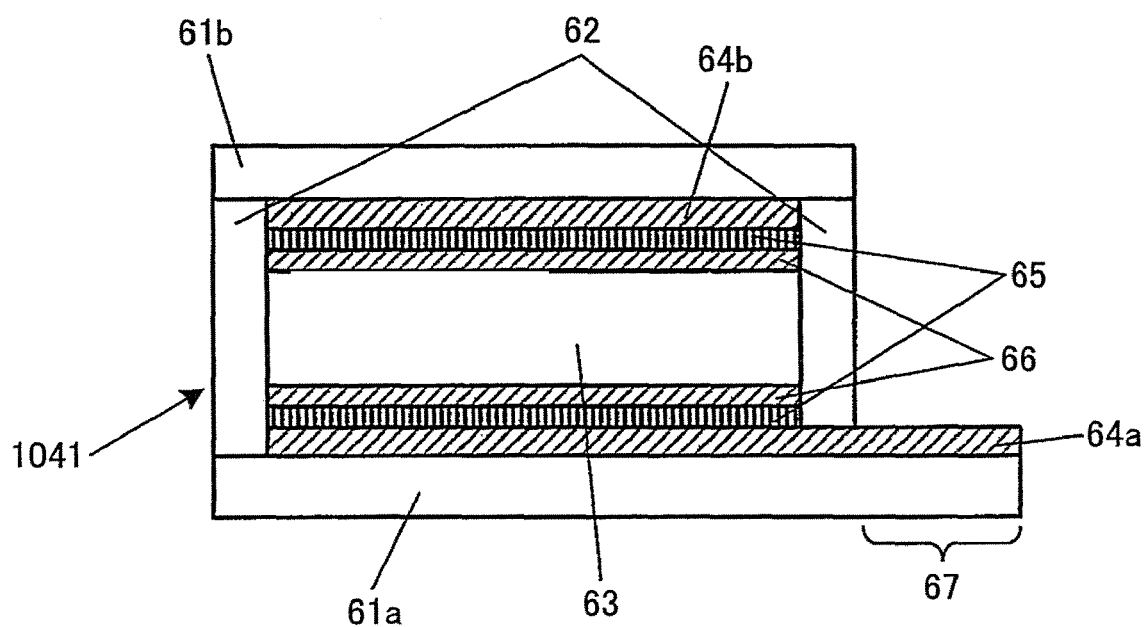
FIG. 57 is an enlarged cut-away side view of the exemplary liquid crystal element.

FIG. 57 is a cut-away side view of the liquid crystal layer 63 and the translucent substrates 61*a* and 61*b*. FIGS. 58A and 58B are drawings illustrating electrode patterns on the translucent substrates 61*a* and 61*b*. An exemplary configuration and operations of the liquid crystal element 1041 are described below with reference to the FIGS. 57 through 58B.

As shown in FIG. 57, the translucent substrates 61*a* and 61*b* joined by a conductive spacer 62 form a liquid crystal cell. On the inner surface of the translucent substrate 61*a*, a transparent electrode layer 64*a*, an insulating film 65, and an alignment layer 66 are formed in the order mentioned. On the inner surface of the translucent substrate 61*b*, a transparent electrode layer 64*b*, an insulating film 65, and an alignment layer 66 are formed in the order mentioned. The transparent electrode layer 64*a* has an electrode lead part 67 to be connected via a connecting line to a control circuit.

The transparent electrode layer 64*b* is electrically connected via the conductive spacer 62 to the transparent electrode layer 64*a* on the translucent substrate 61*a*. Therefore, the transparent 64*b* is also electrically connected via the electrode lead part 67 and the connecting line to the control circuit. The liquid crystal cell is filled with liquid crystal and thus forms the liquid crystal layer 63.

Each of the transparent electrode layers 64*a* and 64*b* may be implemented as a voltage drop type electrode pattern where feeder parts are provided in a uniform electrode as disclosed in Japanese Patent Application Publication No. 2001-143303 or as a segment type electrode pattern as disclosed in Japanese Patent Application Publication No. 9-128785. In the thirteenth embodiment, each of the transparent electrode layers 64*a* and 64*b* has a concentric pattern around the optical axis. FIG. 58A shows a voltage drop type electrode pattern and FIG. 58B shows a segment type electrode pattern.

The transparent electrode layers 64*a* and 64*b* of the liquid crystal element 1041 include either metal electrodes (feeder parts) 69 shown in FIG. 58A or segmented electrodes 68 shown in FIG. 58B and are configured to concentrically change the refractive index n of the liquid crystal when a voltage is applied to the electrodes. Changing the refractive index n causes an optical path difference of $\Delta n \times d$ ($\Delta n$ indicates the amount of change in the refractive index n and d indicates the thickness of the liquid crystal layer 63) between portions of light passing through different zones of the liquid crystal layer 63. In other words, when the wavelength of light is $\lambda$, changing the refractive index n causes a phase difference of $\Delta n \times d$ ($2\pi/\lambda$) between portions of light.

As described above, the objective lens 106 is optimally designed to accurately record and reproduce information on the Blu-ray disk 107 having a substrate thickness of 0.1 mm. When focusing light on other types of optical recording media using the objective lens 106, spherical aberration occurs because of differences in wavelength of light and substrate thickness. FIGS. 59A through 59D are graphs showing spherical aberration. In each of the graphs, the horizontal axis shows pupil radius positions and the vertical axis shows spherical aberration. As shown by the solid lines in FIGS. 59A and 59B, spherical aberration of light becomes larger as it departs from the optical axis and becomes suddenly smaller near a pupil radius position corresponding to an NA being used. When the metal electrodes 69 shown in FIG. 58A are used, a voltage applied to the metal electrodes 69 is adjusted to cause phase differences as shown by a dotted line in the lower part of FIG. 59A between portions of light entering from the light source side to the objective lens 106. The resulting phase differences or the delays of wavefronts of portions of light passing through the liquid crystal element 1041 offset the spherical aberration.

Figure 59A:
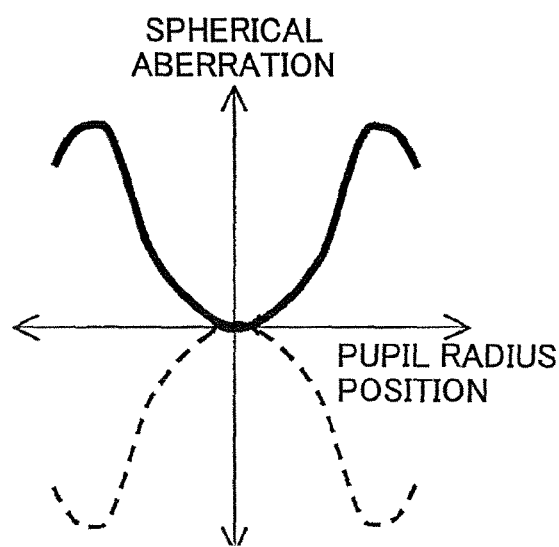
FIGS. 59A through 59D are graphs showing spherical aberration.
Figure 59B:
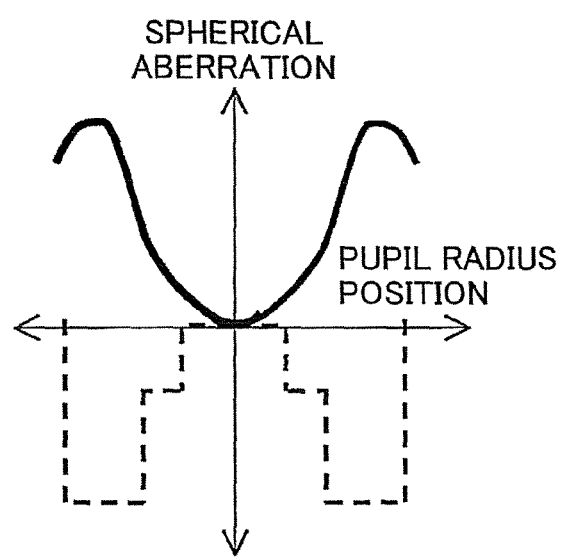

When the segmented electrodes 68 shown in FIG. 58B are used, a voltage applied to the segmented electrodes 68 is adjusted to cause phase differences as shown by a dotted line in the lower part of FIG. 59B between portions of light entering from the light source side to the objective lens 106. The resulting phase differences or the delays of wavefronts of portions of light passing through the liquid crystal element 1041 offset the spherical aberration.

Figure 59C:
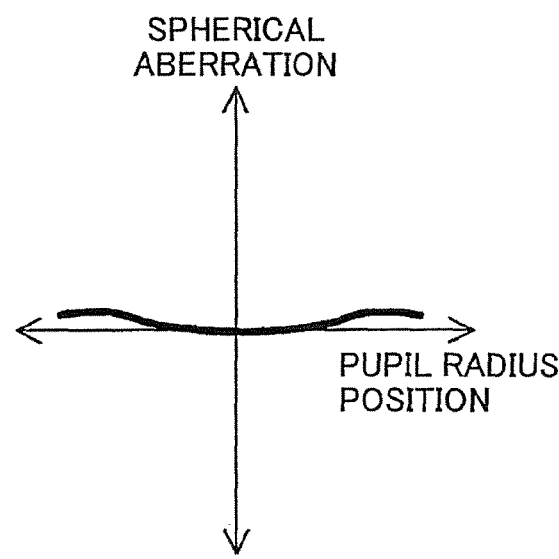
Figure 59D:
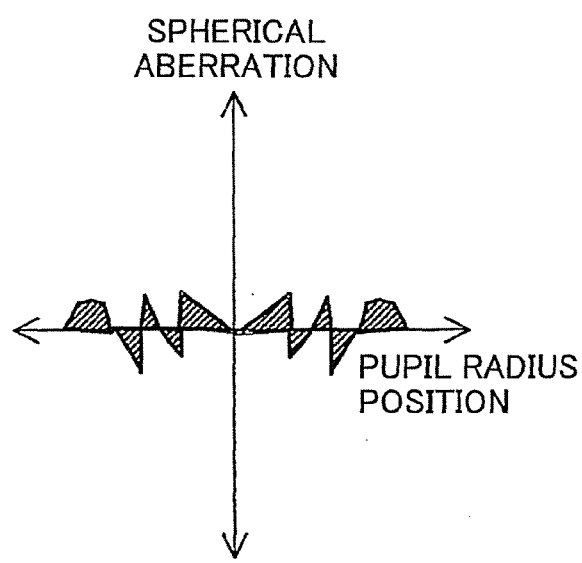

FIG. 59C shows the sum of the solid line (spherical aberration) and the dotted line (delays of wavefronts caused by the liquid crystal element 1041) shown in FIG. 59A, i.e. spherical aberration after correction. The spherical aberration after correction shown in FIG. 59C is much smaller than the original spherical aberration shown by the solid line in FIG. 59A. FIG. 59D shows the sum of the solid line (spherical aberration) and the dotted line (delays of wavefronts caused by the liquid crystal element 1041) shown in FIG. 59B, i.e. spherical aberration after correction. The spherical aberration after correction shown in FIG. 59C is much smaller than the original spherical aberration shown by the solid line in FIG. 59B.

Figure 60:
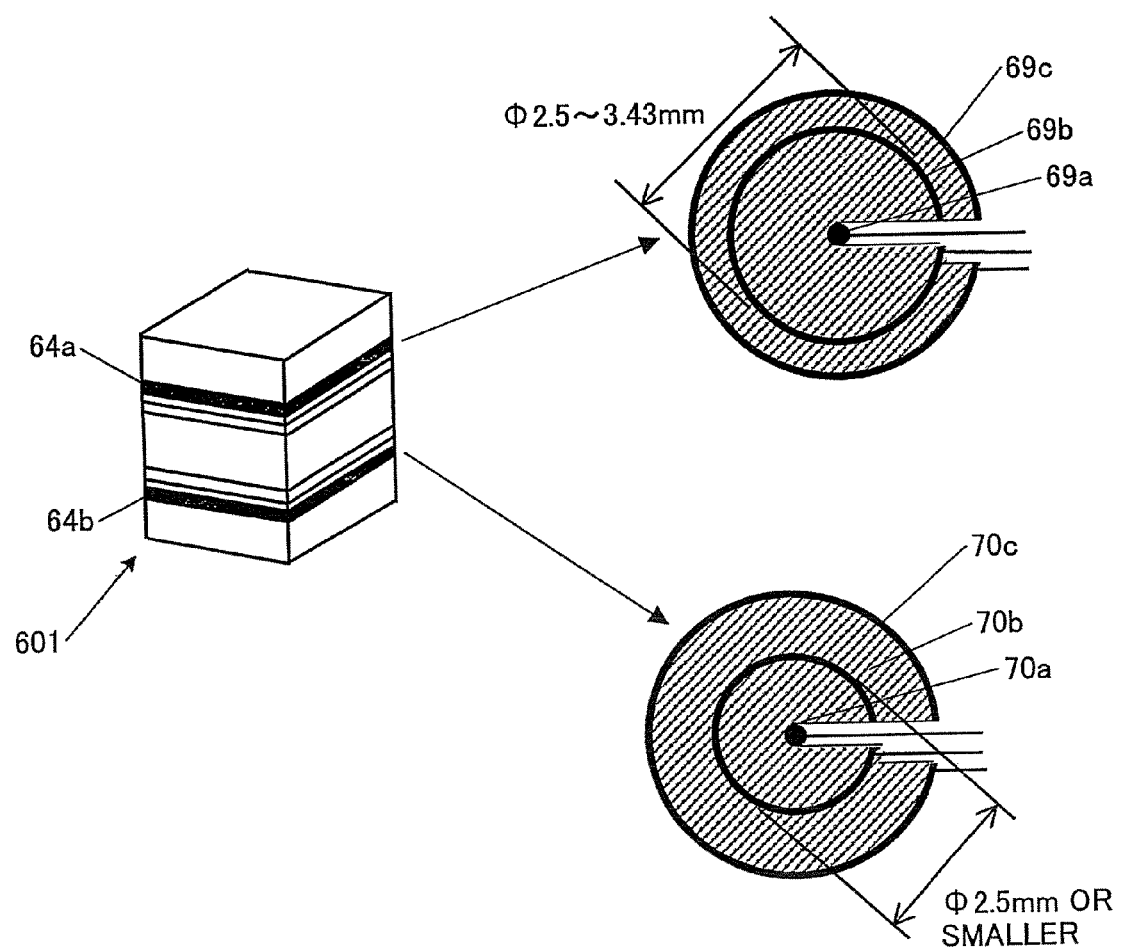
FIG. 60 is a drawing illustrating exemplary configurations of transparent electrode layers of the exemplary liquid crystal element.

FIG. 60 is a drawing illustrating exemplary configurations of the transparent electrode layers 64a and 64b. As shown in FIG. 60, the transparent electrode layer 64a includes metal electrodes 69a through 69c and the transparent electrode layer 64b includes metal electrodes 70a through 70c. Each of the metal electrodes 69a through 69c and 70a through 70c is electrically connected via metal wiring to an external signal source for supplying a specified voltage. In the thirteenth embodiment, the metal electrode 69b is formed at a pupil radius position r3 where the spherical aberration for the DVD 127 becomes maximum and the metal electrode 70b is formed at a pupil radius position r4 where the spherical aberration for the CD 137 becomes maximum.

As described above, spherical aberration of light becomes larger as it departs from the optical axis and becomes suddenly smaller near a pupil radius position corresponding to an NA being used. Therefore, a pupil radius position where the spherical aberration for an optical recording medium becomes maximum is slightly smaller than the NA used for the optical recording medium. Therefore, a metal electrode for correcting spherical aberration for the DVD 127 is preferably formed at a pupil radius position corresponding to an NA between 0.45 and 0.65; and a metal electrode for correcting spherical aberration for the CD 137 is preferably formed at a pupil radius position corresponding to an NA of 0.45 or smaller.

An exemplary operation of the liquid crystal element 1041 is described below. For example, when the insertion of the DVD 127 is detected by an optical recording medium detecting unit, a set of predetermined voltages are applied to the metal electrodes so that the phase difference becomes maximum at a pupil radius position corresponding to the metal electrode 69b. When the insertion of the CD 137 is detected, a different set of predetermined voltages are applied to the metal electrodes so that the phase difference becomes maximum at a pupil radius position corresponding to the metal electrode 70b. When the Blu-ray disk 107 or the HD-DVD 117 is detected, the liquid crystal element 1041 is not driven.

Figure 61:
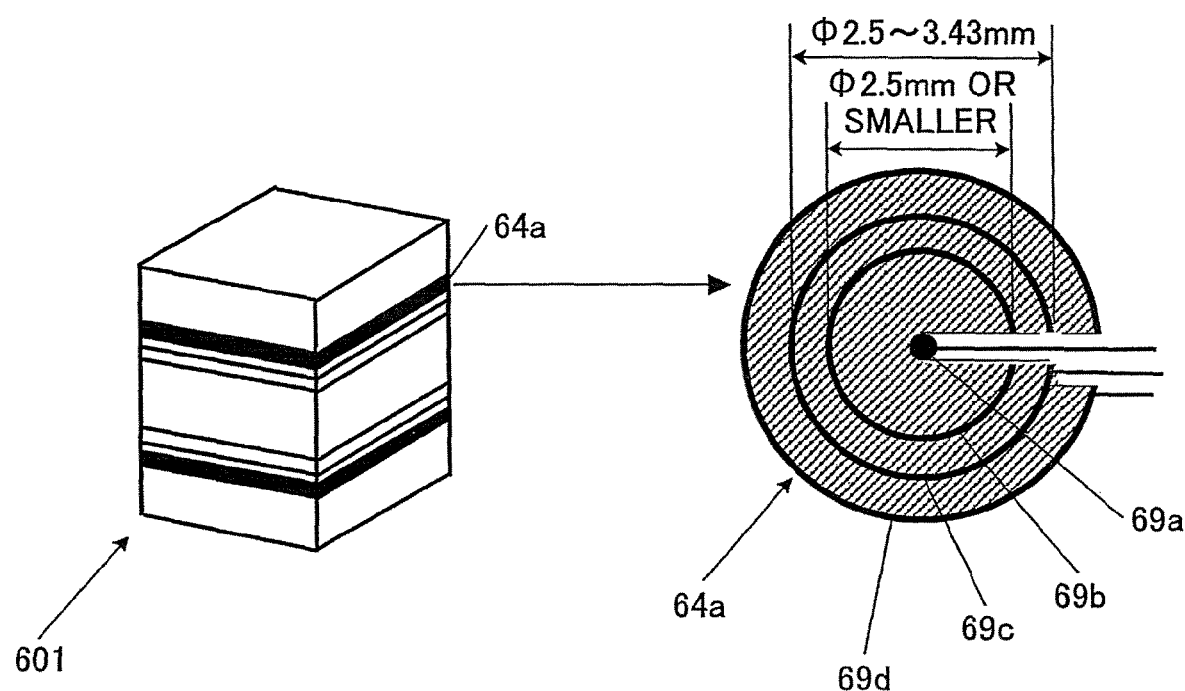
FIG. 61 is a drawing illustrating another exemplary configuration of a transparent electrode layer of the exemplary liquid crystal element.

The configurations of the transparent electrode layers 64a and 64b are not limited to those shown in FIG. 60. For example, the transparent electrode layer 64a may include metal electrodes 69a through 69d as shown in FIG. 61. The metal electrode 69c is formed at a pupil radius position where the spherical aberration for the DVD 127 becomes maximum and the metal electrode 69b is formed at a pupil radius position where the spherical aberration for the CD 137 becomes maximum.

As described above, spherical aberration of light becomes larger as it departs from the optical axis and becomes suddenly smaller near a pupil radius position corresponding to an NA being used. Therefore, a pupil radius position where the spherical aberration for an optical recording medium becomes maximum is slightly smaller than the NA used for the optical recording medium. Therefore, a metal electrode for correcting spherical aberration for the DVD 127 is preferably formed at a pupil radius position corresponding to an NA between 0.45 and 0.65; and a metal electrode for correcting spherical aberration for the CD 137 is preferably formed at a pupil radius position corresponding to an NA of 0.45 or smaller.

Figure 62:
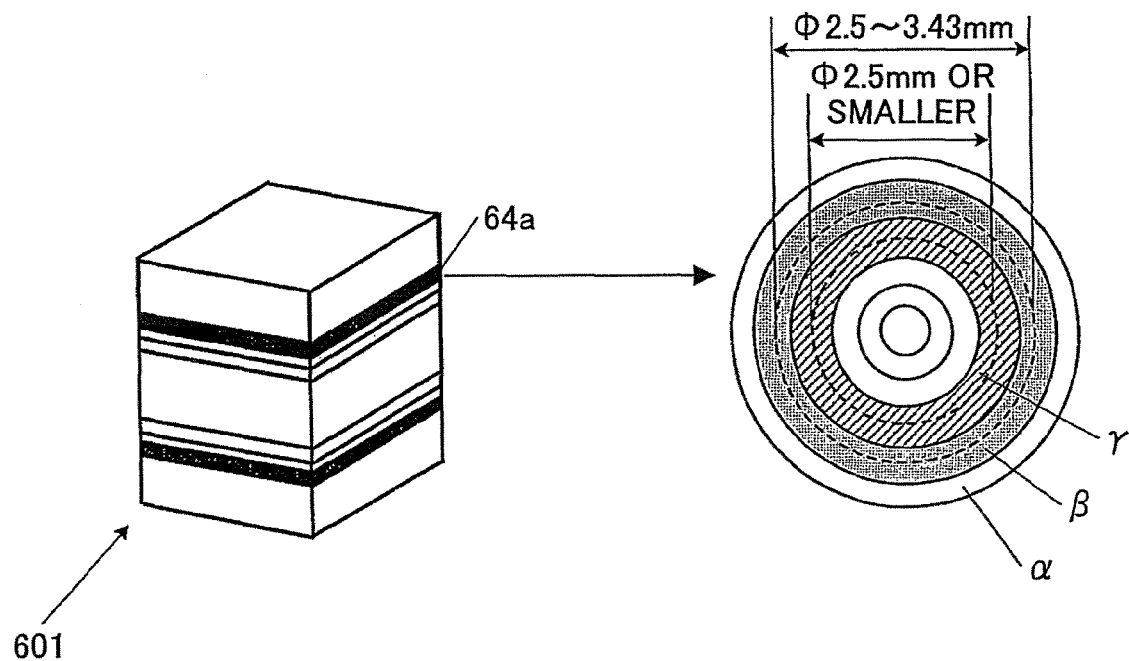
FIG. 62 is a drawing illustrating still another exemplary configuration of a transparent electrode layer of the exemplary liquid crystal element.

Also, the transparent electrode layer 64a may be configured to include segmented electrodes 1 through $\alpha$ ($\alpha$ is an integer) as shown in FIG. 62. The segmented electrode $\beta$ ($\beta$ is an integer, $1<\beta<\alpha$) is formed at a pupil radius position where the spherical aberration for the DVD 127 becomes maximum and the segmented electrode $\gamma$ ($\gamma$ is an integer, $1<\gamma<\beta<\alpha$) is formed at a pupil radius position where the spherical aberration for the CD 137 becomes maximum.

Figure 63:
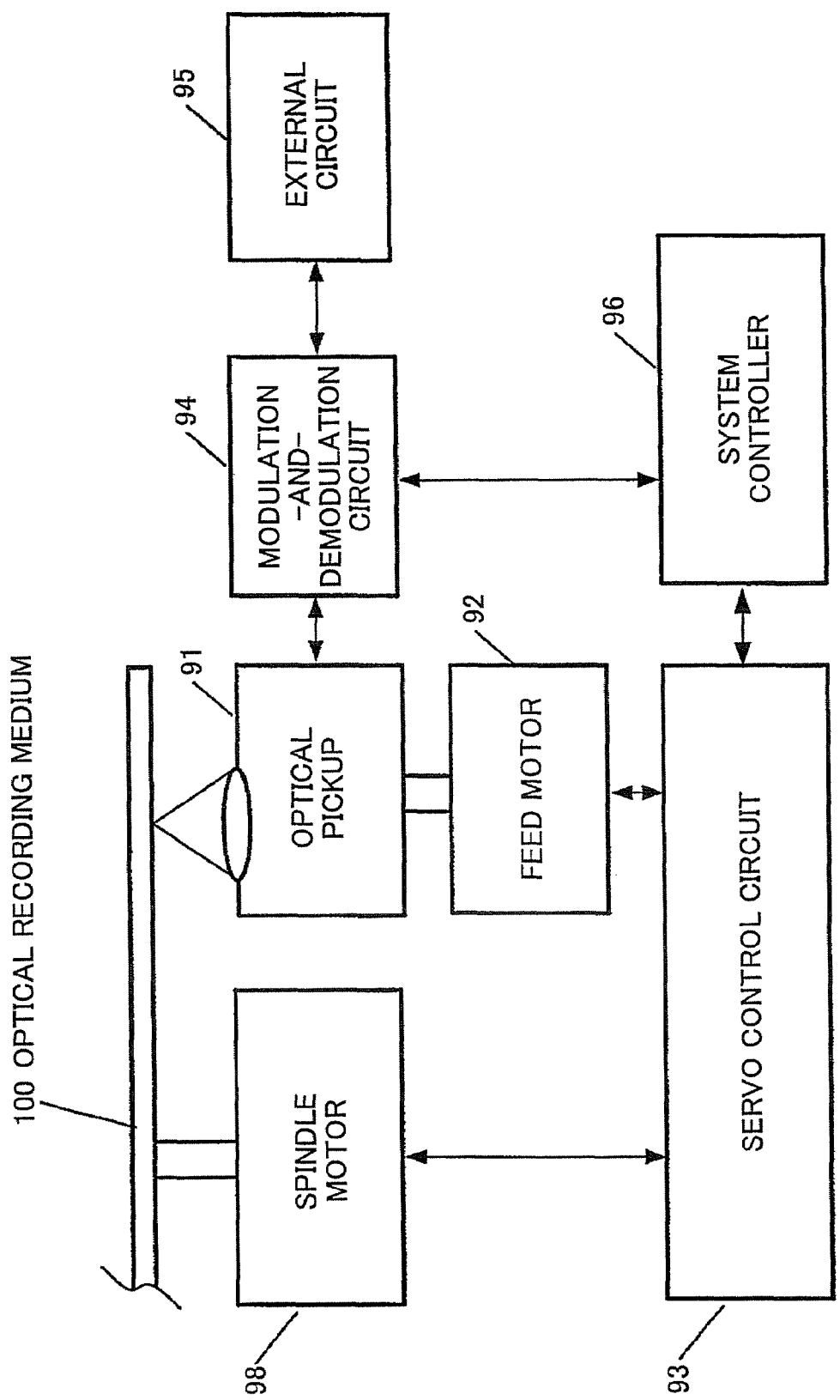
FIG. 63 is a drawing illustrating an exemplary configuration of an optical information processing apparatus according to a fourteenth embodiment of the present invention.

FIG. 63 is a drawing illustrating an exemplary configuration of an optical information processing apparatus according to a fourteenth embodiment of the present invention. An exemplary optical information processing apparatus of the fourteenth embodiment includes an optical pickup according to any one of the embodiments 1 through 7 and is configured to reproduce, record, and/or delete information on an optical recording medium.

As shown in FIG. 63, the exemplary optical information processing apparatus includes an optical pickup 91, a feed motor 92, a spindle motor 98, and a system controller 96 for controlling other parts in the exemplary optical information processing apparatus. Movement of the optical pickup 91 in the tracking direction is controlled by a drive control unit including the feed motor 92 and a servo control circuit 93. For example, when reproducing information on an optical recording medium 100, the system controller 96 supplies a control signal to the servo control circuit 93 and a modulation-and-demodulation circuit 94.

The servo control circuit 93 causes the spindle motor 98 to rotate at a specified rotational speed and drives the feed motor 92.

A photodetector of the optical pickup 91 supplies the modulation-and-demodulation circuit 94 with a focusing error signal, a tracking error signal, and current position information about the position currently being read on the optical recording medium 100. The focusing error signal and the tracking error signal are supplied via the system controller 96 to the servo control circuit 93.

The servo control circuit 93 drives a focusing coil of an actuator based on the focusing control signal and drives a tracking coil of the actuator based on the tracking control signal. A low frequency component of the tracking control signal is supplied via the system controller 96 to the servo control circuit 93 to control the feed motor 92. Thus, the above configuration makes it possible to perform a focusing servo, tracking servo, and feed servo.

The current position information is processed by the modulation-and-demodulation circuit 94 and supplied as a spindle control signal to the spindle motor 98. The rotational speed of the spindle motor 98 is controlled according to the current position information and reproduction of the information on the optical recording medium 100 is started from a position specified in the current position information. Reproduced information is then demodulated by the modulation-and-demodulation circuit 94 and transmitted via an external circuit 95 to the outside.

When recording information on the optical recording medium 100, substantially the same processes as described above are performed except the focusing servo, tracking servo, and feed servo.

For example, when recording input data from the external circuit 95 on the optical recording medium 100, the system controller 96 supplies a control signal specifying a recording position on the optical recording medium 100 where the input data are recorded to the servo control circuit 93 and the modulation-and-demodulation circuit 94.

The servo control circuit 93 causes the spindle motor 98 to rotate at a specified rotational speed, drives the feed motor 92, and thereby moves the optical pickup 91 to the recording position.

Meanwhile, when receiving the input data from the external circuit 95, the modulation-and-demodulation circuit 94 modulates the input data into a modulated signal based on the corresponding recording format and supplies the modulated signal to the optical pickup 91. Based on the modulated signal, the modulation and power of light emitted from the optical pickup 91 are controlled and information is recorded on the optical recording medium 100.

The type of the optical recording medium 100 is determined based on a reproduction data signal. Also, a tracking servo signal or a focusing servo signal may be used to determine the type of the optical recording medium 100.

Using an optical pickup including an aberration correcting unit according to an embodiment of the present invention makes it possible to provide an optical information processing apparatus that can accurately reproduce and/or record information on optical recording media having different substrate thicknesses.

As described above, an optical information processing apparatus of the fourteenth embodiment includes an optical pickup that can form an accurate light spot using a single objective lens on any one of four types of optical recording media (optical recording media conforming to Blu-ray disc, HD-DVD, DVD, and CD standards) having different substrate thicknesses, and is able to optimally record, reproduce, and/or delete information on any one of the four types of optical recording media.

Embodiments of the present invention provide an optical pickup that includes multiple light sources having wavelengths corresponding to different types of optical recording media with different substrate thicknesses and different recording densities, and is capable of appropriately focusing light on any one of the optical recording media using one objective lens; and an optical information processing apparatus including the optical pickup and is capable of accurately recording and/or reproducing information on any one of the optical recording media.

Embodiments of the present invention make it possible to provide a small, low-cost, and highly-efficient optical pickup that includes multiple light sources having wavelengths corresponding to different types of optical recording media with different substrate thicknesses and different recording densities and is capable of appropriately focusing light on any one of the optical recording media using one objective lens; to allow greater assembly tolerance in producing such an optical pickup; and to provide an optical information processing apparatus that includes the optical pickup and is capable of accurately recording and/or reproducing information on any one of the recording media.

The present invention is not limited to the specifically disclosed embodiments, and variations and modifications may be made without departing from the scope of the present invention.

The present application is based on Japanese Priority Application No. 2006-121894 filed on Apr. 26, 2006, Japanese Priority Application No. 2006-121911 filed on Apr. 26, 2006, Japanese Priority Application No. 2006-121995 filed on Apr. 26, 2006, Japanese Priority Application No. 2006-240204 filed on Sep. 5, 2006, and Japanese Priority Application No. 2007-006975 filed on Jan. 16, 2007, the entire contents of which are hereby incorporated herein by reference.

The invention claimed is:

1. An optical pickup for performing at least recording, reproduction, or deletion of information on multiple types of optical recording media, the multiple types of optical recording media being a first optical recording medium, a second optical recording medium, a third optical recording medium, and a fourth optical recording medium in descending order of recording density, the optical pickup comprising:

a first light source configured to emit first light having a first wavelength $\lambda 1$ corresponding to the first and second optical recording media;

a second light source configured to emit second light having a second wavelength $\lambda 2$ corresponding to the third optical recording medium;

a third light source configured to emit third light having a third wavelength $\lambda 3$ corresponding to the fourth optical recording medium, wherein $\lambda 1 < \lambda 2 < \lambda 3$ is true;

an objective lens configured to focus the first light, the second light, and the third light on corresponding recording surfaces of the first, second, third, and fourth optical recording media; and an aberration correcting unit between the objective lens and the first, second, and third light sources, the aberration correcting unit having a first diffraction plane and a second diffraction plane, each of the first and second diffraction planes having at least one diffraction structure made of concentrically arranged orbicular ridges and grooves, wherein the first diffraction plane has multiple concentric zones including a center zone and a second zone, the center zone being located in the center of the first diffraction plane and having the diffraction structure and the second zone being located second from the center of the first diffraction plane and having the diffraction structure, wherein when diffraction orders of most intense diffracted light produced from the first light, the second light, and the third light by the diffraction structure of the center zone are N11, N12, and N13, respectively, $|N11|<|N12|<|N13|$ is true, wherein when diffraction orders of most intense diffracted light produced from the first light and the second light by the diffraction structure of the second zone are N21 and N22, respectively, $|N21|<|N22|$ is true, and wherein signs of the diffraction orders N11, N12, and N13 are opposite to those of the diffraction orders N21 and N22.

2. The optical pickup as claimed in claim 1, wherein the first diffraction plane has three or more concentric zones within an optically effective diameter of the aberration correcting unit.

3. The optical pickup as claimed in claim 2, wherein at least two of the three or more concentric zones have the diffraction structure.

4. The optical pickup as claimed in claim 3, wherein a first two of the three or more concentric zones from the center of the first diffraction plane have the diffraction structure.

5. The optical pickup as claimed in claim 4, wherein a depth of the orbicular grooves of the diffraction structure differs from one of the first two of the three or more concentric zones to another.

6. The optical pickup as claimed in claim 1, wherein
the diffraction orders N21 and N22 are 0 and −1, respectively.

7. The optical pickup as claimed in claim 1, wherein
the diffraction structures of the center zone and the second zone are composed of step-like structures; and
the step-like structures of the center zone and the step-like structures of the second zone are sloping in opposite directions.

8. The optical pickup as claimed in claim 1, wherein
the diffraction structure of the center zone is composed of step-like structures; and
the step-like structures are so shaped that a height in an optical axis direction of each of the step-like structures becomes smaller as a distance from an optical axis of the aberration correcting unit increases.

9. The optical pickup as claimed in claim 1, wherein
the diffraction structure of the second zone is composed of step-like structures; and
the step-like structures are so shaped that a height in an optical axis direction of each of the step-like structures becomes larger as a distance from an optical axis of the aberration correcting unit increases.

10. The optical pickup as claimed in claim 6, wherein
the diffraction structure of the center zone is composed of step-like structures each having steps; and
a height of each of the steps is so determined that a phase difference of $N1 \cdot M \cdot \lambda 1$ is applied to the first light, a phase difference of $(N2+(M-1)/M)\lambda 2$ is applied to the second light, and a phase difference of $(N3+(M-2)/M)\lambda 3$ is applied to the third light, where M is a number of the steps that is 4 and N1, N2, and N3 are integers equal to or greater than 0.

11. The optical pickup as claimed in claim 6, wherein
the diffraction structure of the second zone is composed of step-like structures each having steps; and
a height of each of the steps is so determined that a phase difference of $N1 \cdot M \cdot \lambda 1$ is applied to the first light, a phase difference of $(N2+1/M)\lambda 2$ is applied to the second light, and a phase difference of $(N3 \cdot M)\lambda 3$ is applied to the third light, where M is a number of the steps that is 5 and N1, N2, and N3 are integers equal to or greater than 0.

12. The optical pickup as claimed in claim 6, wherein the diffraction structure of the second zone is composed of step-like structures each having steps; and
a height of each of the steps is so determined that a phase difference of $N1 \cdot M \cdot \lambda 1$ is applied to the first light, a phase difference of $(N2+(M-1)/M)\lambda 2$ is applied to the second light, and a phase difference of $(N3+(M-1)/M)\lambda 3$ is applied to the third light, where M is a number of the steps that is 3 and N1, N2, and N3 are integers equal to or greater than 0.

13. The optical pickup as claimed in claim 1, wherein
a depth of the orbicular grooves of the diffraction structure of the second zone is smaller than that of the orbicular grooves of the diffraction structure of the center zone.

14. The optical pickup as claimed in claim 1, wherein
the multiple concentric zones include a third zone, the third zone being located third from the center of the first diffraction plane and having a flat surface.

15. The optical pickup as claimed in claim 1, wherein
pitches between the orbicular ridges of the diffraction structure of the center zone are so determined that spherical aberration that occurs when the second light passes through the objective lens and a substrate of the third optical recording medium and spherical aberration that occurs when the third light passes through the objective lens and a substrate of the fourth optical recording medium are corrected.

16. The optical pickup as claimed in claim 15, wherein
pitches between the orbicular ridges of the diffraction structure of the second zone are so determined that spherical aberration that occurs when the second light passes through the objective lens and the substrate of the third optical recording medium is corrected, where a distance between the objective lens and the recording surface of the third optical recording medium is substantially the same as that in claim 15.

17. An optical information processing apparatus for performing at least recording, reproduction, or deletion of information on multiple types of optical recording media having different recording densities, comprising:
the optical pickup as claimed in any one of claims 1, 2-5, 6, 7-10, 11, 12, 13, 14, 15 and 16.

* * * * *